United States Patent
Dowski, Jr. et al.

(10) Patent No.: US 9,471,994 B2
(45) Date of Patent: Oct. 18, 2016

(54) IMAGE BASED SYSTEMS FOR DETECTING INFORMATION ON MOVING OBJECTS

(71) Applicant: OmniVision Technologies, Inc., Santa Clara, CA (US)

(72) Inventors: Edward R. Dowski, Jr., Lafayette, CO (US); Kenneth S. Kubala, Boulder, CO (US); Hans Brandon Wach, Longmont, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 402 days.

(21) Appl. No.: 14/089,410

(22) Filed: Nov. 25, 2013

(65) Prior Publication Data

US 2014/0078314 A1    Mar. 20, 2014

Related U.S. Application Data

(60) Division of application No. 13/231,826, filed on Sep. 13, 2011, now Pat. No. 8,593,552, which is a continuation-in-part of application No. 12/672,257, filed as application No. PCT/US2008/072112 on Aug.

(Continued)

(51) Int. Cl.
*H04N 5/77* (2006.01)
*H04N 9/80* (2006.01)

(Continued)

(52) U.S. Cl.
CPC .......... *G06T 7/2093* (2013.01); *G02B 27/0075* (2013.01); *G06T 7/004* (2013.01); *H04N 5/238* (2013.01); *H04N 5/2353* (2013.01);

(Continued)

(58) Field of Classification Search
USPC .................. 386/223–224, 239–248
See application file for complete search history.

(56) References Cited

U.S. PATENT DOCUMENTS

| 5,524,162 A | 6/1996 | Levien |
| 5,627,366 A | 5/1997 | Katz |

(Continued)

FOREIGN PATENT DOCUMENTS

| CN | 1494701 | 5/2004 |
| CN | 1959468 | 5/2007 |

(Continued)

OTHER PUBLICATIONS

Office Action issued in related Chinese Patent Application 200880110346.X, dated Mar. 29, 2012, 6 pages.

(Continued)

*Primary Examiner* — Hung Dang
(74) *Attorney, Agent, or Firm* — Lathrop & Gage LLP

(57) ABSTRACT

Systems and methods for generating images of an object having a known object velocity include imaging electromagnetic radiation from the object onto a sensor array of an imaging system, adjusting at least one of a shutter rate and a shutter direction of the imaging system in accordance with an image velocity of the image across the sensor array, and sampling output of the sensor array in accordance with the shutter rate and the shutter direction to generate the images. Systems and methods for generating images of an object moving through a scene include a first imaging system generating image data samples of the scene, a post processing system that analyzes the samples to determine when the object is present in the scene, and one or more second imaging systems triggered by the post processing system to generate one or more second image data samples of the object.

14 Claims, 46 Drawing Sheets

Related U.S. Application Data 4, 2008, now Pat. No. 8,736,699.

(60) Provisional application No. 60/953,998, filed on Aug. 4, 2007, provisional application No. 61/056,730, filed on May 28, 2008.

(51) Int. Cl.

| | | |
|---|---|---|
| *G06T 7/20* | (2006.01) | |
| *G02B 27/00* | (2006.01) | |
| *G06T 7/00* | (2006.01) | |
| *H04N 5/232* | (2006.01) | |
| *H04N 5/235* | (2006.01) | |
| *H04N 5/238* | (2006.01) | |
| *H04N 5/353* | (2011.01) | |
| *G02B 3/10* | (2006.01) | |
| *G02B 26/06* | (2006.01) | |
| *G02B 27/46* | (2006.01) | |

(52) U.S. Cl.
CPC ...... *H04N5/23212* (2013.01); *H04N 5/23267* (2013.01); *H04N 5/3532* (2013.01); *G02B 3/10* (2013.01); *G02B 26/06* (2013.01); *G02B 27/46* (2013.01)

(56) References Cited

U.S. PATENT DOCUMENTS

| | | | |
|---|---|---|---|
| 5,814,803 | A | 9/1998 | Olmstead et al. |
| 6,409,141 | B1 | 6/2002 | Yamazaki et al. |
| 2002/0070278 | A1* | 6/2002 | Hung ............... G06K 7/10702 235/472.01 |
| 2003/0076599 | A1 | 4/2003 | Tarakci et al. |
| 2003/0142877 | A1 | 7/2003 | George et al. |
| 2003/0234867 | A1 | 12/2003 | Fujita et al. |
| 2006/0269150 | A1 | 11/2006 | Lee |
| 2006/0284052 | A1 | 12/2006 | Toshikiyo et al. |
| 2007/0017993 | A1 | 1/2007 | Sander |
| 2007/0035623 | A1* | 2/2007 | Garoutte .......... G08B 13/19608 348/143 |
| 2008/0029602 | A1* | 2/2008 | Burian ............... G06K 7/10722 235/462.09 |
| 2009/0153710 | A1 | 6/2009 | John |
| 2010/0165160 | A1 | 7/2010 | Olmstead et al. |
| 2011/0001859 | A1 | 1/2011 | Matsuura et al. |
| 2011/0267514 | A1 | 11/2011 | D'Angelo et al. |

FOREIGN PATENT DOCUMENTS

| | | |
|---|---|---|
| EP | 1726984 A | 11/2006 |
| JP | 2005292544 A | 10/2005 |
| JP | 2006184844 A | 7/2006 |

OTHER PUBLICATIONS

Office Action issued in related European Patent Application 0879119.8, dated Jun. 13, 2012, 4 pages.

Office Action issued in related U.S. Appl. No. 12/672,257, dated Apr. 2, 2012, 12 pages.

Response to Office Action issued in related U.S. Appl. No. 12/672,257, dated Apr. 24, 2012, 16 pages.

International Search Report and Written Opinion issued in related patent application PCT/US2008/072112, dated Dec. 29, 2008.

Notice of Allowance issued in related U.S. Appl. No. 13/231,826, dated Jul. 8, 2013 8 pages.

Response to Office Action issued in Chinese Application 200880110346.X with translation dated May 10, 2013, 12 pages.

Office Action issued in U.S. Appl. No. 13/231,826, dated Mar. 18, 2013, 19 pages.

Notice of Allowance issued in U.S. Appl. No. 12/672,257 dated Jan. 24, 2014, 7 pages.

* cited by examiner

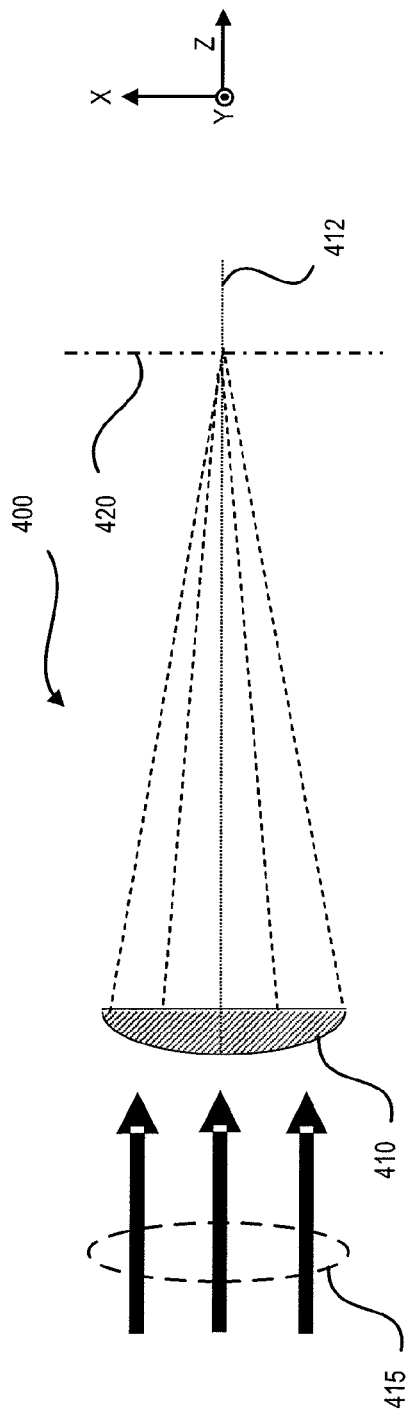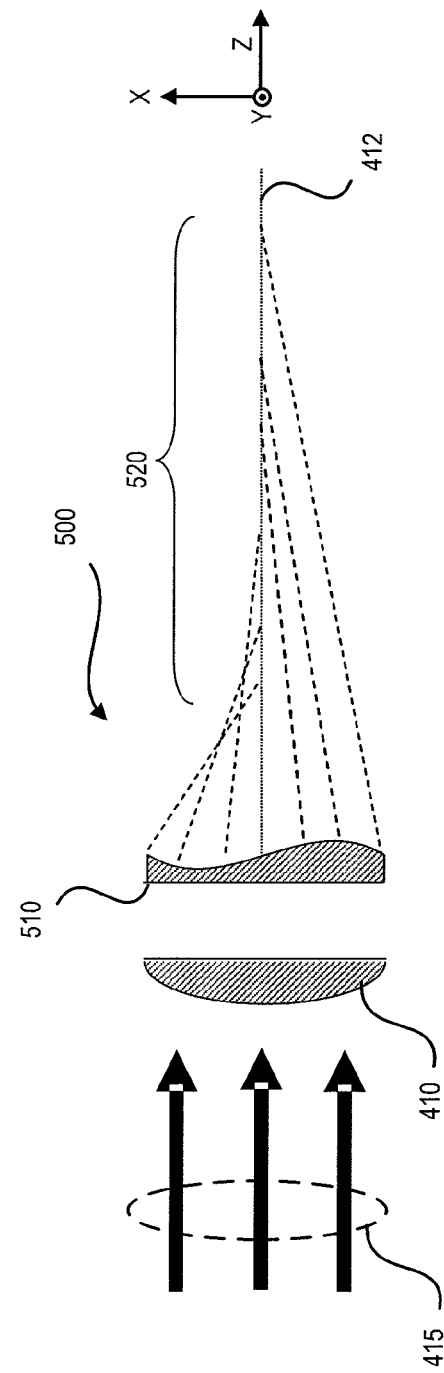

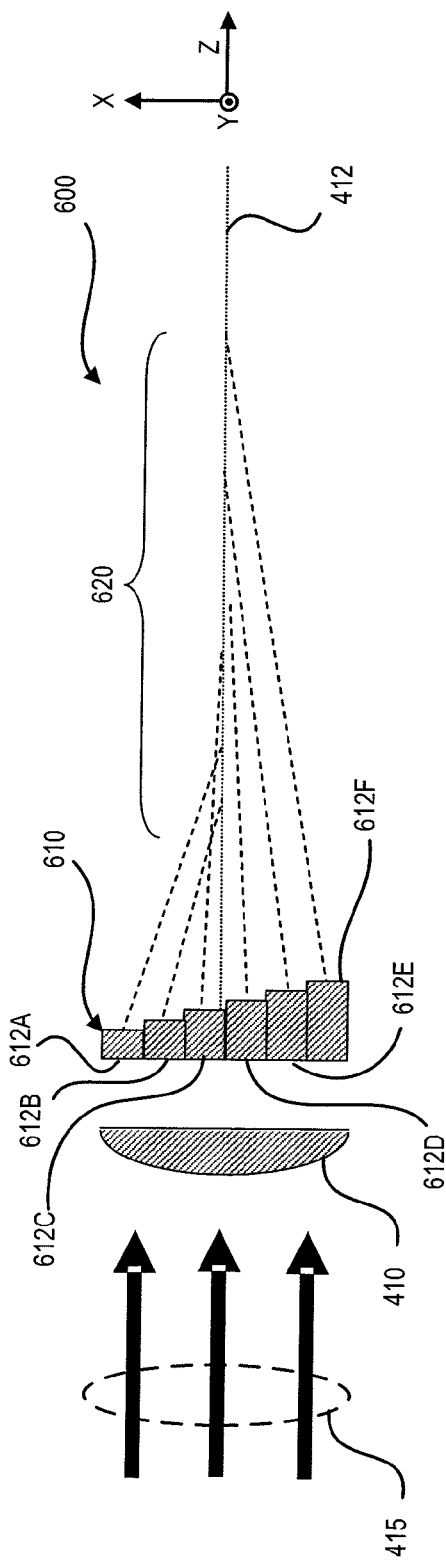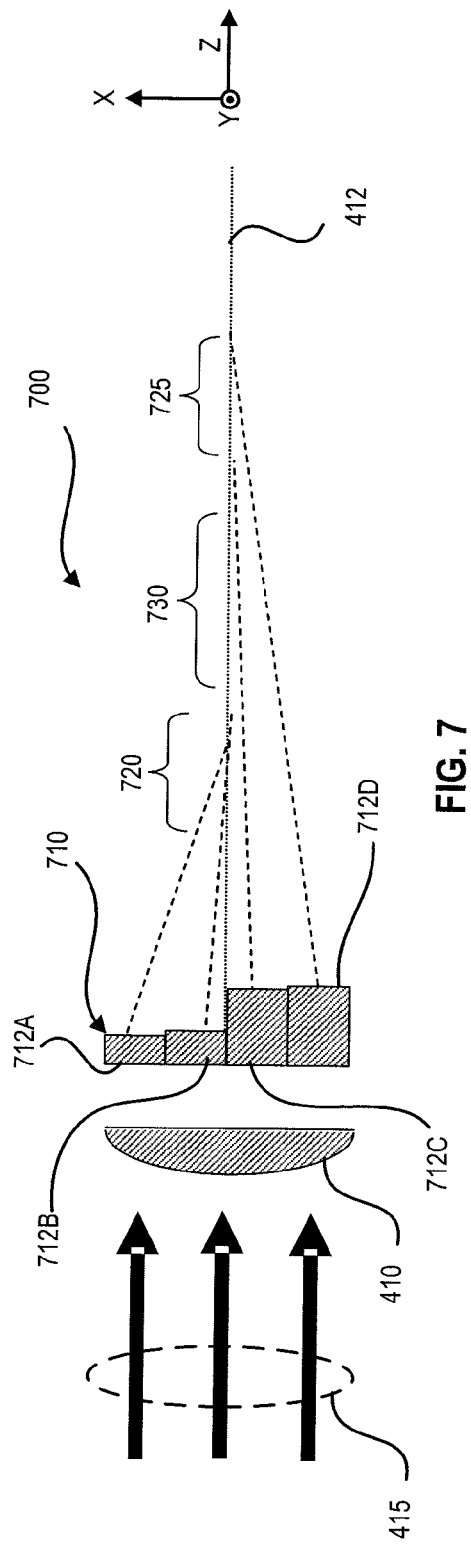

Top of image

Bottom of image

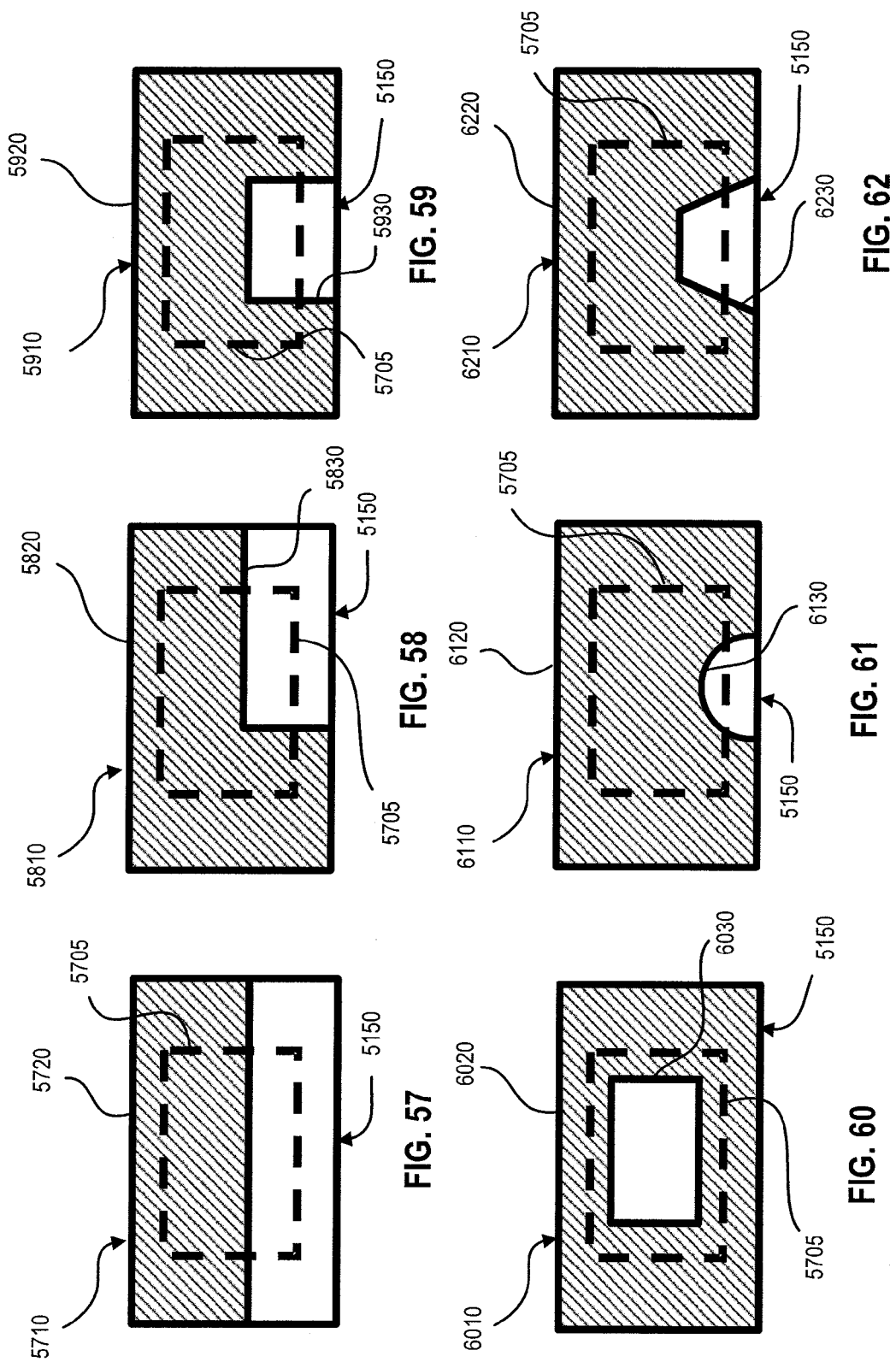

IMAGE BASED SYSTEMS FOR DETECTING INFORMATION ON MOVING OBJECTS

CROSS-REFERENCE TO RELATED APPLICATIONS

This application is a divisional application of U.S. patent application Ser. No. 13/231,826, filed Sep. 13, 2011, which is a continuation-in-part of U.S. patent application Ser. No. 12/672,257, filed Dec. 17, 2010, which claims priority to Patent Cooperation Treaty Application No. PCT/US2008/072112, filed 4 Aug. 2008, which claims priority to U.S. Provisional patent application Ser. No. 60/953,998, filed Aug. 4, 2007 and to U.S. Provisional patent application Ser. No. 61/056,730, filed May 28, 2008. All of the above-identified patent applications are incorporated herein by reference in their entireties.

BACKGROUND

Traditional imaging systems are commonly designed so that the final image quality is high over a narrow region of object space; for example, objects located over a narrow range of object conjugate distances may be imaged by the traditional imaging system to form an in-focus image. The depth of this narrow region of the object space is determined by the depth of field of the system. More recent imaging systems may employ non-traditional imaging designs and techniques that allow an increased depth of field compared to classical systems. For example, U.S. Pat. No. 5,746,371, entitled EXTENDED DEPTH OF FIELD OPTICAL SYSTEMS issued 5 May 1998, discloses imaging systems configured to provide an increased depth of field.

Information that may be present on an object (e.g., a one-dimensional or a two-dimensional bar code) may be readily captured by a variety of conventional systems when the object is motionless, but motion of the object has made capture of the information difficult or impossible. Variables that can affect the ability to capture such information include speed of the moving object, distance of the object from imaging or other systems that are to capture the information, orientation of the information relative to the imaging or other systems, and illumination of the object.

SUMMARY OF THE INVENTION

An imaging system includes optics for forming an optical image that provide a first region in the optical image that is characterized by a first range of best focus and a second region in the optical image that is characterized by a second range of best focus. The first and second ranges correspond to object distance ranges that are discontiguous. A sensor array converts the optical image to a data stream, and a digital signal processor processes the data stream to generate a final image.

In an imaging system including imaging optics and a sensor array, an improvement includes an optical element within the imaging system and intersecting at least a portion of electromagnetic energy incident on the sensor array. The optical element cooperates with the imaging optics and the sensor array to form a first image portion and a second image portion from the electromagnetic energy. The first image portion is in focus over a first conjugate distance range and the second image portion being in focus over a second conjugate distance range. The two conjugate distance ranges are separated by at least 40 cm.

In a method of imaging utilizing imaging optics and a sensor array, an improvement includes configuring the imaging optics such that electromagnetic energy transmitted through the imaging optics and incident on the sensor array forms an image that is in focus over at least two conjugate distance ranges for two respective portions of the image. The two conjugate distance ranges are separated by at least 40 cm.

In an embodiment, a method of generating image data of an object moving at a known object velocity includes imaging electromagnetic radiation from the object into an image on a sensor array of an imaging system. The method also includes adjusting at least one of a shutter rate and a shutter direction of the imaging system in accordance with an image velocity of the image across the sensor array, and sampling output of the sensor array in accordance with the shutter rate and the shutter direction to generate image data of the object.

In an embodiment, a system for generating image data of an object moving through a scene includes a first imaging system that generates sequential image data samples of the scene, a post processing system that analyzes the sequential image data samples to determine when the object is present in the scene, and one or more second imaging systems that are triggered by the post processing system to generate one or more second image data samples of the object when the object is present.

In an embodiment, a method of processing image data of an object moving at an object velocity includes imaging electromagnetic radiation from the object into an image on a sensor array. The method also includes generating raw image data with the sensor array, the raw image data corresponding to the image at sequential portions of the sensor array, such that the image data generates in a shutter direction that is substantially orthogonal to an image velocity of the image across the sensor array; and processing the raw image data by shifting pixels of the image to compensate for motion of the object across the sequential portions of the sensor array.

In an embodiment, a method of generating corrected image data to compensate for effects of motion during acquisition of uncorrected image data of an image includes determining a height of the image data to be corrected as corresponding to image lines numbered 1 through h. The method also includes determining a distance d that the image data is shifted, over the height, due to the motion; and shifting image data of each line number j of the uncorrected image data thereof, by $((j-1)*(d/h))$ pixels, for each line number 1 through h, to generate the corrected image data.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

FIGS. 4-7 illustrate an analysis and design approach for configuring a multi-region imaging system, in accordance with an embodiment.

FIGS. 57-62 illustrate different aperture configurations for the multi-region imaging system of FIG. 51.

DETAILED DESCRIPTION OF ILLUSTRATED EMBODIMENTS

Figure 1:
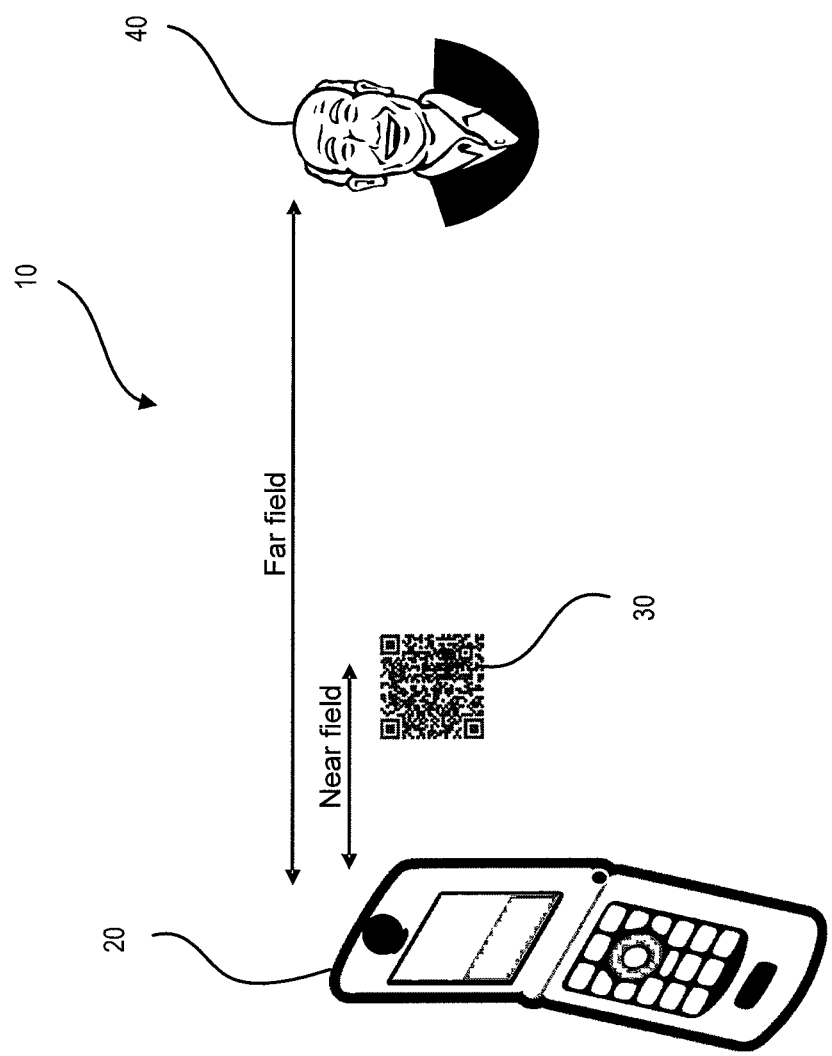
FIGS. 1 and 2 show possible application scenarios suitable for use with a multi-region imaging system, in accordance with an embodiment.

While the depth of field of an imaging system may be increased using different techniques, certain limitations may exist. For example, the height of a modulation transfer function ("MTF") at a particular spatial frequency over a range of conjugate distances (also known as a "through-focus MTF") is a quantity related to image quality achievable by an imaging system. (Note, throughout this application the term "conjugate distance" is meant in the sense of object conjugate distance.) For a given application, a designer of the imaging system may not arbitrarily set the height of the through-focus MTF, since a maximum value of the MTF at a particular conjugate distance is determined by a diffraction-limited MTF. While the through-focus MTF curve for a traditional imaging system generally includes one peak at a particular conjugate distance and drops to nearly zero away from the peak, the through-focus MTF curve for an extended depth of field imaging systems may have a non-zero value over a range of conjugate distances. In extended depth of field imaging systems, the height of through-focus MTF (and/or light gathering ability of the imaging system) may also drop relative to that of the diffraction-limited system.

A mathematical approach to understanding the aforementioned through-focus MTF drop with increased depth of field is to consider a general monochromatic exit pupil phase function P(x) for a given aperture, where:

$$|P(x)|=1 \text{ within the aperture,} \quad \text{Eq. (1)}$$

and $$P(x)=0 \quad \text{Eq. (2)}$$

outside of the aperture.

The through-focus MTF for a particular spatial frequency may be given by the equation:

$$\text{Through-focus MTF}(\omega)=|\text{Fourier Transform}(P(x-\alpha)P(x+\alpha)^*)|, \quad \text{Eq. (3)}$$

where α is a constant related to the particular spatial frequency ω and * denotes complex conjugate. From Parseval's theorem, it is known that the sum of the squared magnitude of two signals related by Fourier Transform are equal. In other words, for a particular spatial frequency ω, the sum of the squared through-focus MTF values is equal for all imaging systems that meet the definitions above. Consequently, $$\Sigma\text{Through-focus MTF}(\omega)^2=\text{constant} \quad \text{Eq. (4)}$$

for all P(x).

The consequence of the above mathematical description is that the height of the through-focus MTF over a range in object or image space (e.g., over a range of conjugate distances) is limited. That is, increasing a range of clear imaging in object space leads to a reduction in height of the MTF. This same concept, in the context of an ambiguity function, is also called "conservation of ambiguity".

In order to overcome the aforedescribed limitations and to meet the needs of advanced applications, various embodiments of multi-region imaging systems are disclosed herein. In accordance with an embodiment, a multi-region imaging system is a single aperture imaging system that is configured for providing good imaging performance at two or more spatial regions (e.g., in conjugate distance, image region or both) in a single exposure. The multi-region imaging system may be implemented as having, for instance, a monochromatic exit pupil, a polychromatic exit pupil, a polarization-dependent exit pupil or polarization-dependent image plane, or a combination thereof. The multi-region imaging system may also be connected with a processor for performing one or more of forming a human viewable image, transmitting captured image data to another location, and processing the captured image data to perform a task. Such processor may utilize information of optics forming the two or more spatial regions to process each region so as to provide a clear image of each region.

There are various applications of imaging systems where good low light performance and clear imaging over a large range of object distances are desired. One example is shown in FIG. 1, which illustrates desired imaging characteristics for a mobile phone camera. FIG. 1 shows a scenario 10, in which a mobile phone camera 20 may be required to provide good performance in near field imaging, such as imaging a barcode 30, as well as far field imaging, such as imaging a portrait subject 40 at a distance of ½ meter or more. That is, it would be desirable to obtain sharp imaging of objects from infinity to portrait distance as well as very close imaging, on the order of 10 to 12 cm from the camera, for reading and decoding near objects such as barcodes and business cards. Additionally, good low light imaging performance in such a mobile phone camera may be achieved by using fast lenses (e.g., ≤F/2.0). The use of fast lenses generally translates to decreased depth of field and increased close focus distance with clear infinity imaging. Specifically, increasing the speed of the lenses to F/2 and faster may either move the close focus conjugate distance far from the close focus desired distance, or unacceptably decrease the image quality. The embodiments herein help alleviate such reductions in image quality and other problems.

Figure 2:
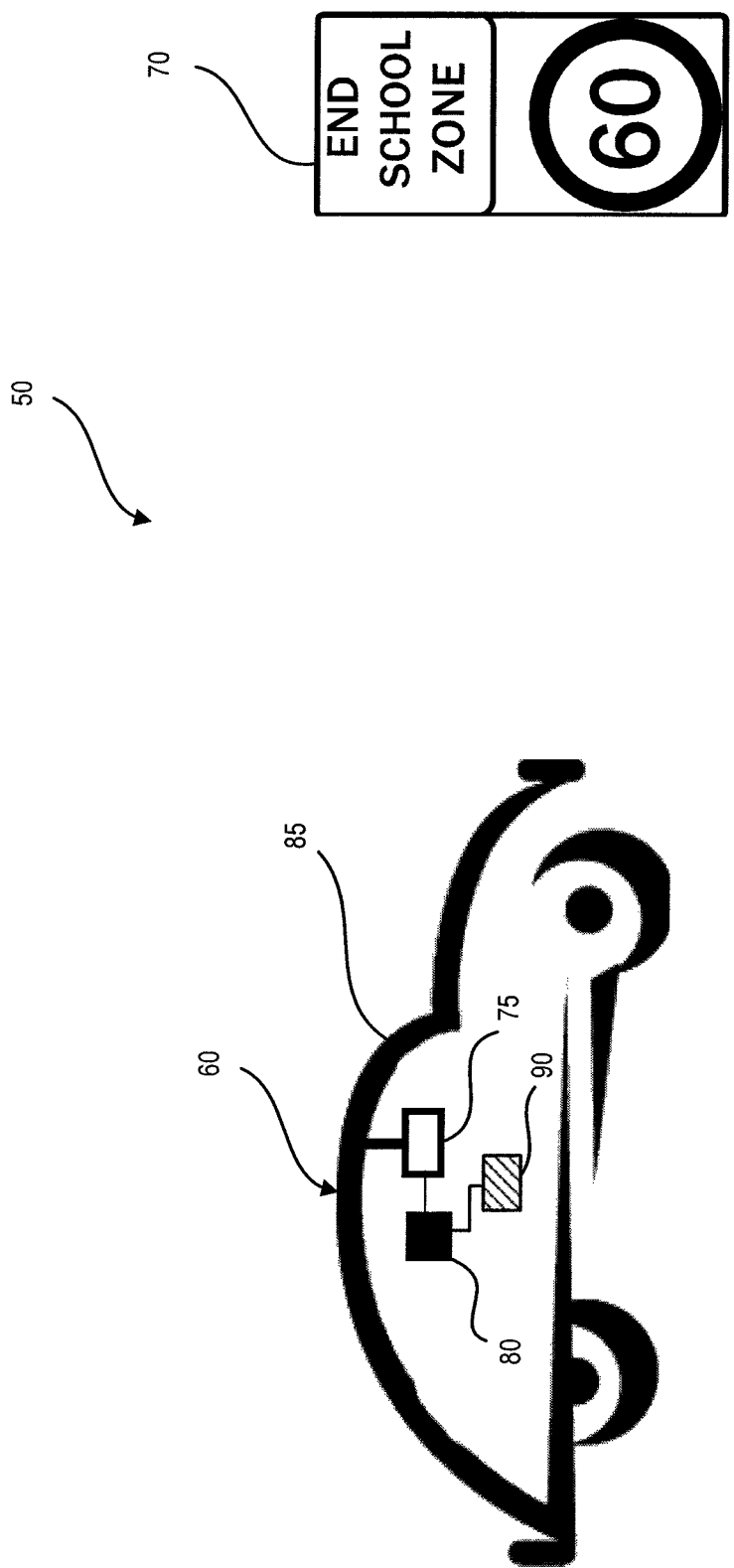

Another example of an application requiring good low light performance and clear imaging over a large range of object distances is in automotive imaging systems, such as illustrated in FIG. 2. FIG. 2 shows a scenario 50, in which an automobile 60 approaches a street sign 70. Automobile 60 may include a camera 75 for capturing images of objects outside of the automobile. Camera 75 may be used in forward-looking imaging systems for object recognition, for example, to recognize street signs, pedestrians and lane demarcation lines. Camera 75 may be further connected with a processor 80, which may perform functions such as object recognition on images captured by camera 75. While a human-viewable image is not always necessary for object recognition, capturing information may be desirable at times for objects far from camera 75 (e.g., objects located at infinity) for use in, for instance, a task-based image capture and processing application. Additionally, it may be desirable in some situations for the imaging system to be capable of directly imaging at near field distances, such as a windshield 85 of automobile 60; for instance, near field imaging may be integrated into activation of rain sensors and/or to warn a driver when windshield 85 is dirty. Processor 80 may be further connected with a central computer 90 of automobile 60 so as to effect certain actions by automobile 60 in reaction to detected triggers, such as activation of windshield wipers in the case of rain. Due to automobile design constraints, the distance from camera 75 to windshield 85 may be as little as 5 cm in some automobiles. As in the mobile phone application of FIG. 1, the use of fast lenses in camera 75 may improve low light performance, although the close focus conjugate distance may be increased as a result.

Figure 3:
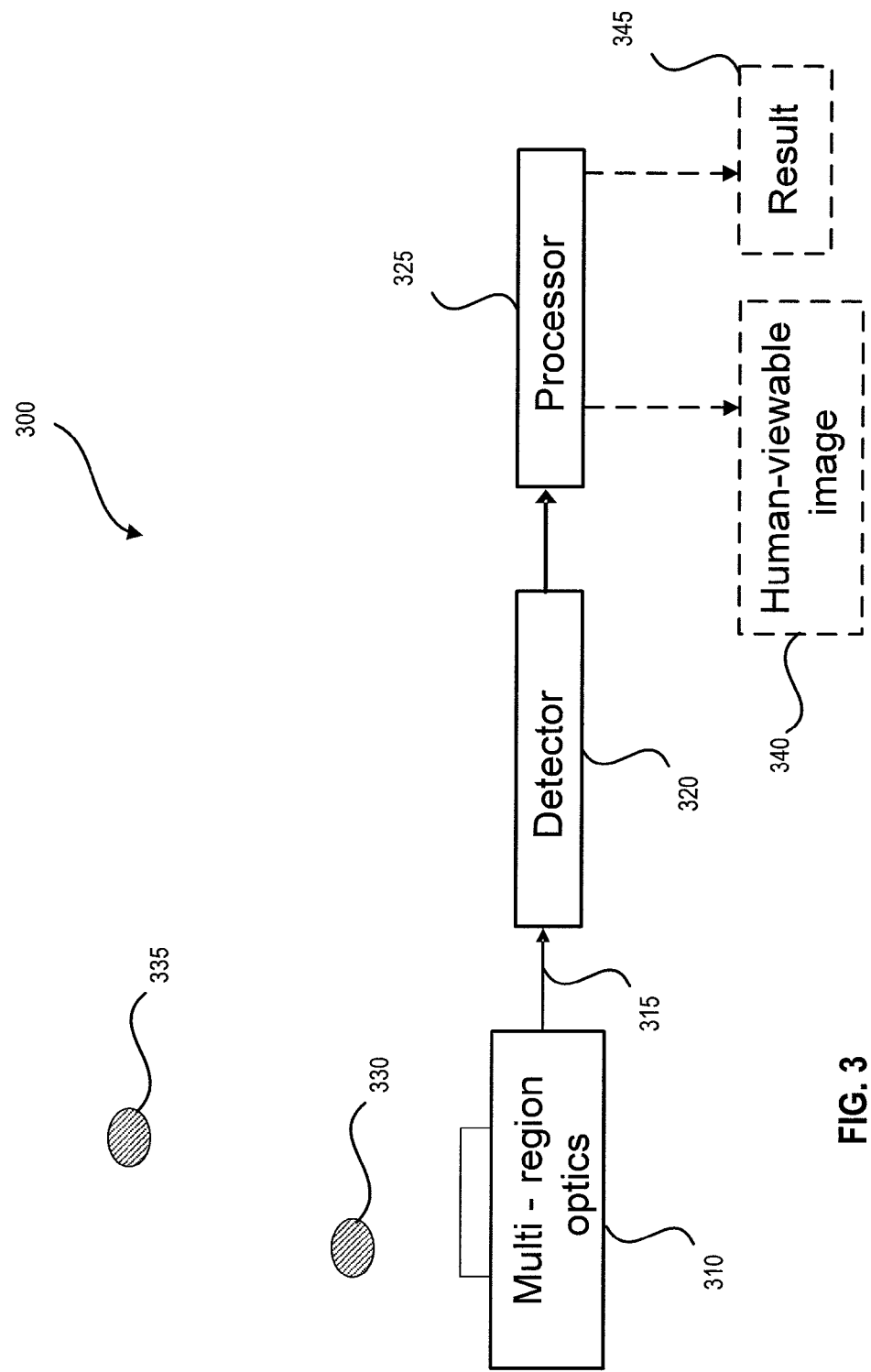
FIG. 3 shows a block diagram of a multi-region imaging system, in accordance with an embodiment.

An exemplary block diagram of an exemplary multi-region imaging system is shown in FIG. 3. A multi-region imaging system 300 includes multi-region optics 310, a sensor array 320 and a processor 325. Multi-region optics 310 may include, for example, specialized optics for imaging both a near object 330 and a far object 335 in one image onto sensor array 320. Sensor array 320 captures the image so as to generate image data 315 in accordance with the captured image. Processor 325 may implement image signal processing ("ISP") to act on image data 315, for instance, to produce a human-viewable image 340 or a processed result 345 related to a task, such as reading and decoding a barcode, business card or street sign. Processor 325 may utilize information of multi-region optics 310 to optimize processing of each region to produce a clear image for each region. Optionally, multi-region imaging system 300 may be configured to simultaneously produce both human-viewable image 340 and task-related result 345, as will be further described hereinafter.

The operational concepts behind the multi-region imaging system, such as multi-region imaging system 300, are described in conjunction with FIGS. 4-12. For simplicity, one-dimensional optics are considered in these figures, assuming incidence of parallel light rays from infinity on one side of each lens (from the left side of each figure). Consider the ray-based drawings of a traditional imaging system 400 of FIG. 4 and an extended depth of field ("EDoF") imaging system 500 as shown in FIG. 5. Traditional imaging system 400 includes optics 410 with an optic axis 412 configured for focusing incident rays 415, from the left hand side of FIG. 4, at a plane of best focus 420, which is indicated in FIG. 4 as a dot-dash line to the left of optics 410. Traditional imaging system 400 has essentially one plane of best focus; that is, parallel rays 415 through all portions of optics 410 generally come to a focus at the same plane 420. In contrast, EDoF imaging system 500 includes a combination of optics 410 with a phase modifying element 510; one suitable example of phase modifying element 510 is a phase mask, such as that described in U.S. Pat. No. 5,748,371 by Cathey, et al., entitled "Extended depth of field optical systems" (hereinafter, "the '371 patent"). The combination of optics 410 and phase modifying element 510 is configured such that incident rays 415 are imaged to an extended imaging region 520 (as indicated by a bracket) over a range of image distances or, in other words, planes of best focus. The planes of best focus may be contiguous such that the depth of field provided by EDoF imaging system 500 is extended over a range of imaging or conjugate distances, thereby resulting in an extended depth of field imaging system.

For example, for an extended depth of field imaging system including a cubic phase function for modifying the wavefront of electromagnetic energy transmitted therethrough (such as that described in the '371 patent), the monochromatic exit pupil phase function of the resulting imaging system is given by a one-dimensional phase function P(x) as a function of x:

$$P(x)=\exp(j\alpha x^3) \qquad \text{Eq. (5)}$$

within the aperture, where α is a constant and $j=\sqrt{-1}$, and $$P(x)=0 \qquad \text{Eq. (6)}$$

outside of the aperture. That is, the phase modification imposed on the wavefront of incident rays 415 by the combination of optics 410 and phase modifying element 510 in this case is $\alpha x^3$. The second derivative of this phase modification is an expression approximating the focal length across the exit pupil as a function of position:

$$\text{Focal Length} \approx \alpha*6x. \qquad \text{Eq. (7)}$$

In other words, the cubic phase modification provided by the presence of phase modifying element 510 in EDoF imaging system 500 results in an approximately linear focal length change across the exit pupil.

One way to consider the effects of phase modifying element 510 in EDoF imaging system 500 is to regard phase modifying element 510 as being composed of a plurality of small optics segments, such as shown in FIG. 6, with the focal lengths of these lenses linearly changing across the aperture in accordance with the expression α*6x as derived above. In the example shown in FIG. 6, an EDoF imaging system 600 includes a phase modifying element 610, which is formed from a plurality of optics segments 612A-612F. The combination of phase modifying element 610 and optics 410 provides a linearly changing focal length in accordance with the expression α*6x, thereby providing the equivalent extended depth of field effect as that provided by the combination of phase modifying element 510 with optics 410, as shown in FIG. 5, assuming the number of optics segments 612 is large enough so that the height of each of the steps among segments 612A-612F is, for example, on the order of a wavelength or less. In other words, the combination of phase modifying element 610 and optics 410 images over an extended imaging region 620 (as indicated by a bracket) over a range of imaging distances that is equivalent to extended imaging region 520 provided by the combination of phase modifying element 510 and optics 410, as shown in FIG. 5.

While six optics segments 612A-612F are shown in FIG. 6, more or fewer optics segments may be used in a given EDoF imaging system. A designer of an EDoF imaging system may consider optics segments 612A-612F having dimensions on the order of approximately a wavelength of incident illumination of interest, such that a finite number of optics segments would be used in approximating the performance of EDoF imaging system 600. In such a consideration, the EDoF imaging system may be conceptually regarded as partitioning incident rays with optics segments 612A-612F, wherein each optics segment has a focal length that approximately focuses at a particular region along a range of imaging distance. Having extended depth of field means that fewer optics segments may be used to image any one point of an object. Conversely, having a reduced depth of field means that each point of the object is imaged using more of these optics segments. Another way to view this situation is, as more of these optics segments are used to image each point of a given object, then a height of a resulting through-focus modulation transfer function ("MTF") for these object points will increase; on the other hand, as fewer optics segments are used to image each object point, the height of the resulting through-focus MTF for these points will decrease. It should be noted that this description is a simplified, one-dimensional first order approximation of the present system and should be considered illustrative only.

Rather than requiring imaging over a broad range of imaging distances, the multi-region imaging system may be configured to simultaneously image objects located at specific, possibly non-adjacent regions in the object space. For example, these non-adjacent regions may not be contiguous in object space. As a result, a multi-region imaging system may exhibit higher MTF heights and simpler configurations compared to prior imaging systems, as will be further discussed immediately hereinafter.

Consider the multi-region imaging system shown in FIG. 7. Instead of requiring that the combination of optics image objects along a broad range of imaging distances, as shown in FIGS. 5 and 6, each portion of the imaging system aperture is used to image only a specific region in object space. In the example shown in FIG. 7, a multi-region imaging system 700 includes a phase modifying element 710, including a plurality of optics segments 712A-712D. Optics segments 712A and 712B are configured to cooperate with optics 410 so as to image in a near region 720 (as indicated by a bracket) over a range of near imaging distances. Optics segments 712C and 712D are configured to cooperate with optics 410 so as to image in a far region 725 (as indicated by another bracket) over a range of far imaging distances. Certain conjugate distances in object space may fall into a "don't care" region 730 that does not need to be imaged. Due to the finite total MTF limitation described earlier, having distinct object regions and/or "don't care" regions allows higher through-focus MTF heights for those object regions of interest, specifically in near region 720 and far region 725. Viewed another way, multi-region imaging system 700 provides a single imaging system that is equivalent in performance to another system that uses distinct sets of imaging optics for imaging over non-adjacent, narrow regions in object space. Like phase modifying element 610 (FIG. 6) being broken up into six segments 612A-612F, phase modifying element 710 is shown as segments 712A-712F for illustrative purposes only. That is, phase modifying element 710 may have other configurations, such as curved segments or a continuous aspheric surface.

Still referring to FIG. 7, multi-region imaging system 700 is configured such that the upper half of the aperture (i.e., optics segments 712A and 712B) may be used to image one region in object space and the lower half (i.e., optics segments 712C and 712D) may be used to image another region in object space. While optics segments 712A and 712B are shown as being split into the upper and lower halves of the aperture, it is recognized herein that other configurations are also possible. The corresponding multi-region exit pupil phase may be expressed as:

$$\text{Phase multi-region}(x) = \alpha x^3 + \text{Lower}(x)\beta x^2, \qquad \text{Eq. (8)}$$

where the $\alpha x^3$ term corresponds to a cubic phase term. The term Lower(x) equals zero for the upper half of the aperture (i.e., optics segments 712A and 712B), and unity for the lower half of the aperture (i.e., optics segments 712C and 712D). The term $\beta x^2$ is a focusing or optical power term. The constants $\alpha$ and $\beta$ may be specified by the designer for a specific system. Comparing the above expression with the phase function for the cubic phase modification given by Eqs. (5) and (6), the expression for multi-region phase contains an extra Lower(x)/$\beta x^2$ term, which is specific to a particular section of the aperture.

Figure 8:
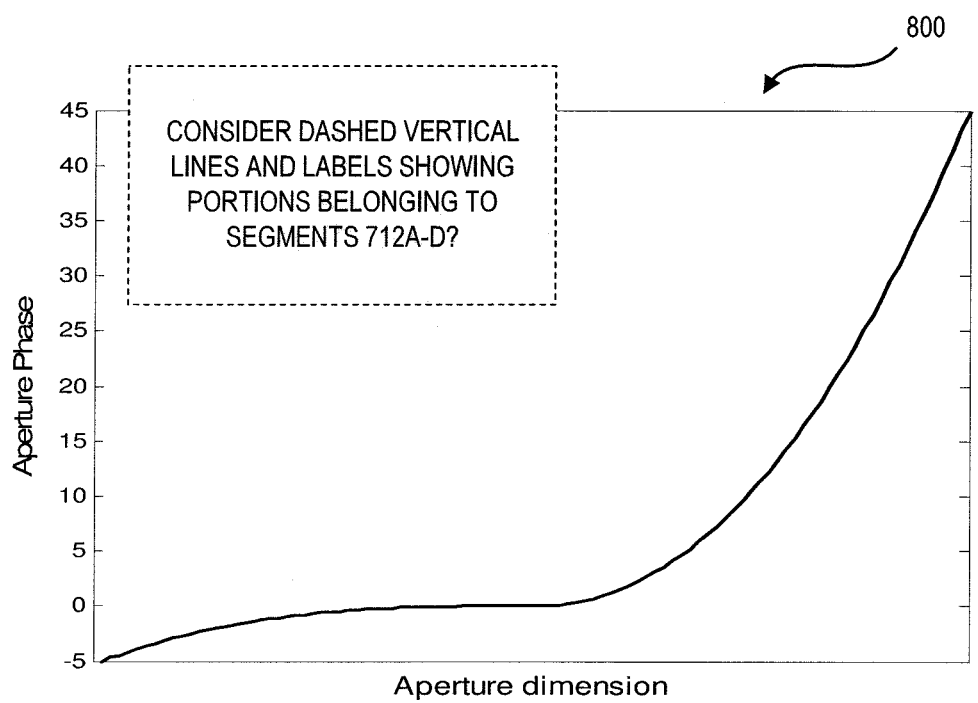
FIG. 8 shows a plot of an exemplary one-dimensional exit pupil phase profile, in accordance with an embodiment.

FIG. 8 shows a plot 800 of an exemplary one-dimensional exit pupil phase profile, in accordance with the above multi-region exit pupil phase expression of Eq. (8), with $\alpha=5$ and $\beta=40$. The vertical axis represents aperture phase in radians, while the horizontal axis shows aperture dimension x in arbitrary units. As may be seen in FIG. 7, the aperture phase is zero or less for the upper half of the aperture (i.e., through optics segments 712A and 712B), while the lower half of the aperture (i.e., optics segments 712C and 712D) provides position-dependent phase modification.

Figure 9:
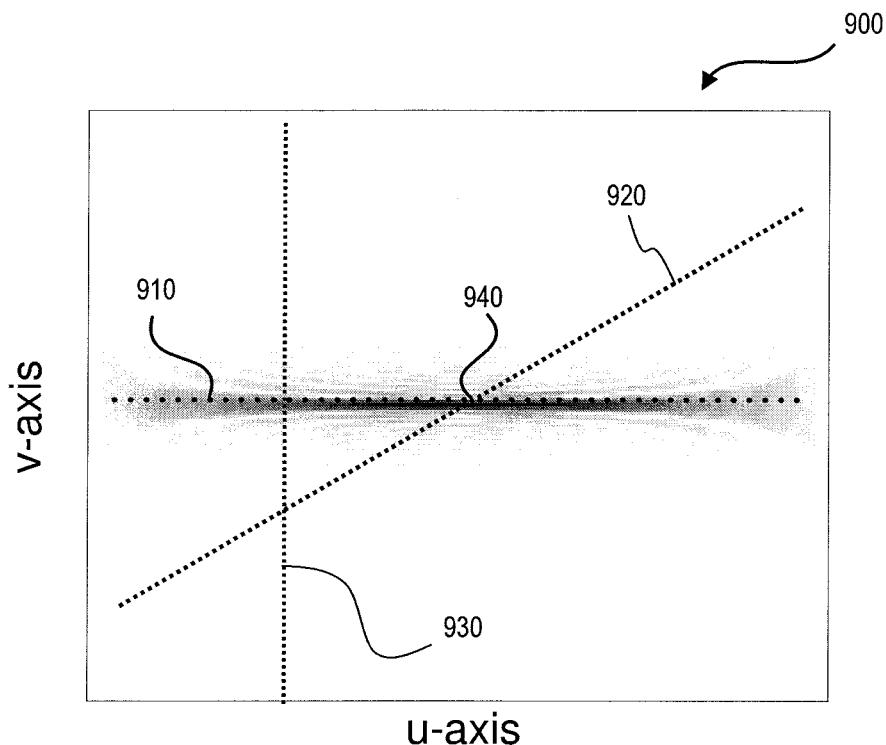
FIG. 9 shows a plot of an ambiguity function for a diffraction-limited imaging system.

An ambiguity function ("AF") plot 900 related to a diffraction-limited imaging system, such as that exemplified by FIG. 4, is shown in FIG. 9. The horizontal axis ("u-axis") in plot 900 represents spatial frequency analogous to the spatial frequency axis of an MTF plot. As is known in the art of AF analysis, the vertical axis ("v-axis") has no direct relationship to the physical imaging system, but the projection of radial slices of the AF onto the horizontal axis may be interpreted as the MTF of this imaging system for varying amounts of misfocus. As is known in the art of AF analysis, darker shades in FIG. 9 represent higher MTF values. In other words, radial cross-sectional slices of the AF yield MTF curves for different values of misfocus and spatial frequency. As is well known in the art, the AF represents a polar display of the MTF as a function of misfocus, and radial lines through an origin 940 of AF plot 900 represent the MTF at varying degrees of misfocus. A radial line with zero slope (e.g., dotted line 910) corresponds to MTF at zero misfocus, radial lines with increasing slopes (e.g., dotted line 920) correspond to the MTF at increasing misfocus, and a vertical line (e.g., dotted line 930) through AF plot 900 corresponds to the through-focus MTF at a particular spatial frequency u. It may be noted that the diffraction-limited AF, as represented by plot 900, is narrow in the vertical direction, thereby indicating high sensitivity of the resulting MTF to misfocus; that is, away from the horizontal radial line corresponding to a zero misfocus value (i.e., dotted line 910), the MTF curves corresponding to AF plot 900 exhibit very sharp peaks with low MTF values away from the sharp peaks, thereby indicating poor imaging quality outside of a very narrow conjugate distance range.

Figure 10:
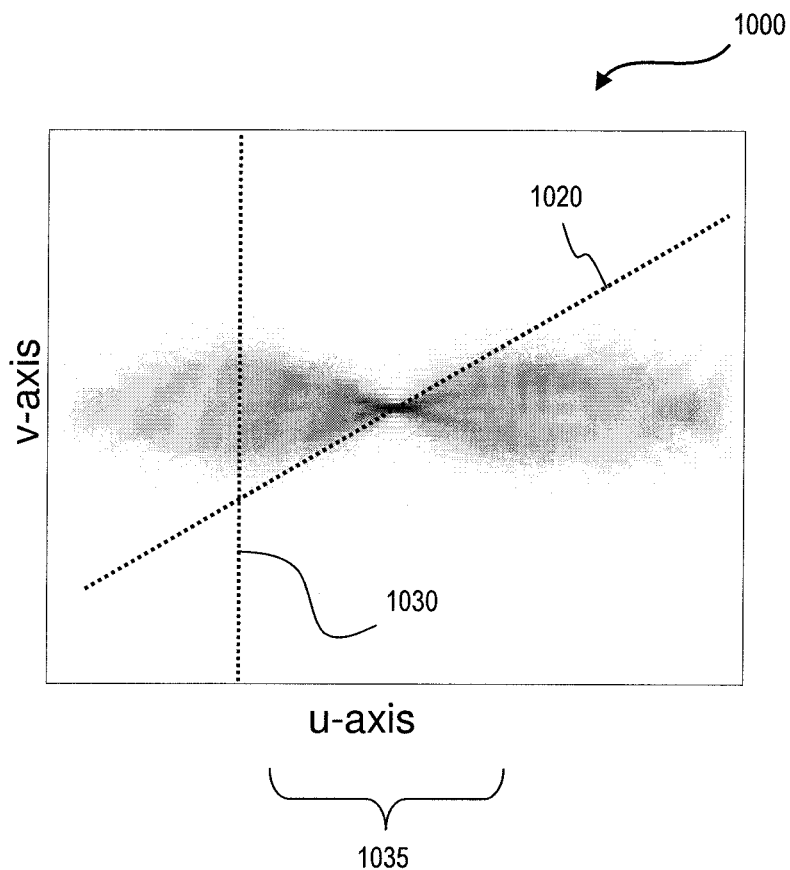
FIGS. 10 and 11 show plots of ambiguity functions for a cubic phase imaging system and a multi-region imaging system, respectively, in accordance with an embodiment.
Figure 11:
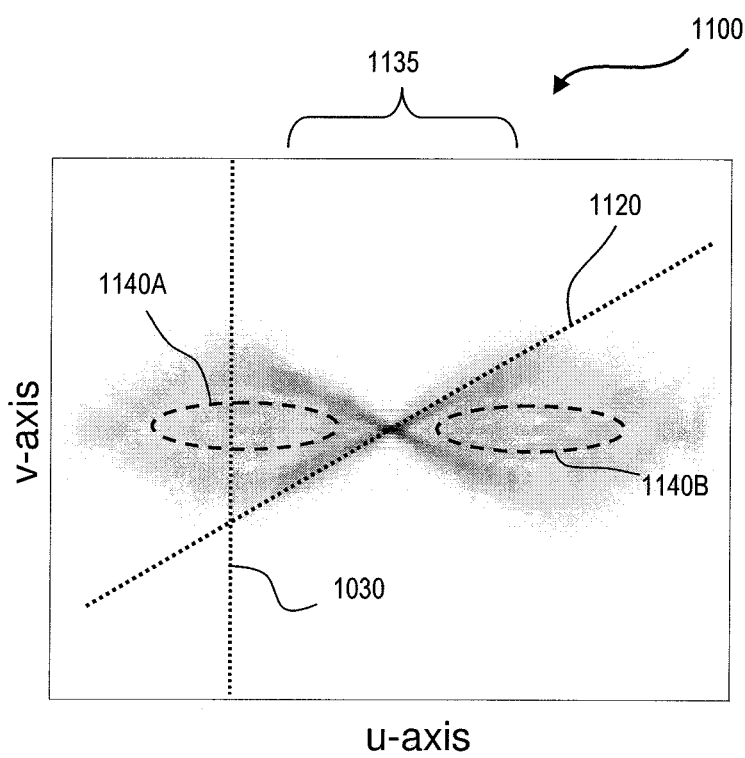

FIGS. 10 and 11 show AF plots 1000 and 1100 for a cubic phase imaging system with $\alpha=10$ (such as, for example, that shown in FIG. 4 and in accordance with Eqs. (5) and (6)) and for a multi-region imaging system with $\alpha=5$ and $\beta=40$ (e.g., that shown in FIG. 7 and in accordance with Eq. (8)), respectively. In FIG. 10, a slanted radial line 1020 corresponds to the MTF at non-zero misfocus for the cubic phase imaging system, and a vertical line 1030 corresponds to the through-focus MTF at a particular spatial frequency. Similarly, in FIG. 11, a slanted radial line 1120 corresponds to the MTF at non-zero misfocus for the multi-region imaging system, and a vertical line 1130 corresponds to the through-focus MTF at a particular spatial frequency. It may be seen that, in contrast to the diffraction-limited imaging system AF plot of FIG. 9, both the cubic phase imaging system and the multi-region imaging system exhibit ambiguity functions with broader dark regions in the vertical direction, corresponding to higher MTF values; that is, rather than a narrow dark line at the zero slope as in AF plot 900, AF plots 1000 and 1100 include broader shaded sections in a horizontal bowtie shape, indicative of higher values over a broader MTF peak corresponding to AF plots 1000 and 1100. In other words, the AF plots of FIGS. 10 and 11 indicate that these imaging systems exhibit good imaging quality even with non-zero misfocus values. It is known that an ambiguity function represents optical MTF, and a system's sensor array spatial frequency limit is typically half or less than the system's optical limit; the extent of a typical spatial frequency extent for a digital sensor array is indicated by brackets 1035 and 1135 in FIGS. 10 and 11, respectively. Furthermore, AF plot 1100 corresponding to the multi-region imaging system exhibits two clear regions of best focus separated by a "don't care" region (indicated by two dashed ovals 1140A and 1140B).

A number of variations to the multi-region imaging system are possible. While the example illustrated in FIGS. 7 and 11 assumed a rectangularly separable exit pupil phase, other types of phase modification such as, but not limited to, circularly symmetric phase, symmetric phase or non-symmetric exit pupil phase may also be used, according to a desired application. The use of polychromatic (that is, wavelength-dependent) exit pupil phase design is also possible, and the phase modification may be effected by, for instance, phase modulating optics with sub-wavelength features. Alternatively, the phase modification may be implemented using polarization-dependent optical elements.

Figure 12:
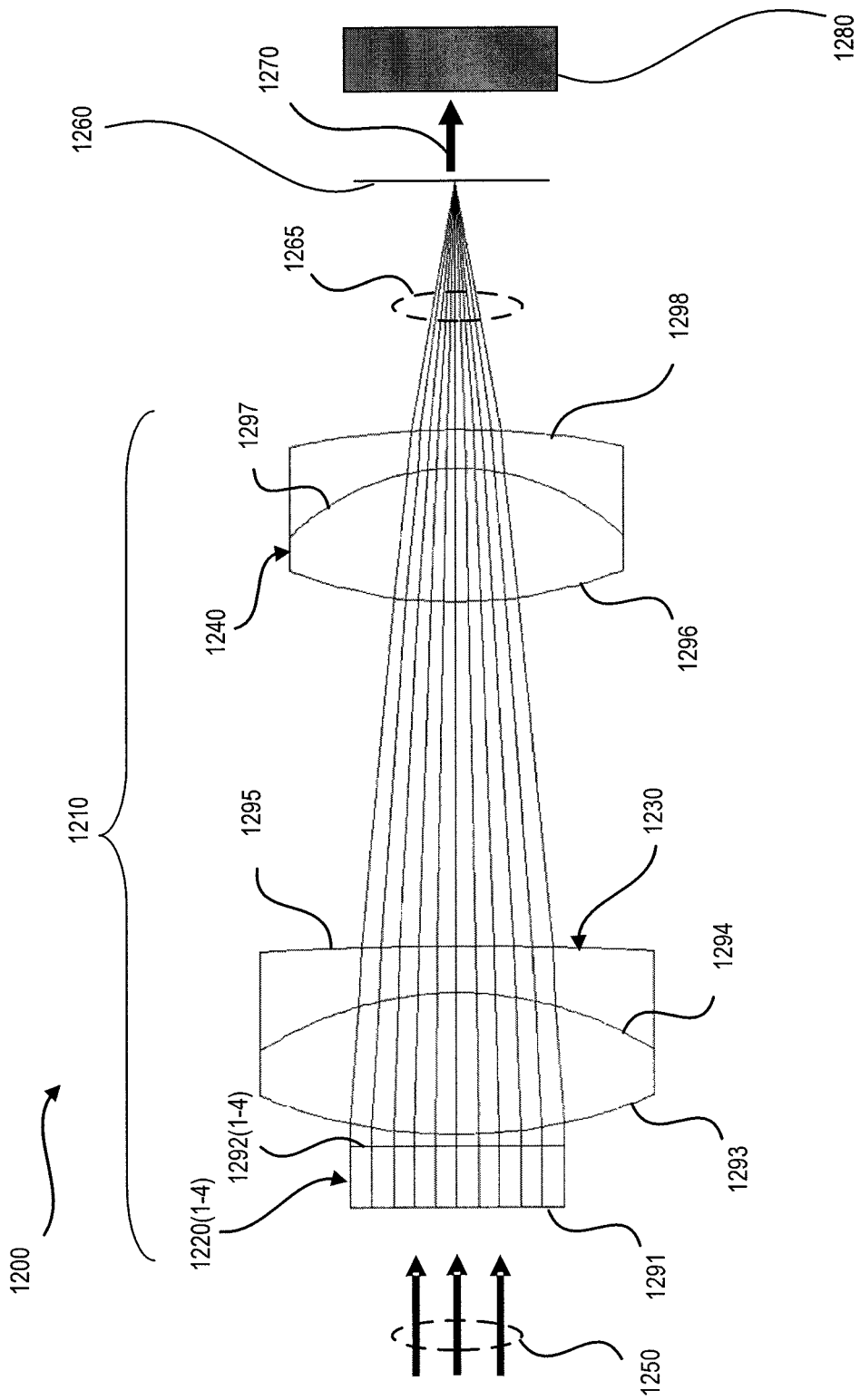
FIG. 12 shows a block diagram of an exemplary imaging system, in accordance with an embodiment.

FIG. 12 shows a block diagram of an exemplary multi-region imaging system 1200. FIG. 12 is a particular example of the general multi-region imaging system block diagram as shown in FIG. 3. Multi-region imaging system 1200 includes an optics group 1210, which in turn includes a plano/aspheric element 1220(1) at the front of the imaging system, and first and second K5/F2 doublets 1230 and 1240, respectively. Plano/aspheric element 1220(1) may be formed of, for example, poly(methyl methacrylate) ("PMMA"). Plano/aspheric element 1220(1) has an aspheric surface 1292(1), described below; related optical systems utilizing a plano/plano element 1220(2) or modified plano/aspheric elements 1220(3) or 1220(4) in place of element 1220(1) are also described further below. Optics group 1210 is configured to direct incident rays 1250 toward a sensor array 1260. Sensor array 1260 may be, but is not limited to, a complementary metal oxide semiconductor ("CMOS") or charge coupled device ("CCD") sensor array configured for receiving a portion 1265 of incident rays 1250, and for generating image data 1270 (represented by a dark arrow) in response thereto. Image data 1270 may then be received at a processor 1280 for image processing to form, for instance, a human-viewable image and/or a processing result for a task, such as bar code reading. The image processing may utilize information of optics group 1210 to form the human-viewable image and/or the processing result so as to form images that are sharp and clear in best focus regions of a scene imaged thereby, as discussed below.

TABLE 1

| Surface | Type | Radius | Thickness | Glass | Diameter | Conic |
|---|---|---|---|---|---|---|
| Object | Standard | Infinity | Infinity | | 0 | 0 |
| 1291 | Standard | Infinity | 0.3804 | PMMA | 1.347194 | 0 |
| 1292(1)/Stop | Evenasph | Infinity | 0.007652431 | | 1.347194 | 0 |
| 1293 | Standard | 3.285444 | 0.8864066 | K5 | 2.48704 | 0 |
| 1294 | Standard | −2.354398 | 0.2933432 | F2 | 2.48704 | 0 |
| 1295 | Standard | −28.18008 | 2.168189 | | 2.48704 | 0 |
| 1296 | Standard | 2.883053 | 0.8417674 | K5 | 2.104418 | 0 |
| 1297 | Standard | −1.508167 | 0.242327 | F2 | 2.104418 | 0 |
| 1298 | Standard | −5.335657 | 1.551752 | | 2.104418 | 0 |
| Image | Standard | Infinity | | | 0.0004286271 | 0 |

An exemplary prescription for the various optical surfaces for multi-region imaging system 1200 of FIG. 12 is summarized in TABLE 1, with the different surfaces (i.e., surfaces 1291 through 1298) as labeled in FIG. 12. A radius of curvature value of "infinity" corresponds to a plano surface. Prescription details related to plano/aspheric element 1220 are further discussed immediately hereinafter in the following two examples.

Figure 13:
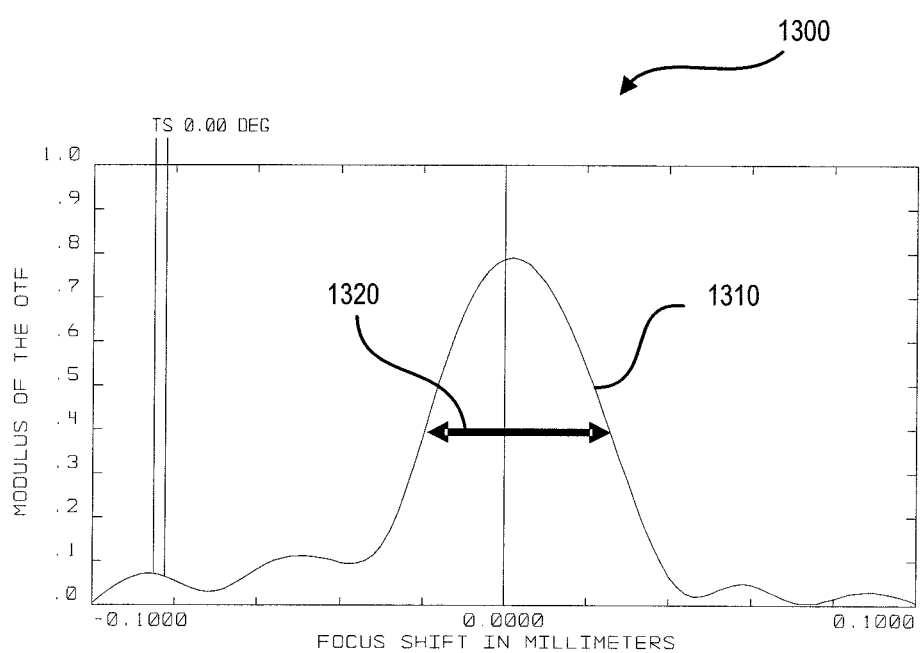
FIG. 13 shows a plot of a through-focus MTF curve for the exemplary imaging system of FIG. 12 without a specialized phase surface.

When the multi-region imaging system described in reference to FIG. 12 and TABLE 1 is modified by replacing plano/aspheric element 1220(1) with a plano/plano element 1220(2) (e.g., element 1220(2) has a second surface 1292(2) with no curvature) providing no phase modulation, then optics group 1210 produces a through-focus MTF curve 1300 at a spatial frequency of 100 line pairs per millimeter ("lp/mm"), as shown in FIG. 13. The resulting imaging system is essentially a traditional imaging system without phase modification or multi-region imaging characteristics. As expected, through-focus MTF curve 1300 exhibits a single best focus peak 1310 with a peak height of approximately 0.8 in normalized units and a narrow peak width 1320 (indicated by a double-headed arrow) and, consequently, a narrow depth of focus.

TABLE 2

| SURFACE 1292(1) | EVENASPH |
|---|---|
| Coefficient on r2 | 0 |
| Coefficient on r4 | 0.012940072 |
| Coefficient on r6 | 0.33257242 |
| Coefficient on r8 | −1.4950249 |
| Coefficient on r10 | −0.26830899 |
| Coefficient on r12 | 8.0415913 |
| Coefficient on r14 | −8.6162206 |

Figure 14:
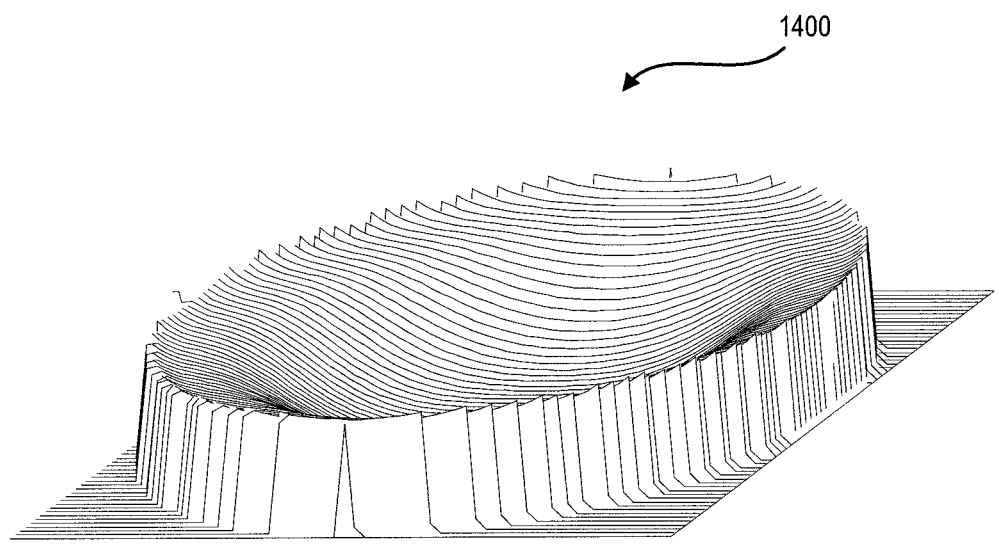
FIG. 14 shows a surface sag plot of one example of design of an aspheric surface of the imaging system of FIG. 12, in accordance with an embodiment.
Figure 15:
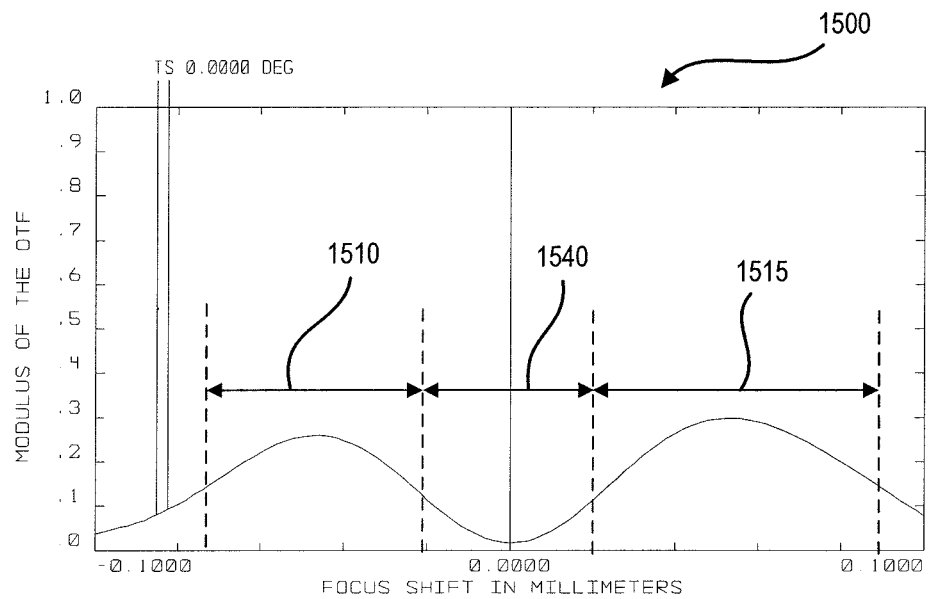
FIG. 15 shows a plot of a through-focus MTF curve for the exemplary imaging system of FIG. 12, this time including the aspheric surface specified in FIG. 14, in accordance with an embodiment.

FIG. 14 shows an exemplary aspheric surface 1400 suitable for use as surface 1292(1) of plano/aspheric element 1220(1) in multi-region imaging system 1200 of FIG. 12. Aspheric coefficients corresponding to aspheric surface 1400 are summarized in TABLE 2. With the inclusion of aspheric surface 1400 as surface 1292(1) in optics group 1210, a through-focus MTF curve 1500, as shown in FIG. 15, results at a spatial frequency of 100 lp/mm. Through-focus MTF curve 1500 includes first and second best focus regions 1510 and 1515, respectively, and a "don't care" region 1540, that is, through-focus MTF curve 1500 indicates that there is more than one region of focus shifts that correspond to best focus (two regions, in this example). It is understood that each region of best focus corresponds to an object distance range, that is, a range of distance of an object from the multi-region imaging system (e.g., distances of objects 330 and 335 from multi-region optics 310, FIG. 3).

All of regions 1510, 1515 and 1540 are indicated by double headed arrows within dashed vertical lines, although it will be appreciated that the boundaries of each region may not be sharply defined. In FIG. 14, since they are separated by region 1540, regions 1510 and 1515 correspond to object distance ranges that are discontiguous. In relation to the example shown in FIG. 1, first best focus region 1510 may correspond to near field imaging of, for example, barcode 30 or a business card (e.g., a conjugate distance of ~13 to 18 cm), while second best focus region 1515 may correspond to far field imaging used for human viewed portrait imaging (e.g., a conjugate distance of ~60 cm or greater, such that best focus regions 1510 and 1515 are separated by 40 cm or more). The peak heights of through-focus MTF curve 1500 in first and second best focus regions 1510 and 1515 are both approximately 0.27 in this example, although the peak heights may be adjusted through modification of surface 1292(1), according to the specific application. While the through-focus MTF values in "don't care" region 1540 do not need to be low, the reduced through-focus MTF values in "don't care" region contributes to increased through-focus MTF values in first and second best focus regions 1510 and 1515, respectively, due to the principle of conservation of ambiguity. Also, although the shapes of first and second peaks 1510 and 1515, respectively, are shown as being similar, the peak heights and widths of the first and second peaks may be tailored to meet the specific needs of a given application.

Figure 16:
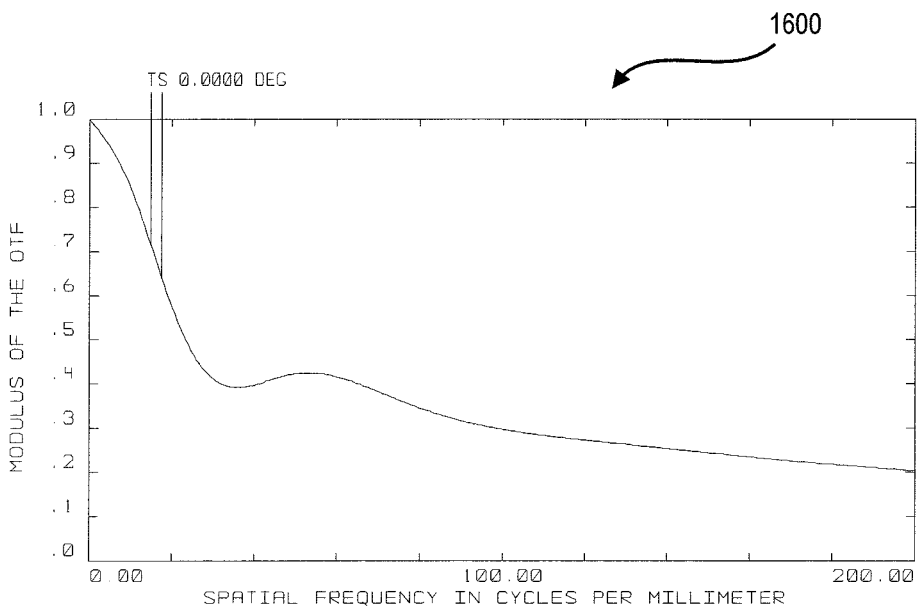
FIGS. 16-19 show polychromatic MTF curves for the system of FIG. 12 including the aspheric surface of FIG. 14 at different conjugate distances, in accordance with an embodiment.
Figure 17:
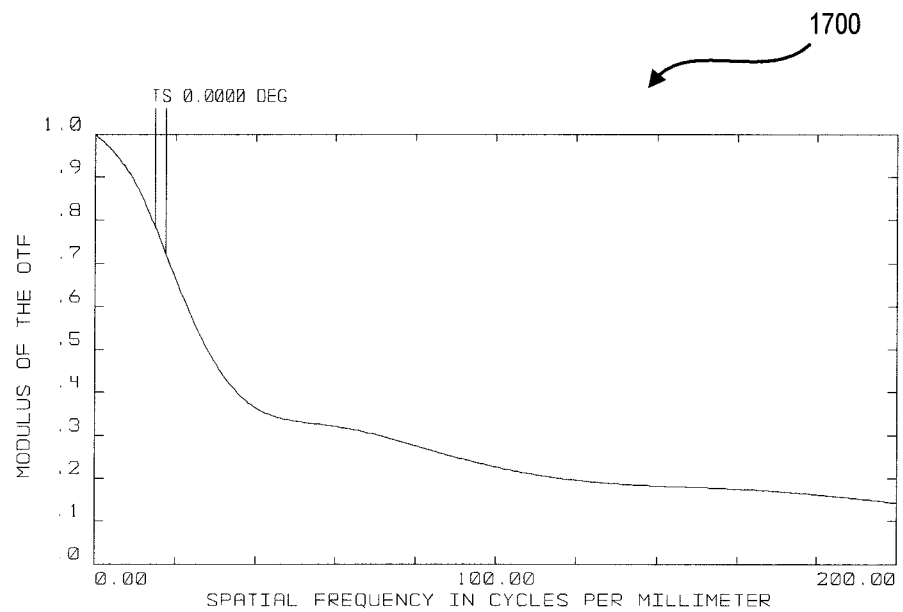
Figure 18:
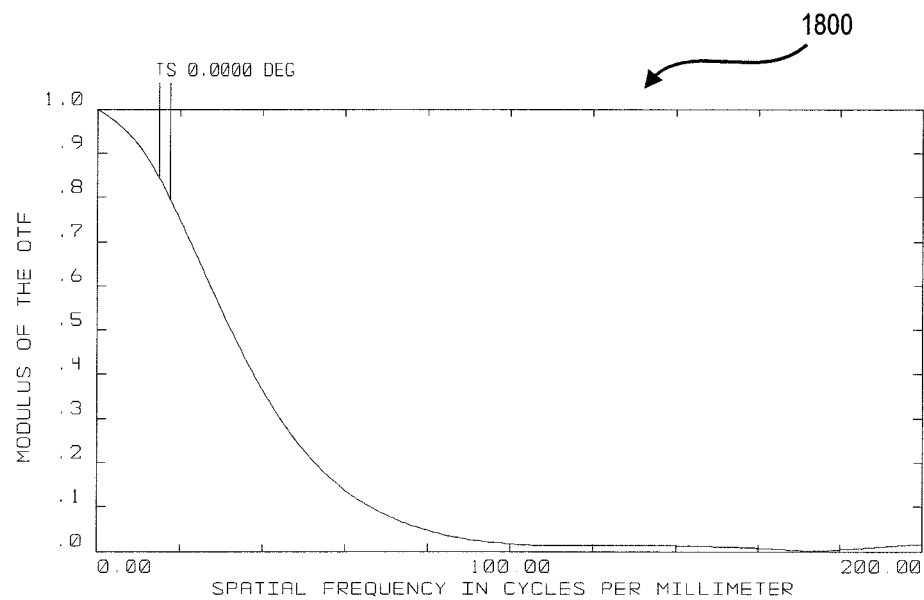
Figure 19:
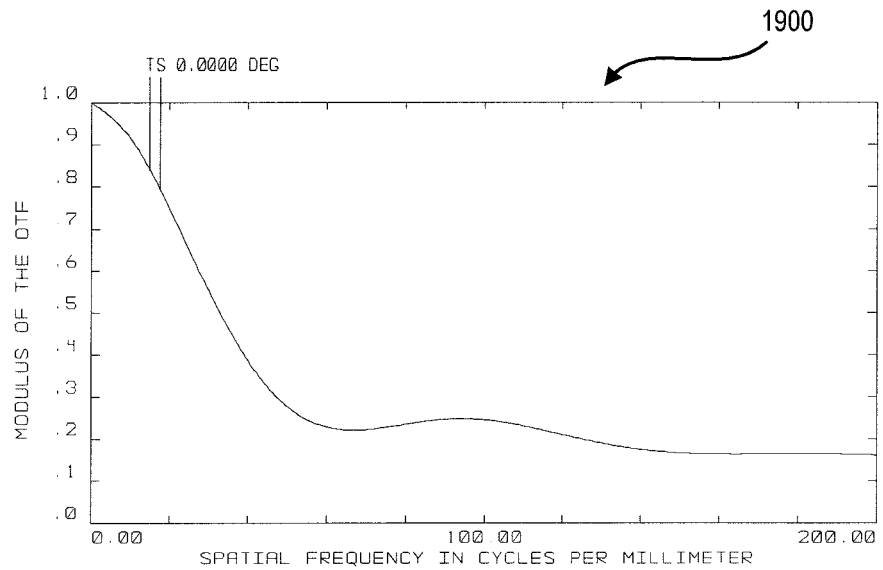

FIGS. 16-19 show diffraction MTF curves for polychromatic (e.g., white) light for optics group 1210 in multi-region imaging system 1200 of FIG. 12, including aspheric surface 1400 of FIG. 14 as surface 1292(1), at different conjugate distances. FIG. 16 shows an MTF curve 1600 for a conjugate distance of infinity, and FIG. 17 shows an MTF curve 1700 for a conjugate distance of 60 cm. It may be noted that the values of MTF curves 1600 and 1700 are quite high through the range of spatial frequencies shown in FIGS. 16 and 17, thereby indicating that multi-region imaging system 1200 exhibits a high MTF value throughout the far field imaging region at conjugate distances of 60 cm or greater (e.g., corresponding to region 1515, FIG. 15). FIG. 18 shows an MTF curve 1800 for a conjugate distance of 25 cm (i.e., in "don't care" region 1540, FIG. 15, between near field and far field); it may be seen that MTF curve 1800 drops off quickly for spatial frequencies above ~30 or 40 cycles per millimeter, thereby indicating poor image quality in this "don't care" region. Finally, FIG. 19 shows an MTF curve 1900 for a conjugate distance of 15 cm (e.g., corresponding to region 1510, FIG. 15), which is suitable for near field imaging application such as barcode imaging and business card reading. As may be seen in FIG. 19, MTF curve 1900 exhibits relatively high MTF values (e.g., ~0.2 and higher) throughout the spatial frequency region of interest, thereby indicating good imaging performance even at this near field conjugate distance for the multi-region imaging system including optics group 1210.

Figure 20:
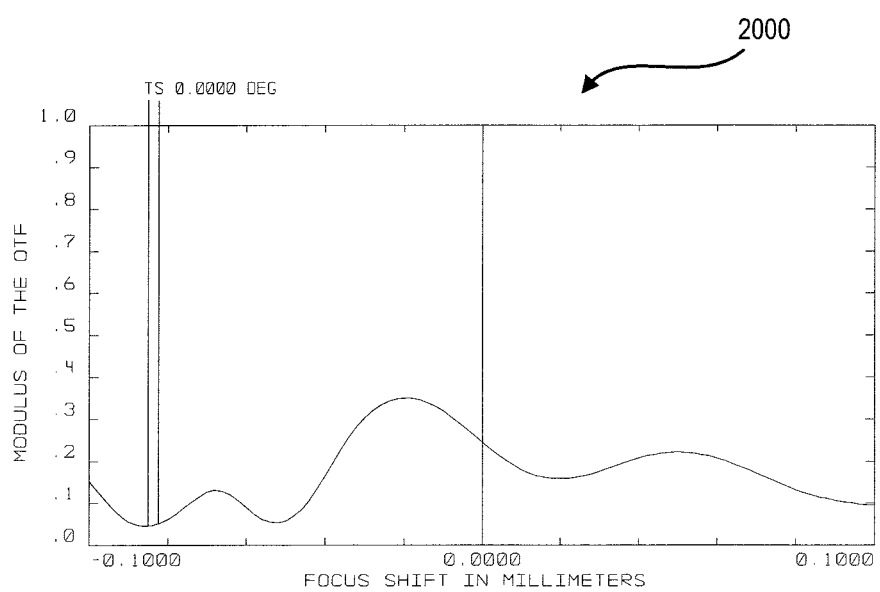
FIGS. 20-24 include polychromatic MTF curves of the same system as those related to FIGS. 16-19, but which has been optimized to also provide adequate imaging at 25 cm conjugate distance, in accordance with an embodiment.
Figure 21:
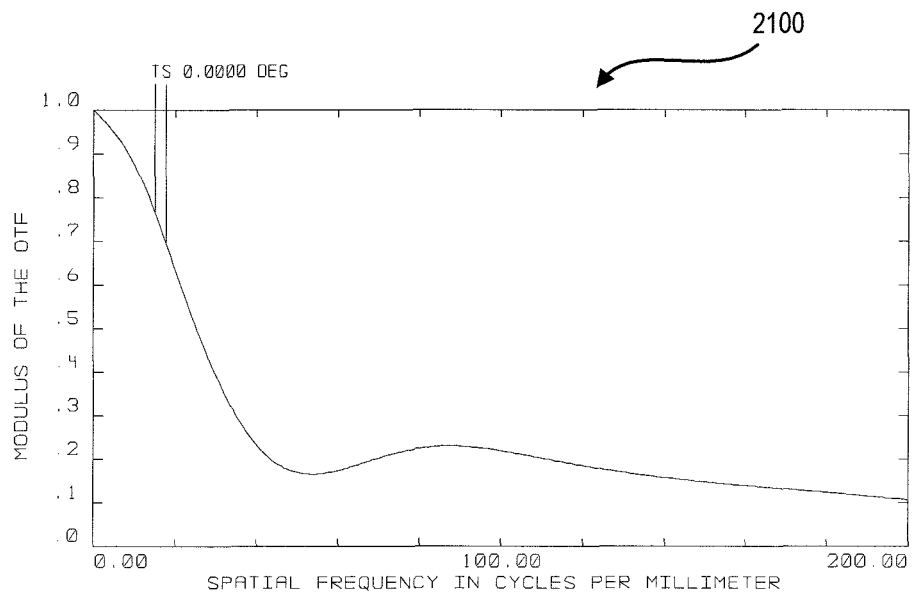
Figure 22:
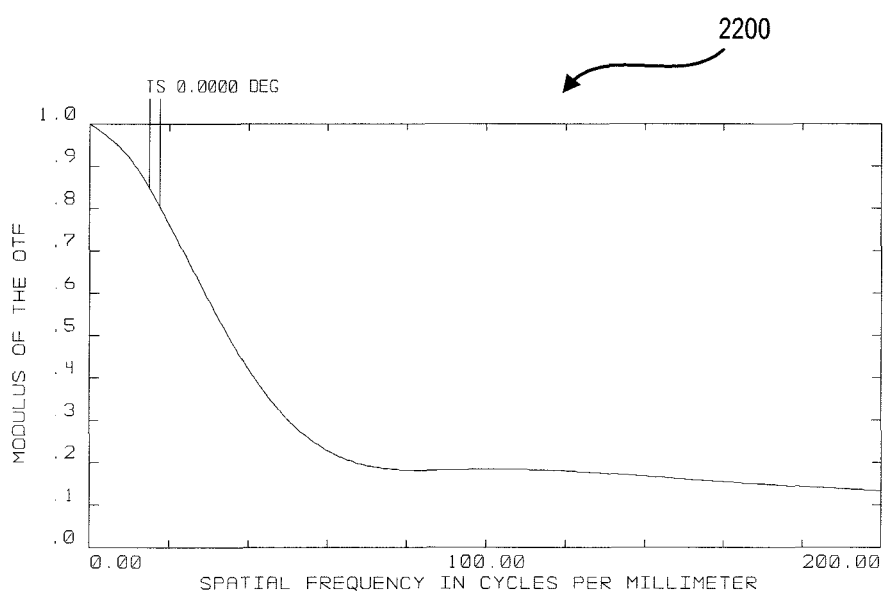
Figure 23:
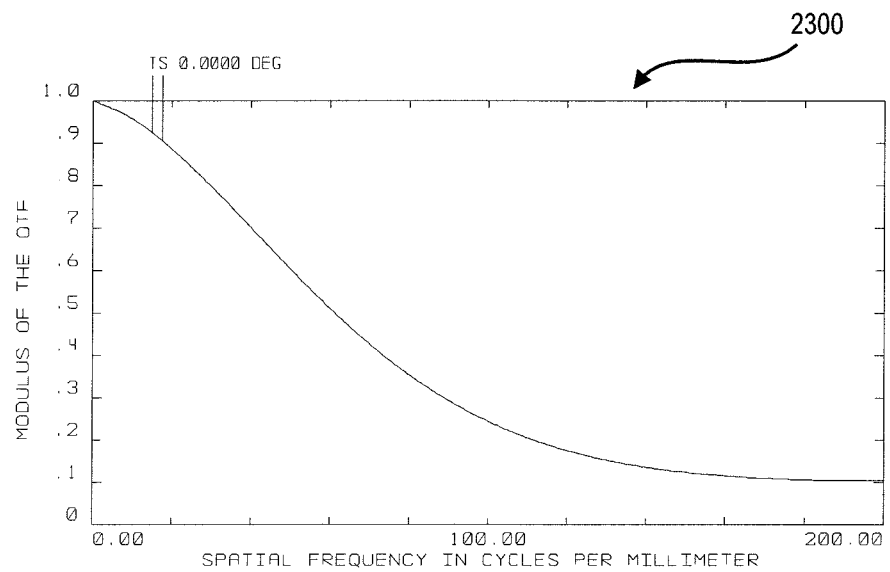
Figure 24:
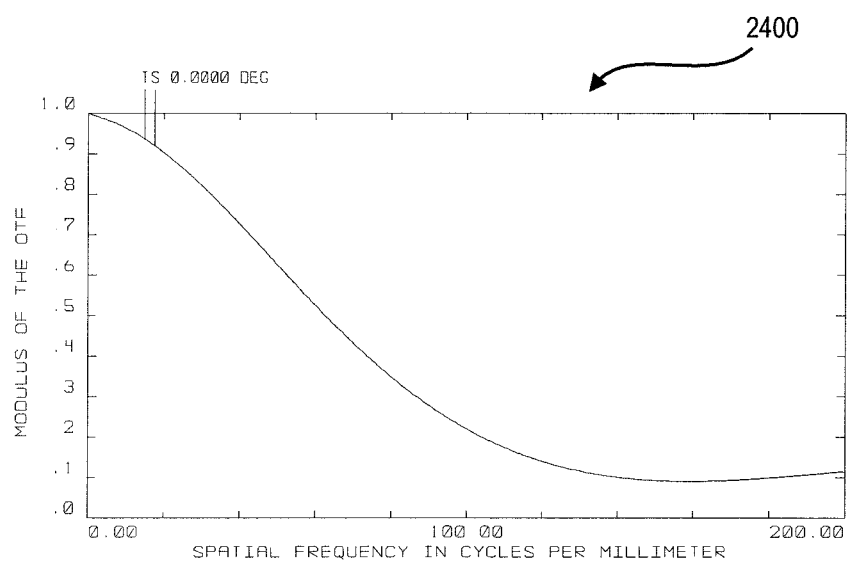

FIG. 20 shows a through-focus MTF curve 2000, at a spatial frequency of 100 lp/mm, for an alternative imaging system that has been optimized to provide better imaging performance at 25 cm conjugate distance compared to that of the multi-region imaging system whose through-focus MTF curve is shown in FIG. 15. That is, the alternative imaging system essentially includes the components of multi-region imaging system 1200 of FIG. 12 but with a prescription that is summarized in TABLES 3 and 4. The alternative imaging system includes a plano/aspheric element 1220(3), having a second surface 1292(3) with aspheric coefficients summarized in TABLE 4, to provide better imaging performance at 25 cm conjugate distance. It may be noted that through-focus MTF curve 2000 for the alternative multi-region imaging system includes multiple, wide humps rather than a single narrow peak or two distinct peaks as in the previously discussed embodiments. Further differences in system performance may be seen by comparing the polychromatic diffraction MTF curves shown in FIGS. 21-24, for the alternative multi-region imaging system, with those shown in FIGS. 16-19, corresponding to the performance of optics group 1210 of multi-region imaging system 1200 including aspheric surface 1400 as surface 1292(1). FIG. 21 shows an MTF curve 2100 for a conjugate distance of infinity, FIG. 22 shows an MTF curve 2200 for a conjugate distance of 60 cm, FIG. 23 shows an MTF curve 2300 for a conjugate distance of 25 cm, and FIG. 24 shows an MTF curve 2400 for a conjugate distance of 15 cm. In comparing FIGS. 21-24 with earlier described FIGS. 16-19, it may be seen that the MTF curves for the alternative imaging system, while providing slightly better performance at 25 cm, are generally lower across the portrait and barcode regions.

TABLE 3

| Surface | Type | Radius | Thickness | Glass | Diameter | Conic |
|---|---|---|---|---|---|---|
| Object | Standard | Infinity | Infinity | | 0 | 0 |
| 1291 | Standard | Infinity | 0.3804 | PMMA | 1.347194 | 0 |
| 1292/Stop | Evenasph | Infinity | 0.07652431 | | 1.347194 | 0 |
| 1293 | Standard | 3.285444 | 0.8864066 | K5 | 2.48704 | 0 |
| 1294 | Standard | −2.354398 | 0.2933432 | F2 | 2.48704 | 0 |
| 1295 | Standard | −28.18008 | 2.168189 | | 2.48704 | 0 |
| 1296 | Standard | 2.883053 | 0.8417674 | K5 | 2.104418 | 0 |
| 1297 | Standard | −1.508167 | 0.242327 | F2 | 2.104418 | 0 |
| 1298 | Standard | −5.335657 | 1.487967 | | 2.104418 | 0 |
| Image | Standard | Infinity | | | 0.05080852 | 0 |

TABLE 4

| SURFACE 1292(3) | EVENASPH |
|---|---|
| Coefficient on r2 | 0 |
| Coefficient on r4 | −0.03062278 |
| Coefficient on r6 | 0.0042801507 |
| Coefficient on r8 | 0.043959156 |
| Coefficient on r10 | 0.10487482 |
| Coefficient on r12 | −0.073525074 |
| Coefficient on r14 | −0.32282005 |

TABLE 5

| SURFACE 1292(4) | CUSPLINE |
|---|---|
| Z at 1/8 of S-D | −0.0010485351 |
| Z at 2/8 of S-D | −0.0010594568 |
| Z at 3/8 of S-D | −0.00082374686 |
| Z at 4/8 of S-D | −0.00057644724 |

TABLE 5-continued

| SURFACE 1292(4) | CUSPLINE |
|---|---|
| Z at 5/8 of S-D | 0 |
| Z at 6/8 of S-D | 0 |
| Z at 7/8 of S-D | 0 |
| Z at 8/8 of S-D | 0 |

Figure 25:
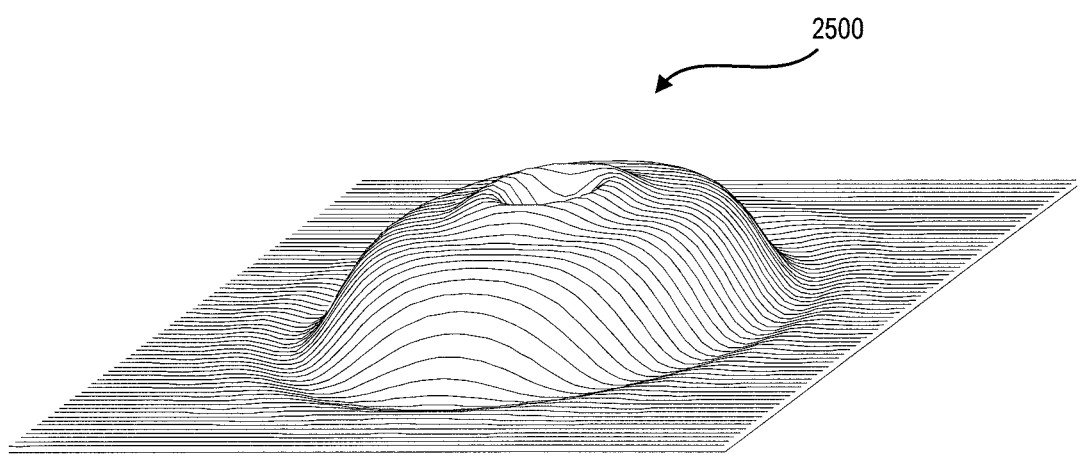
FIG. 25 illustrates another example of an aspheric surface suitable for use in the system of FIG. 12, in accordance with an embodiment.

FIG. 25 illustrates another example of an aspheric surface 2500 suitable for use as surface 1292(4) of plano/aspheric element 1220(4) of multi-region imaging system 1200 as shown in FIG. 12. Aspheric terms describing aspheric surface 2500 are summarized in TABLE 5, where the variables are areas of zone and surface forms within each zone; that is, "Z" is the surface height, "S-D" stands for "surface diameter", and "CUSPLINE" stands for cubic spline. Aspheric surface 2500 may be generally described as a cubic spline over eight regions (divided radially) of an aperture of plano/aspheric element 1220(4). It may be seen that approximately half of aspheric surface 2500 near an outer radius is purposely set to provide zero phase; that is, no new phase is added by plano/aspheric element 1220(4) in approximately one-half of the radius of aspheric surface 2500. In contrast to aspheric surface 1400 of FIG. 14, which is configured for providing a phase modification across an aperture of aspheric surface 1400, aspheric surface 2500 is instead configured to provide a phase contour in a center portion.

Figure 26:
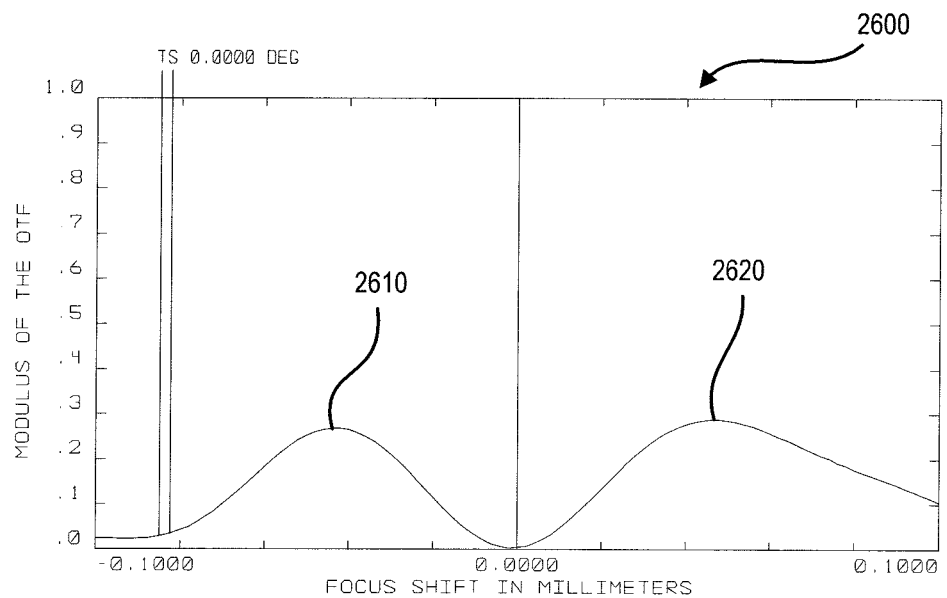
FIG. 26 shows the through-focus MTF for an imaging system of FIG. 12 modified to utilize the surface of FIG. 25, in accordance with an embodiment.

FIG. 26 shows a through-focus MTF curve 2600 for optics group 1210 modified with aspheric surface 2500 implemented as surface 1292(4) of plano/aspheric element 1220. Through-focus MTF curve 2600 shows that this system performs as a multi-region imaging system by exhibiting first and second peaks 2610 and 2620, respectively, thereby indicating the system provides good imaging performance for two discontiguous object distance ranges. It may be noted that, while aspheric surfaces 1400 and 2500 of FIGS. 14 and 25, respectively, appear to be very different in shape, the resulting through-focus MTF curves (as shown in FIGS. 15 and 26) are quite similar.

Figure 27:
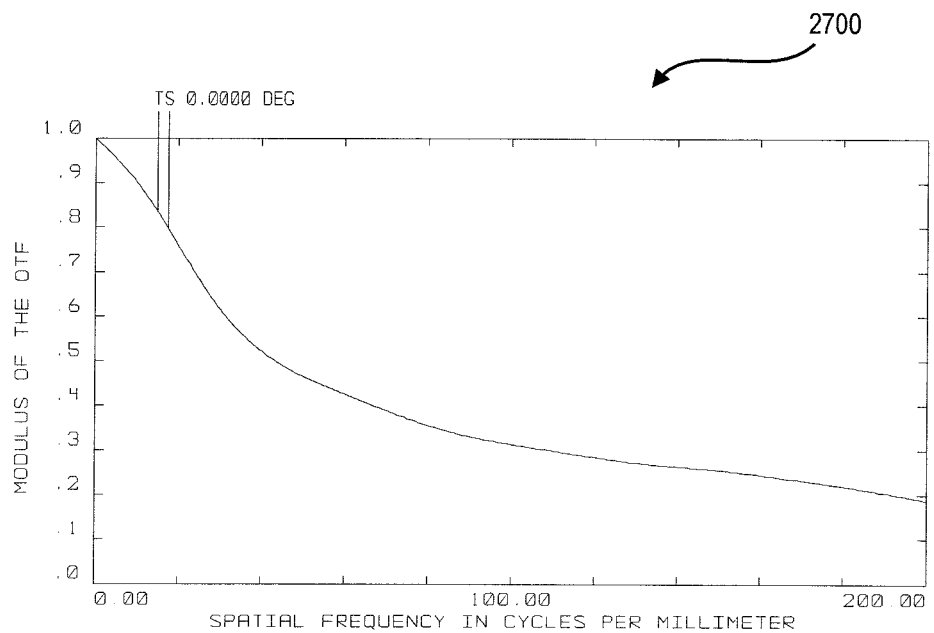
FIGS. 27-30 show polychromatic MTF curves related to the system of FIG. 12 utilizing the surface of FIG. 25, in accordance with an embodiment.
Figure 28:
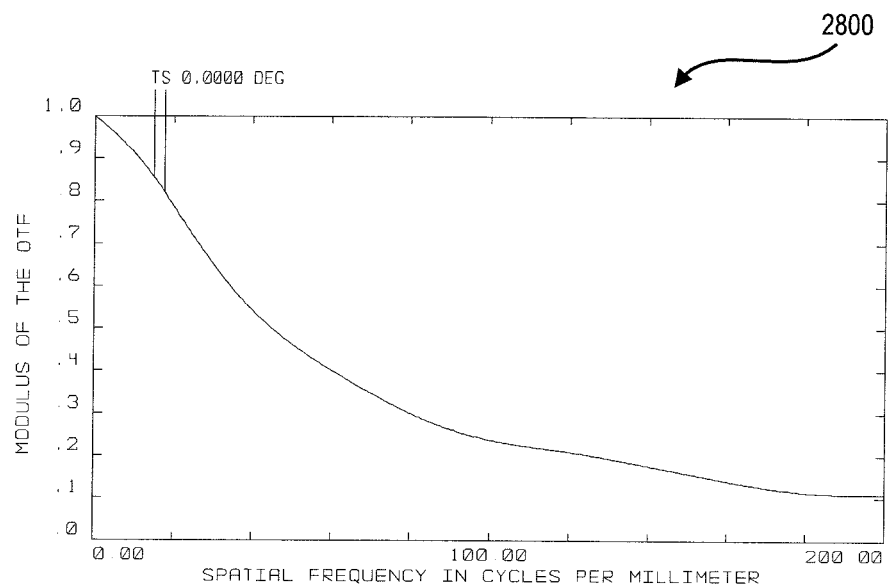
Figure 29:
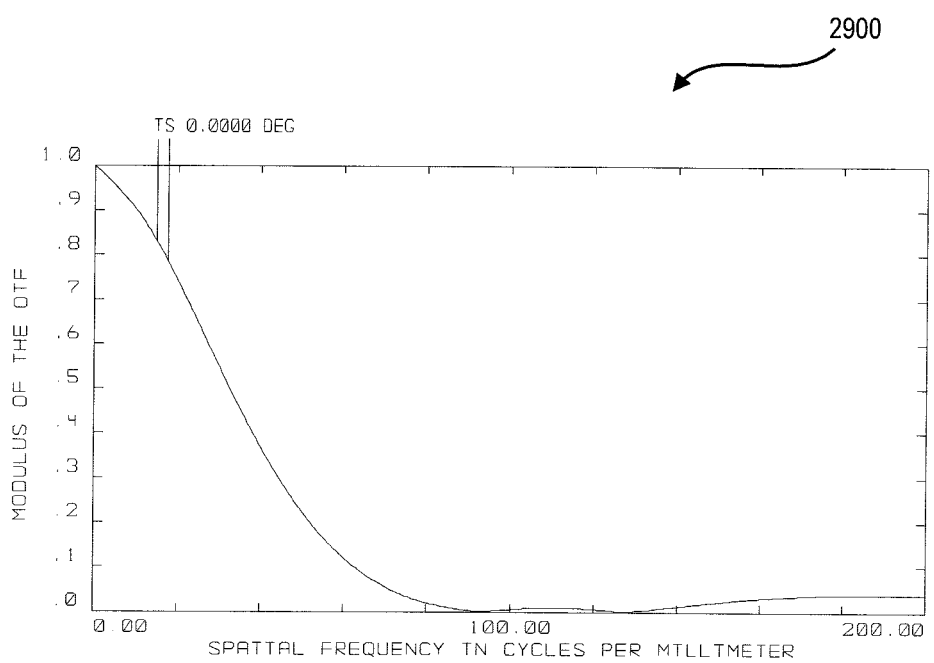
Figure 30:
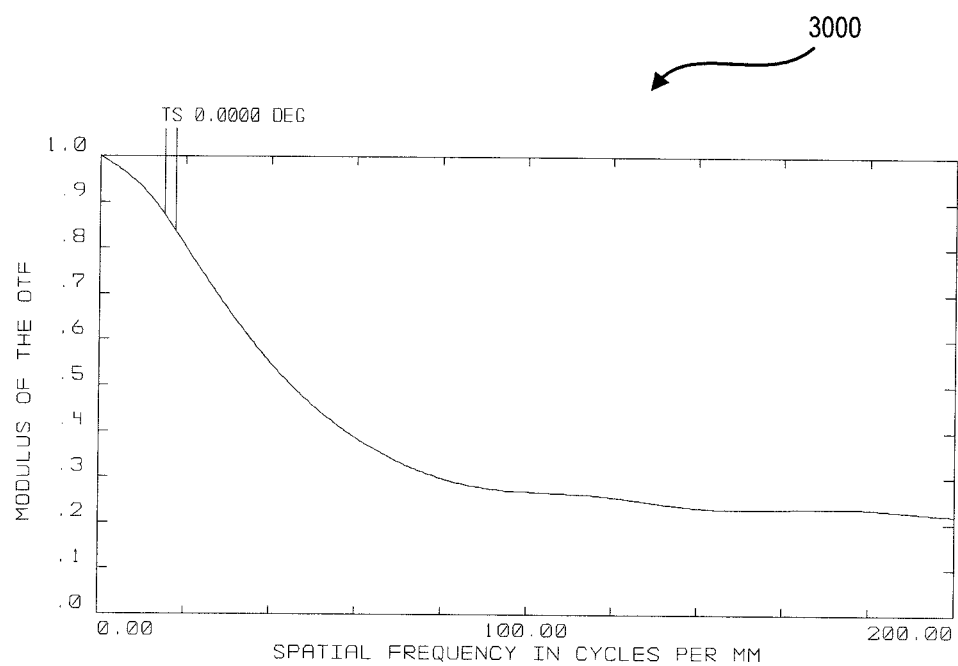

FIGS. 27-30 show polychromatic MTF curves for the same multi-region imaging system whose through-focus performance is shown in FIG. 26. FIG. 27 shows an MTF curve 2700 for a conjugate distance of infinity, FIG. 28 shows an MTF curve 2800 for a conjugate distance of 60 cm, FIG. 29 shows an MTF curve 2900 for a conjugate distance of 25 cm, and FIG. 30 shows an MTF curve 3000 for a conjugate distance of 16 cm. The MTF curves are high at infinity and 60 cm (e.g., as shown in FIGS. 27 and 28) as well as at 16 cm (e.g., as shown in FIG. 30). The MTF curve is low at 25 cm, FIG. 29. Again, such a multi-region imaging system may perform well in applications like those described in conjunction with FIGS. 1 and 2.

TABLE 6

| Surface | Type | Radius | Thickness | Glass | Diameter | Conic |
|---|---|---|---|---|---|---|
| Object | Standard | Infinity | Infinity | | 0 | 0 |
| 3191/Stop | Evenasph | −3.248996 | 1.26 | Acrylic | 1.4 | 0 |
| 3192 | Evenasph | −1.816729 | 0.59 | | 2.1 | 0 |
| 3193 | Evenasph | 17.63372 | 1.36 | Acrylic | 2.28 | 0 |
| 3194 | Evenasph | 4.099447 | 0.45 | | 2.62 | 0 |
| 3195 | Standard | 2.526797 | 1.49 | Acrylic | 2.28 | 0 |
| 3196 | Standard | 1.501278 | 1.097 | | 1.6 | 0 |
| 3197 | Standard | Infinity | 0.56 | AF45 | 1.4768 | 0 |
| 3198 | Standard | Infinity | 0.444 | | 1.4768 | 0 |
| Image | Standard | Infinity | | | 0.01971329 | 0 |

TABLE 7

| | EVENASPH |
|---|---|
| SURFACE 3191 | |
| Coefficient on r2 | −0.10705732 |
| Coefficient on r4 | −0.056828607 |
| Coefficient on r6 | 0.01926084 |
| Coefficient on r8 | −0.0082999141 |

TABLE 7-continued

| | EVENASPH |
|---|---|
| SURFACE 3192 | |
| Coefficient on r2 | −0.091811456 |
| Coefficient on r4 | 0.037117963 |
| SURFACE 3193 | |
| Coefficient on r2 | −0.11868423 |
| Coefficient on r4 | 0.53930859 |
| Coefficient on r6 | −0.010193681 |
| SURFACE 3194 | |
| Coefficient on r2 | −0.27850876 |

Figure 31:
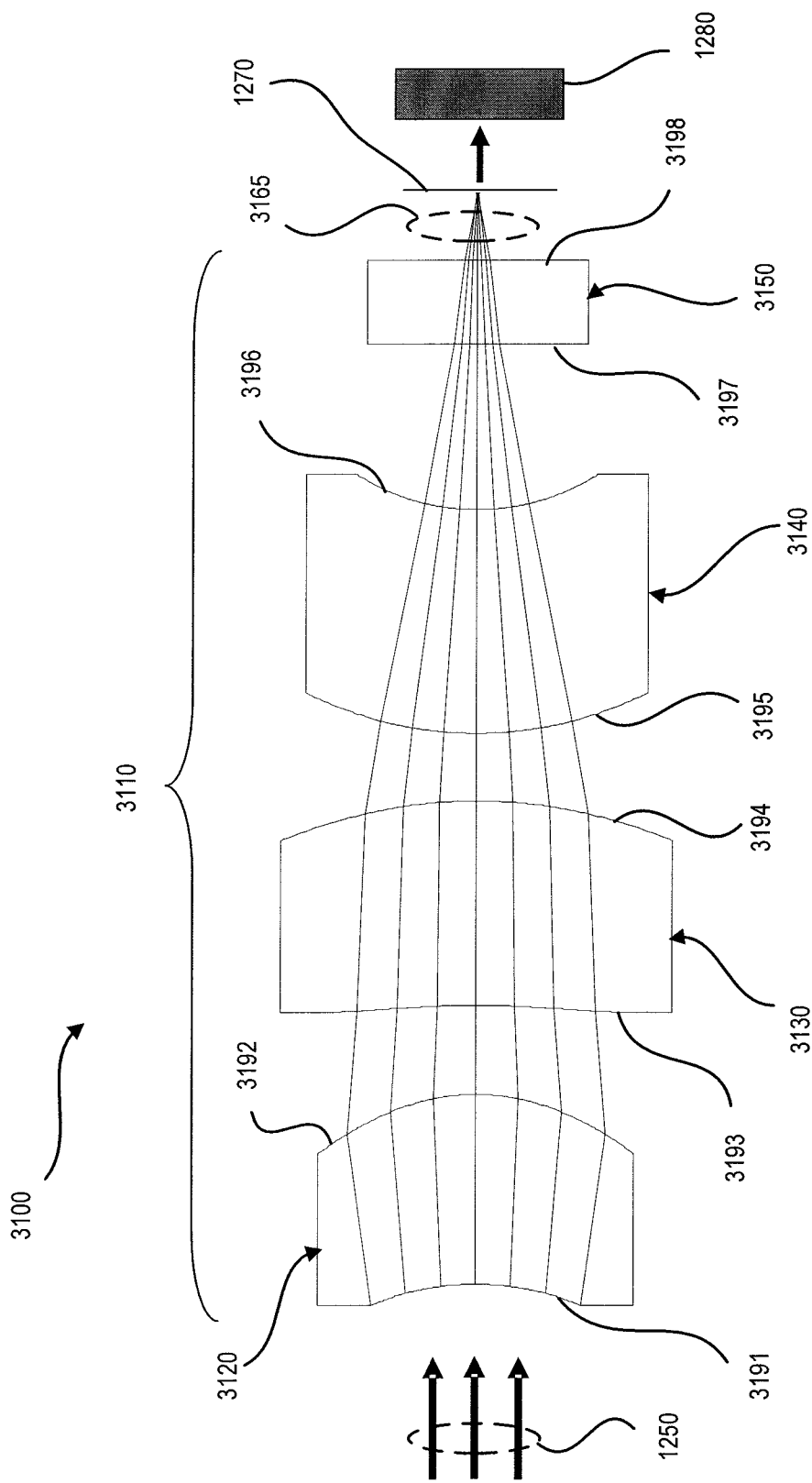
FIG. 31 shows another example of a multi-region imaging system, in accordance with an embodiment.

FIG. 31 shows another embodiment of a multi-region imaging system 3100. Multi-region imaging system 3100 is different from multi-region imaging system 1200 of FIG. 12 in a number of ways. First, plano/aspheric element 1220 is not present in optics group 3110 of multi-region imaging system 3100. Instead, optics group 3110 includes first, second, third and fourth optical elements 3120, 3130, 3140 and 3150, respectively. Optical prescriptions describing surfaces 3191 through 3198 of optics group 3110 are summarized in TABLES 6 and 7.

Figure 32:
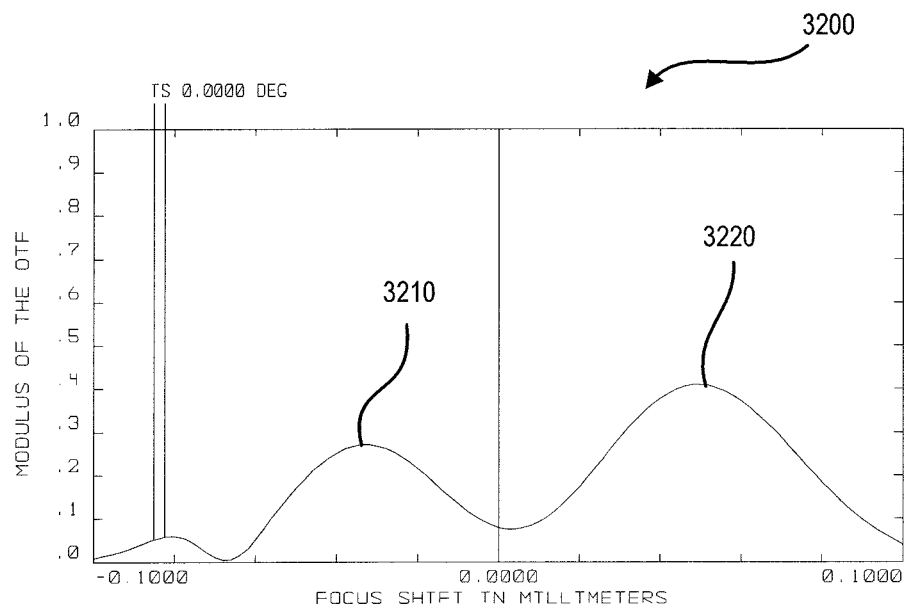
FIG. 32 shows a plot of the polychromatic through-focus MTF curve of the system designed in accordance with TABLES 6 and 7, in accordance with an embodiment.

While the configuration of multi-region imaging system 1200 implemented an exit pupil phase function designed for specific performance at a single wavelength (e.g., a "monochromatic exit pupil") to achieve the multi-region imaging effect, multi-region imaging system 3100 is configured to implement an exit pupil phase function that achieves multi-region imaging effects in the polychromatic through-focus MTF performance of this system (e.g., a "polychromatic exit pupil"), as shown in FIG. 32. Like through-focus MTF curves 1500 of FIGS. 15 and 2600 of FIG. 26, a through-focus MTF curve 3200 resulting from optics group 3110 features distinct, first and second peaks 3210 and 3220, respectively, that correspond to discontiguous object distance ranges.

Figure 33:
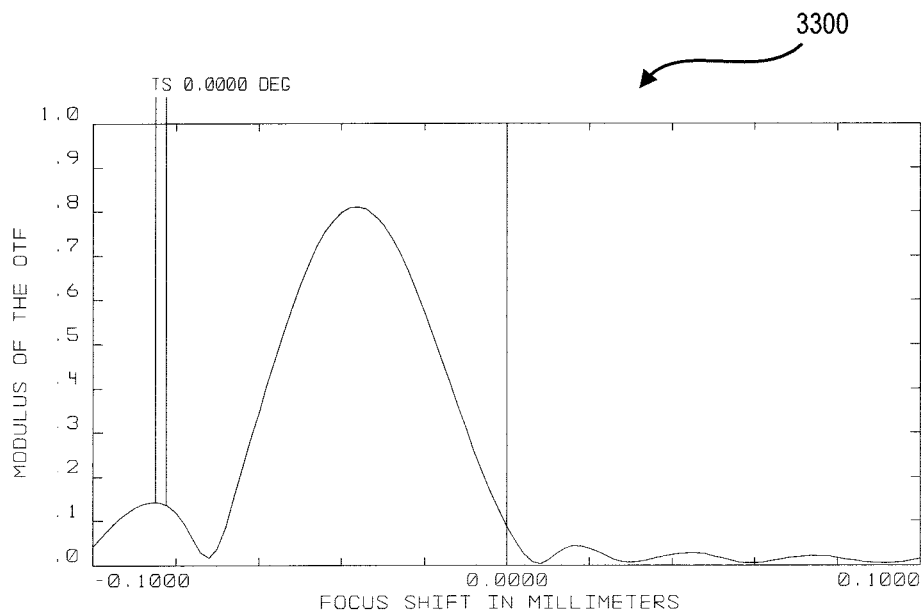
FIGS. 33-35 show monochromatic through-focus MTF curves of the system designed in accordance with TABLES 6 and 7, in accordance with an embodiment.
Figure 34:
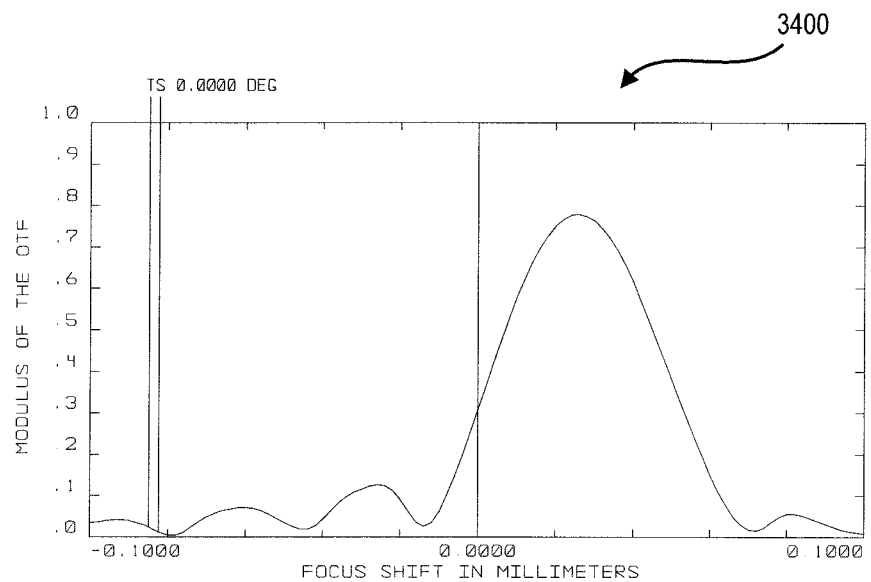
Figure 35:
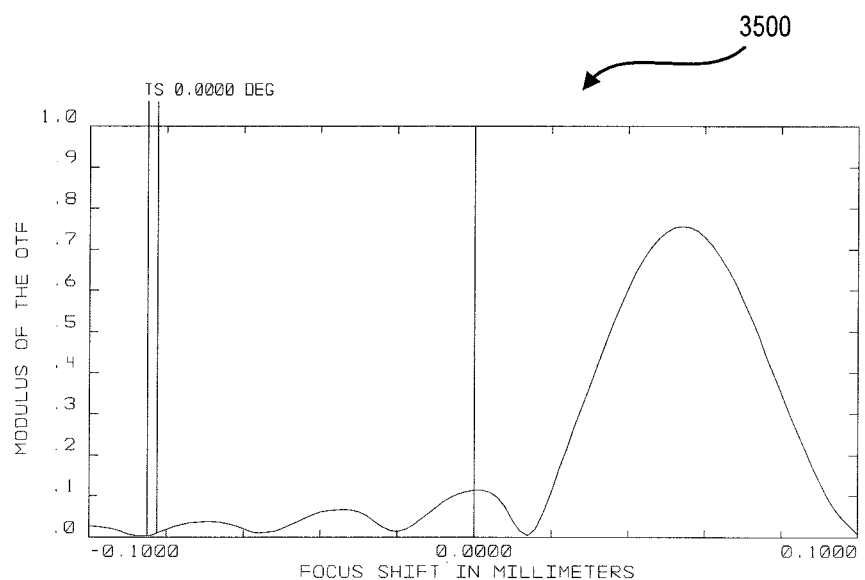

Monochromatic through-focus MTF curves that contribute to polychromatic through-focus MTF curve 3200 are shown in FIGS. 33-35, shown here to further illustrate the operation of multi-region imaging system 3000. A monochromatic through-focus MTF curve 3300 for blue illumination is shown in FIG. 33. A monochromatic through-focus MTF curve 3400 for green illumination is shown in FIG. 34. Finally, a monochromatic through-focus MTF curve 3500 for red illumination is shown in FIG. 35. Monochromatic through-focus MTF curves 3300, 3400 and 3500 for blue, green and red illuminations are very similar in shape, with the position of the peaks being shifted according to wavelength. However, while each of the monochromatic through-focus MTF curves of FIGS. 33-35 exhibits only a single region of best focus, polychromatic through-focus MTF curve 3200, which represents a combination of all monochromatic through-focus MTF curves, illustrates that multi-region imaging system 3100 does indeed demonstrate multi-region imaging characteristics.

Figure 36:
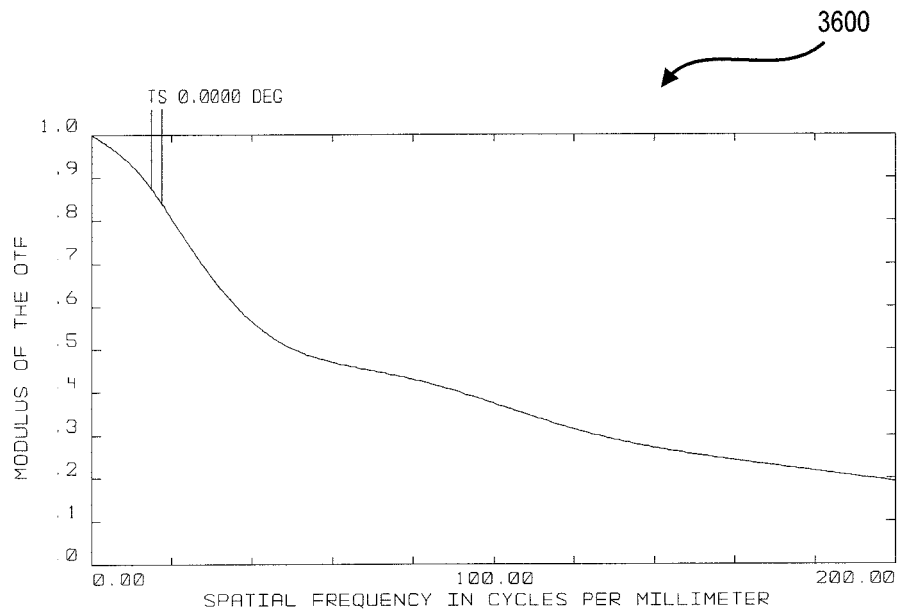
FIGS. 36-39 show polychromatic MTF curves at various conjugate distances for the system designed in accordance with TABLES 6 and 7, in accordance with an embodiment.
Figure 37:
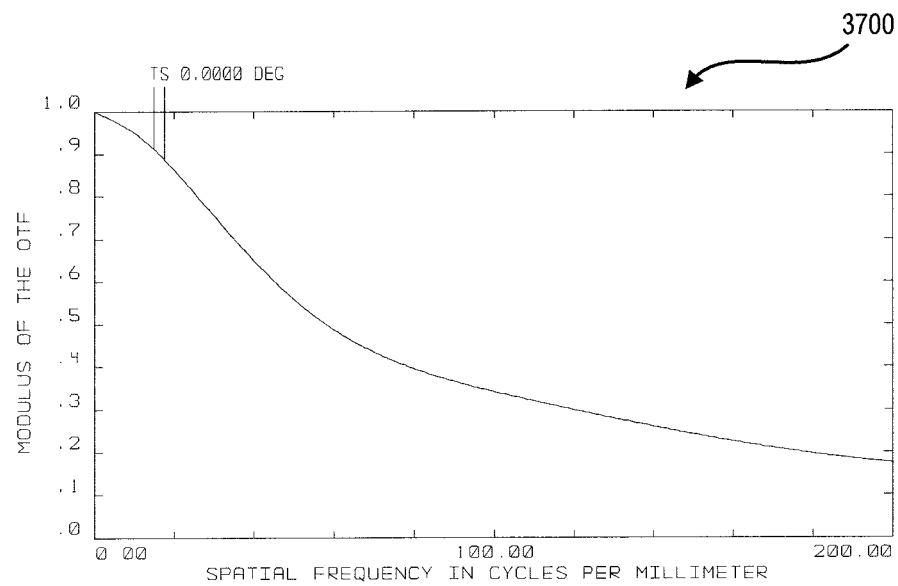
Figure 38:
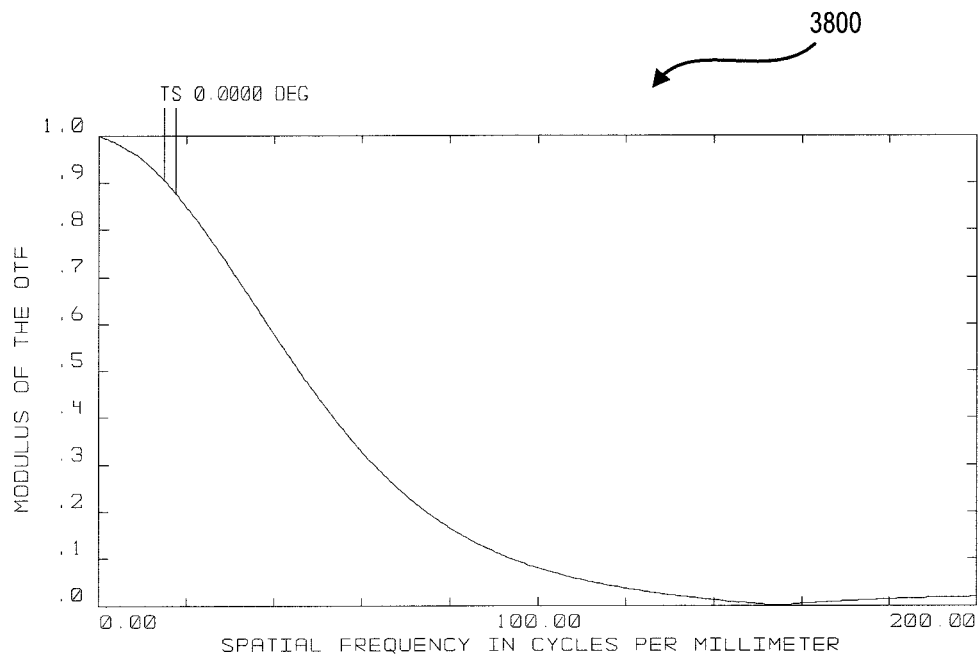
Figure 39:
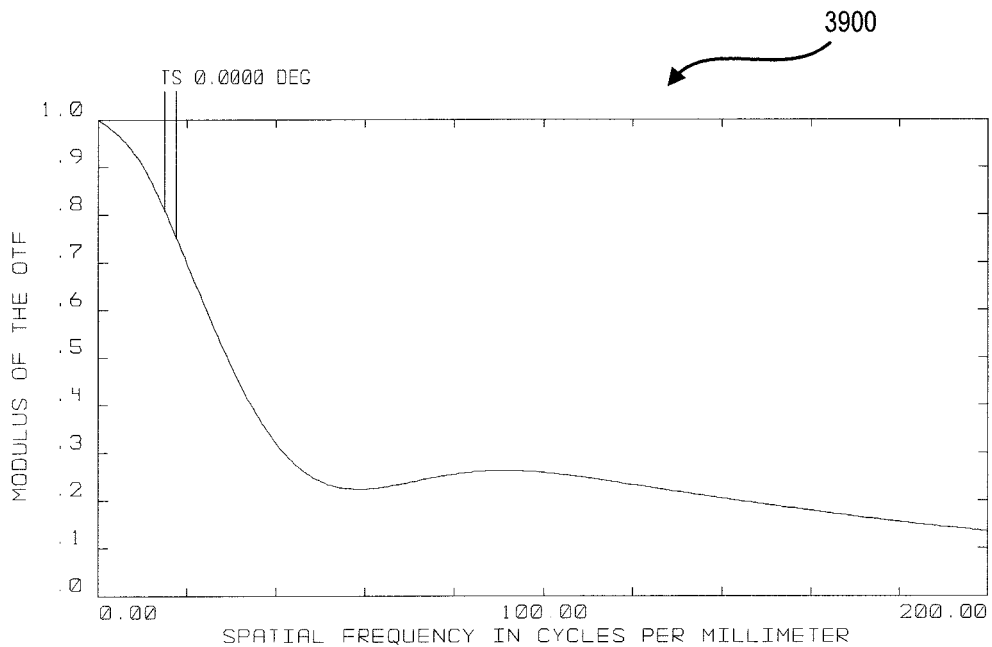

Polychromatic MTF curves for multi-region imaging system 3100 are shown in FIGS. 36-39 for different conjugate distances. FIG. 36 shows a polychromatic MTF curve 3600 for a conjugate distance of infinity, FIG. 37 shows a polychromatic MTF curve 3700 for a conjugate distance of 60 cm, FIG. 38 shows a polychromatic MTF curve 3800 for a conjugate distance of 25 cm, and FIG. 39 shows a polychromatic MTF curve 3900 for a conjugate distance of 15 cm. It may be seen that the MTF curves at infinity and 60 cm are high (i.e., as shown by polychromatic MTF curves 3600 and 3700) as is the MTF curve at 15 cm (i.e., polychromatic MTF curve 3900). The MTF at 25 cm is low (i.e., polychromatic MTF curve 3800), which is fine since this conjugate distance falls in the "don't care" region. These polychromatic MTF curves over object distance are similar to those corresponding to multi-region imaging systems including aspheric surfaces shown in FIGS. 14 and 25, although the system of FIG. 30 is designed in a completely different method; that is, manipulation of a polychromatic exit pupil is an alternative method that may be used in designing multi-region imaging systems.

Yet another method of realizing a multi-region imaging system is by incorporating sub-wavelength features into the imaging system. Suitable sub-wavelength features may be in the form of, for instance, diffractive features, refractive index variations within a material, or metamaterials. Such sub-wavelength features may be placed on a surface of an element in the optics group of, for example, multi-region imaging system 1200 or multi-region imaging system 3100. Sub-wavelength features may also be implemented not as surface features but as refractive index variation in non-homogenous, volumetric optical designs. When implemented as refractive index variation, stray light issues in high intensity illumination environments may be considerably reduced compared to those present when using sub-wavelength surface features.

Figure 40:
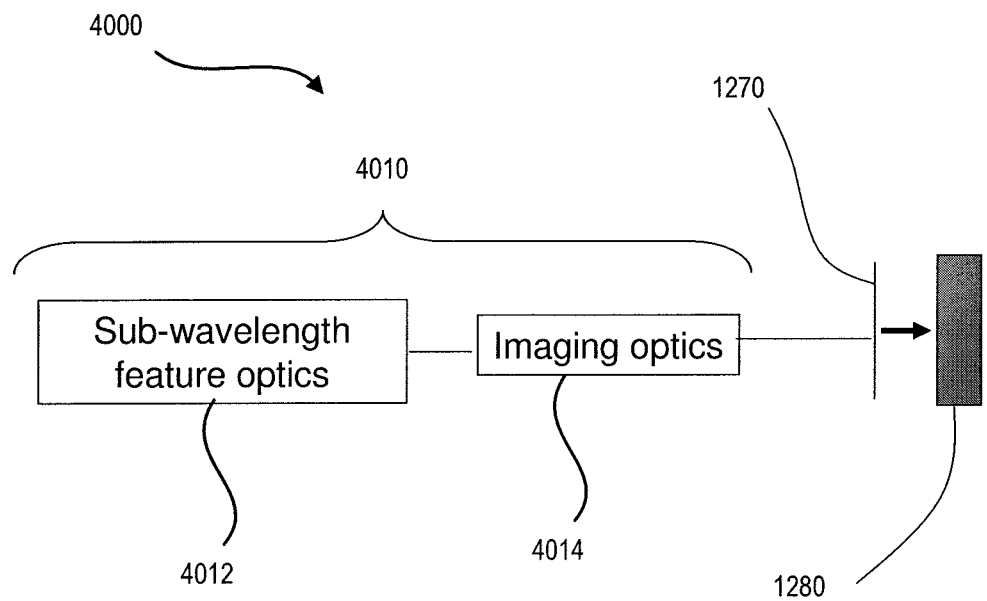
FIG. 40 shows a block diagram of a multi-region imaging system including sub-wavelength features, in accordance with an embodiment.

FIG. 40 shows a block diagram of an exemplary multi-region imaging system 4000 including sub-wavelength features. Multi-region imaging system 4000 includes an optics group 4010, which in turn includes sub-wavelength feature optics 4012 and, optionally, additional imaging optics 4014. In practice, sub-wavelength feature optics 4012 and imaging optics 4014 may be combined, for example, into a monolithic and/or volumetric non-homogenous optical structure.

Figure 41:
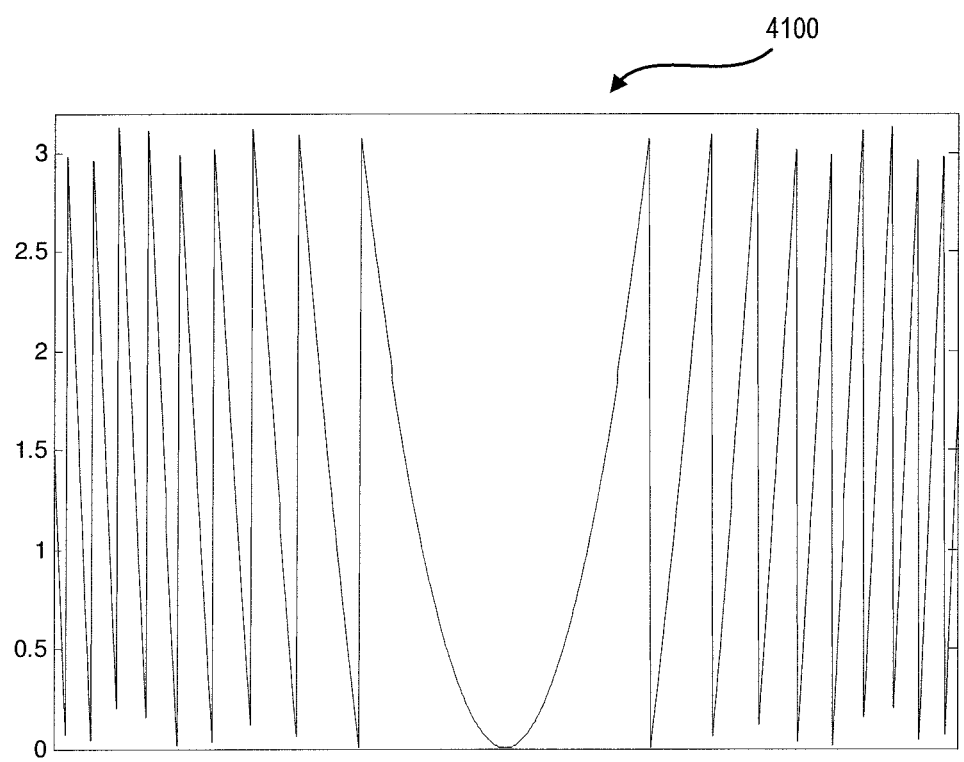
FIG. 41 shows an example of a sub-wavelength feature profile suitable for use with a multi-region imaging system, in accordance with an embodiment.

FIG. 41 shows an exemplary sub-wavelength feature profile 4100 for phase height from 0 to λ/2. The vertical axis represents phase in units of radians, while the horizontal axis represents distance across an aperture of sub-wavelength feature optics 4012. Such a profile may be used to modulate the exit pupil of the imaging system in order to achieve multi-region imaging characteristics. In the exemplary profile shown in FIG. 41, the largest phase in radians is on the order of π, which is equivalent to λ/2 where λ is a central illumination wavelength. Sub-wavelength feature profile 4100 is substantially equivalent to a lens focusing surface modulo λ/2. The power of the lens may then be used as a design variable. The profile is then describable by the following equation:

$$\text{phase}(r) = \text{mod}(\alpha r^2, \pi), \quad \text{Eq. (9)}$$

where r denotes radius across the aperture and α is another design variable. The example shown in FIG. 41 has α=30 and r=linspace(−1,1,501), where "linspace" is a function in MATLAB® for generating linearly-spaced vectors.

Figure 42:
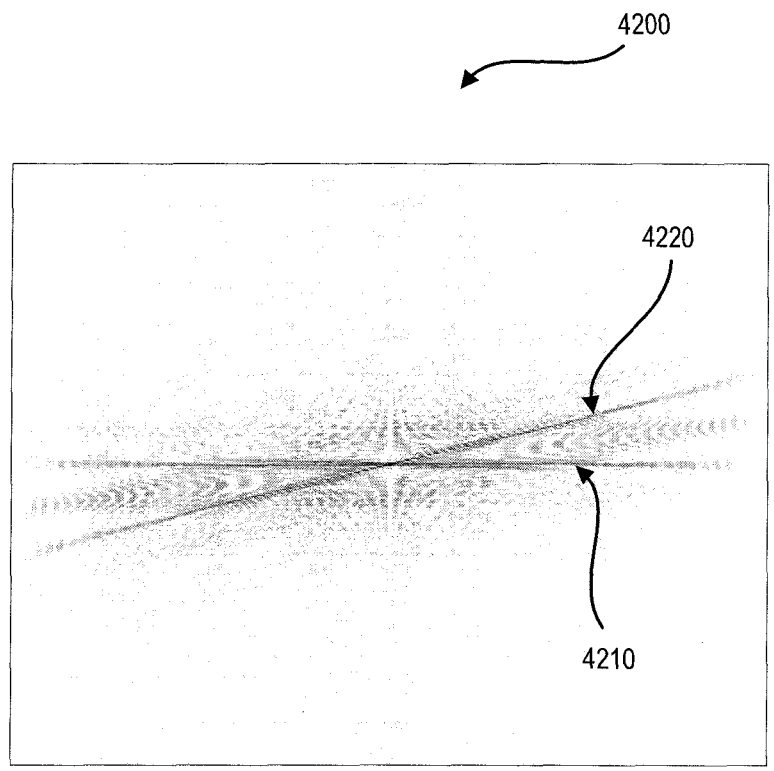
FIG. 42 shows an ambiguity function related to the combination of a diffraction-limited imaging system and the sub-wavelength features of FIG. 41, in accordance with an embodiment.
Figure 43:
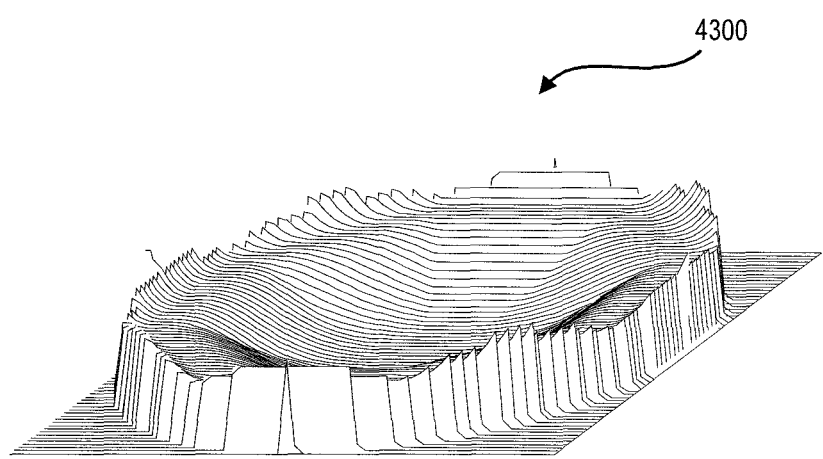
FIG. 43 shows a surface sag according to the prescription summarized in TABLE 8, in accordance with an embodiment.

FIG. 42 shows an AF plot 4200 corresponding to the combination of a diffraction-limited imaging system and sub-wavelength feature profile 4100 of FIG. 41. Multi-region imaging characteristics are clearly indicated by two distinct dark regions in AF plot 4200; a first region 4210 is manifest as a dark, horizontal streak, and a second region 4220 is shown as a slanted streak at an angle with respect to first region 4210. When AF plot 4200 is compared with AF plots 1000 and 1100 shown in FIGS. 10 and 11, respectively, it may be noted that first and second regions 4210 and 4220 are narrow compared to the broad, dark regions of AF plots 1000 and 1100. If a phase modifying element, such as a plano/aspheric element including one of aspheric surfaces 1400 and 2500, were incorporated into optics group 4010, then optics group 4010 may be configured to exhibit a similar increased depth of field as the multi-region imaging systems corresponding to AF plots 1000 and 1100. If optics group 4010 were configured to provide increased depth of field, then first and second regions 4210 and 4220, respectively, of AF plot 4200 for the resulting multi-region imaging system would be broader than those shown in FIG. 42.

TABLE 8

| AsphereSag = 0 | RD | NR | Amp | C | n |
|---|---|---|---|---|---|
| Amp * OctSag terms | 1 | 1 | −1 × 10−3 | 0 | 0 |
| α1 | α2 | α3 | α4 | α5 | α6 |
| −64.728151 | −25.528684 | 838.61428 | −901.60107 | −545.50556 | −1625.1365 |
| α7 | α8 | α9 | α10 | α11 | α12 |
| 3287.9754 | 0 | 0 | 0 | 0 | 0 |
| β1 | β2 | β3 | β4 | β5 | β6 |
| 4 | 6 | 8 | 10 | 12 | 14 |
| β7 | β8 | β9 | β10 | β11 | β12 |
| 16 | 0 | 0 | 0 | 0 | 0 |

Figure 44:
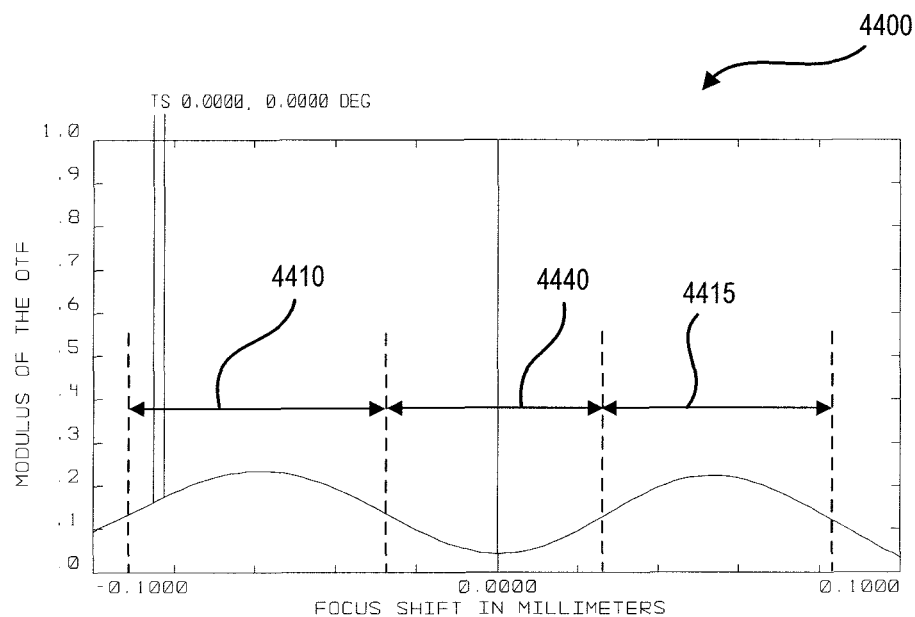
FIG. 44 shows a polychromatic through-focus MTF for a system including the surface of FIG. 43.
Figure 45:
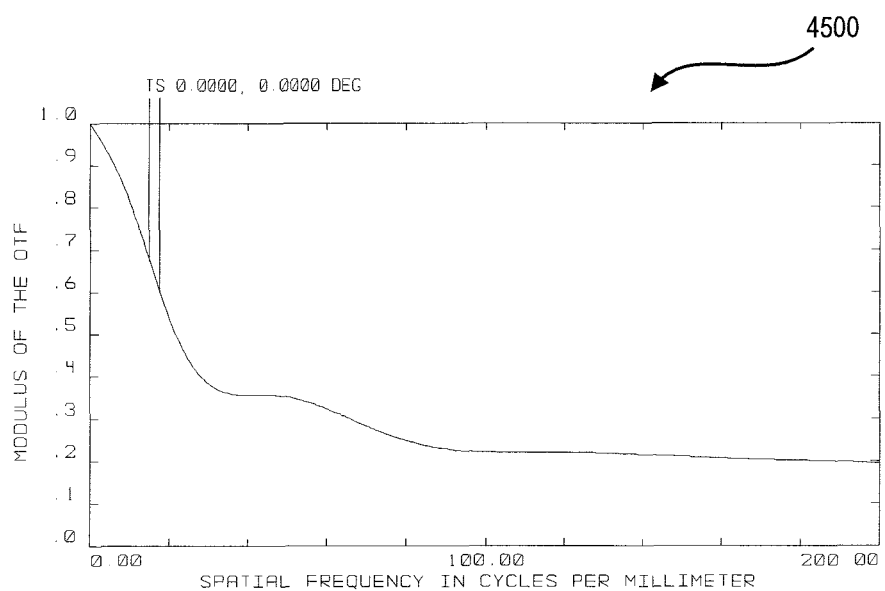
FIGS. 45-48 show the MTF curves at a variety of object distances for the multi-region imaging system including the surface sag of FIG. 43, in accordance with an embodiment.
Figure 46:
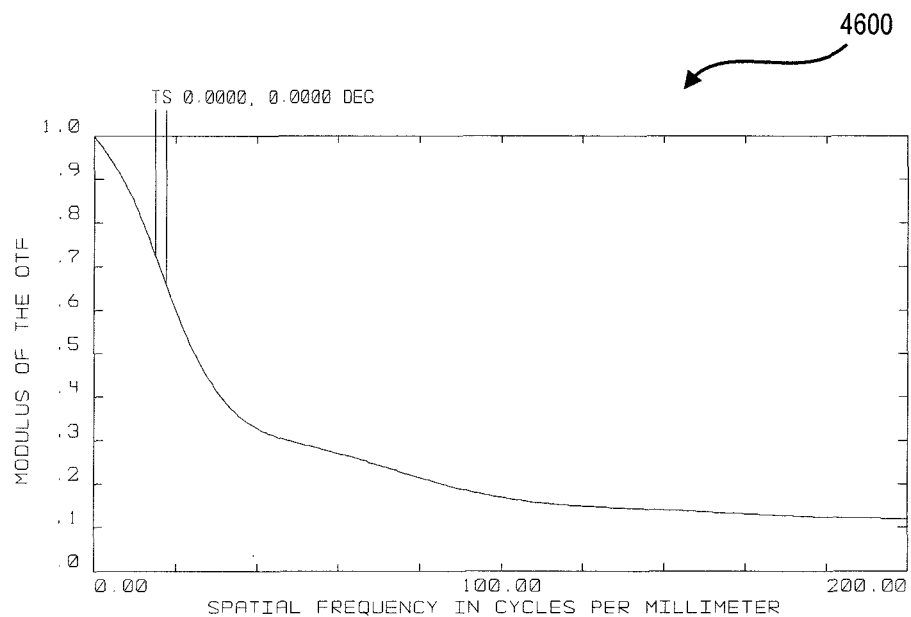
Figure 47:
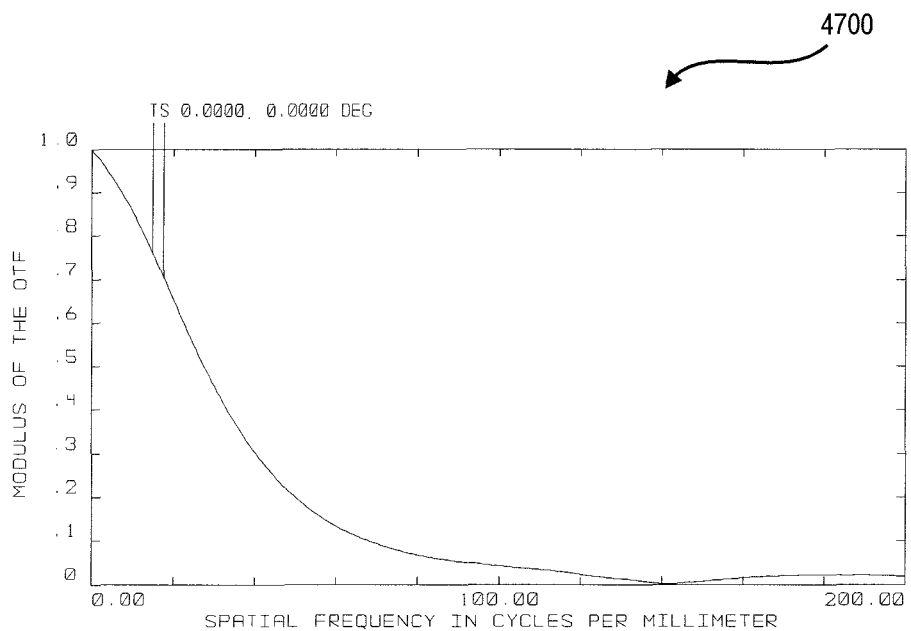
Figure 48:
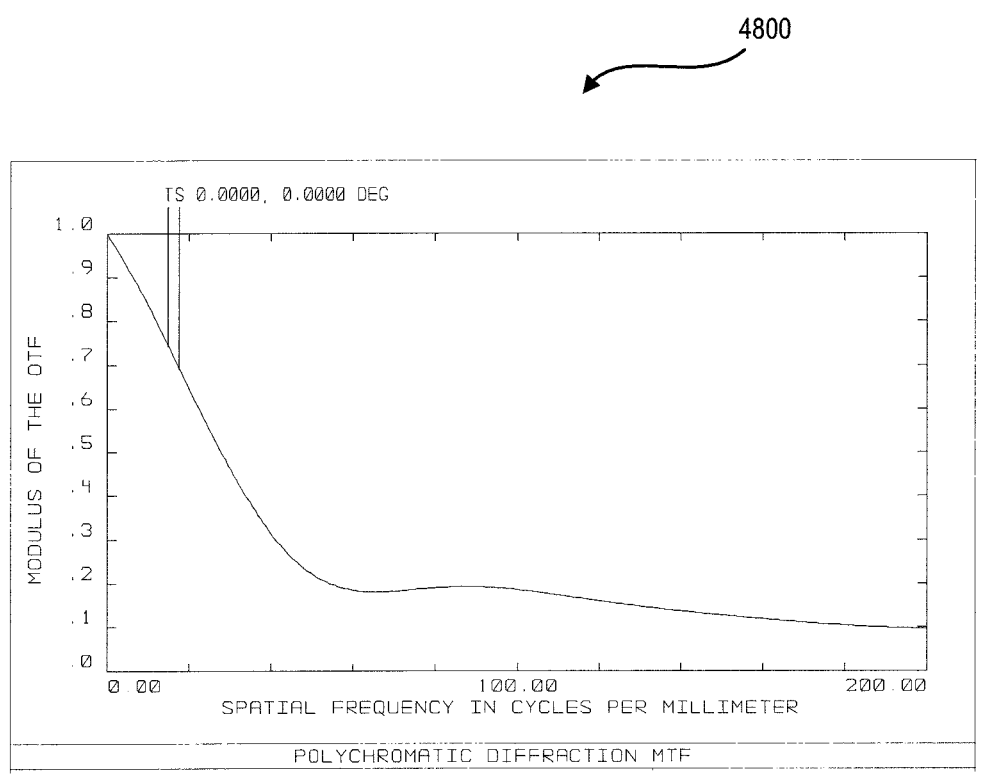

Multi-region exit pupils may be designed to be circularly symmetric, non-circularly symmetric or non-symmetric. A symmetric but not circular design, such as those described in the aforementioned PCT patent application serial number PCT/US07/69573, may also be used. An example of the use of such a surface is illustrated in FIGS. 43-48. TABLE 8 shows various aspheric terms that define an exit pupil surface sag 4300, shown in FIG. 43. Surface sag 4300 may be incorporated in a multi-region imaging system, such as that shown in FIG. 12 at surface 2. A polychromatic through-focus MTF curve 4400 for a multi-region imaging system including surface sag 4300 is shown in FIG. 44. Like through-focus MTF curves (see FIG. 15) of the previously discussed multi-region imaging system, MTF curve 4400 includes two peaks in regions 4410 and 4415, separated by a "don't care" region 4440. Polychromatic through-focus MTF curves at a variety of object distances for this system are shown in FIGS. 45-48. MTF curves 4500 and 4600 (FIGS. 45 and 46) at infinity and 60 cm, respectively, are high as is MTF curve 4800 at 15 cm (FIG. 48). MTF curve 4700 at 25 cm shown in FIG. 47 is low.

Figure 49:
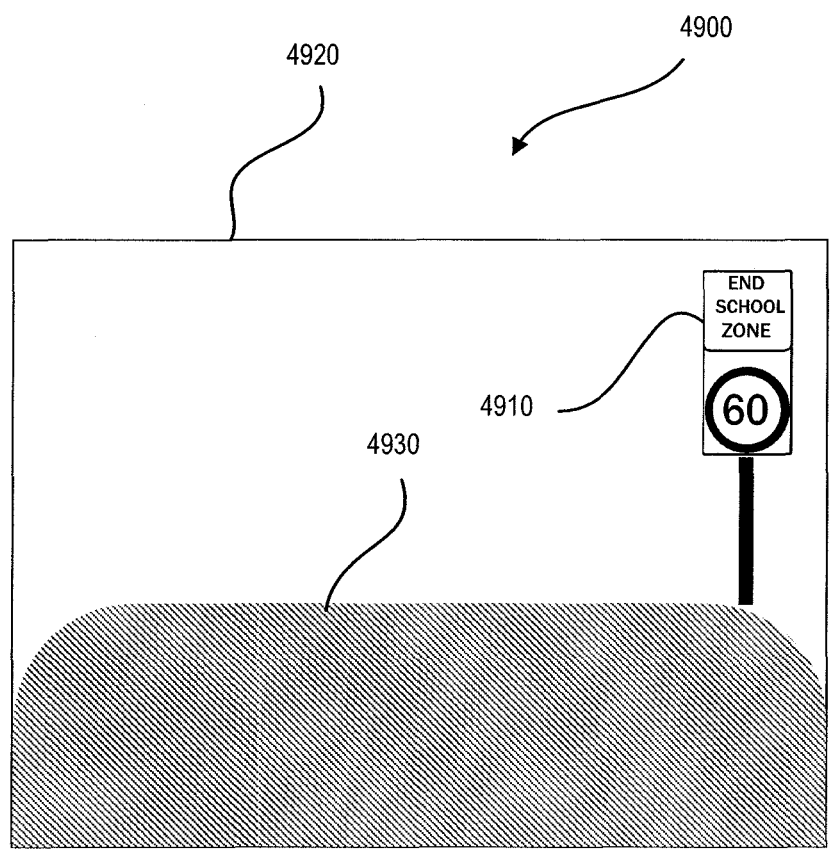
FIG. 49 shows the perspective of a forward-looking imaging system as seen from the inside of an automobile, in a similar scenario as described in FIG. 2, in accordance with an embodiment.

Yet another type of multi-region imaging system is a spatially varying multi-region imaging system, which involves the introduction of an optical path length difference ("OPD") into a portion of the aperture of an imaging system. As an exemplary scenario for application of a spatially varying multi-region imaging system, FIG. 49 shows a scene 4900 as seen from the inside of an automobile. It may be noted that objects far from the automobile, such as a street sign 4910, are generally in an upper region of scene 4900 as seen through a windshield 4920 (represented by a rectangle surrounding a portion of scene 4900) and over a car hood 4930.

One way to accurately image windshield 4920 itself as well as street sign 4910 with a single imaging system in a single exposure is to use a multi-region imaging system. In such an automotive application, it may not be necessary to clearly image windshield 4920 in its entirety; for example, one portion of a suitable multi-region imaging system may be configured to image an upper region of scene 4900 for recognition of far away objects, such as street sign 4910, while another portion is configured for imaging a small portion of windshield 4920 for detecting, for instance, dirt or rain on the windshield.

Figure 50:
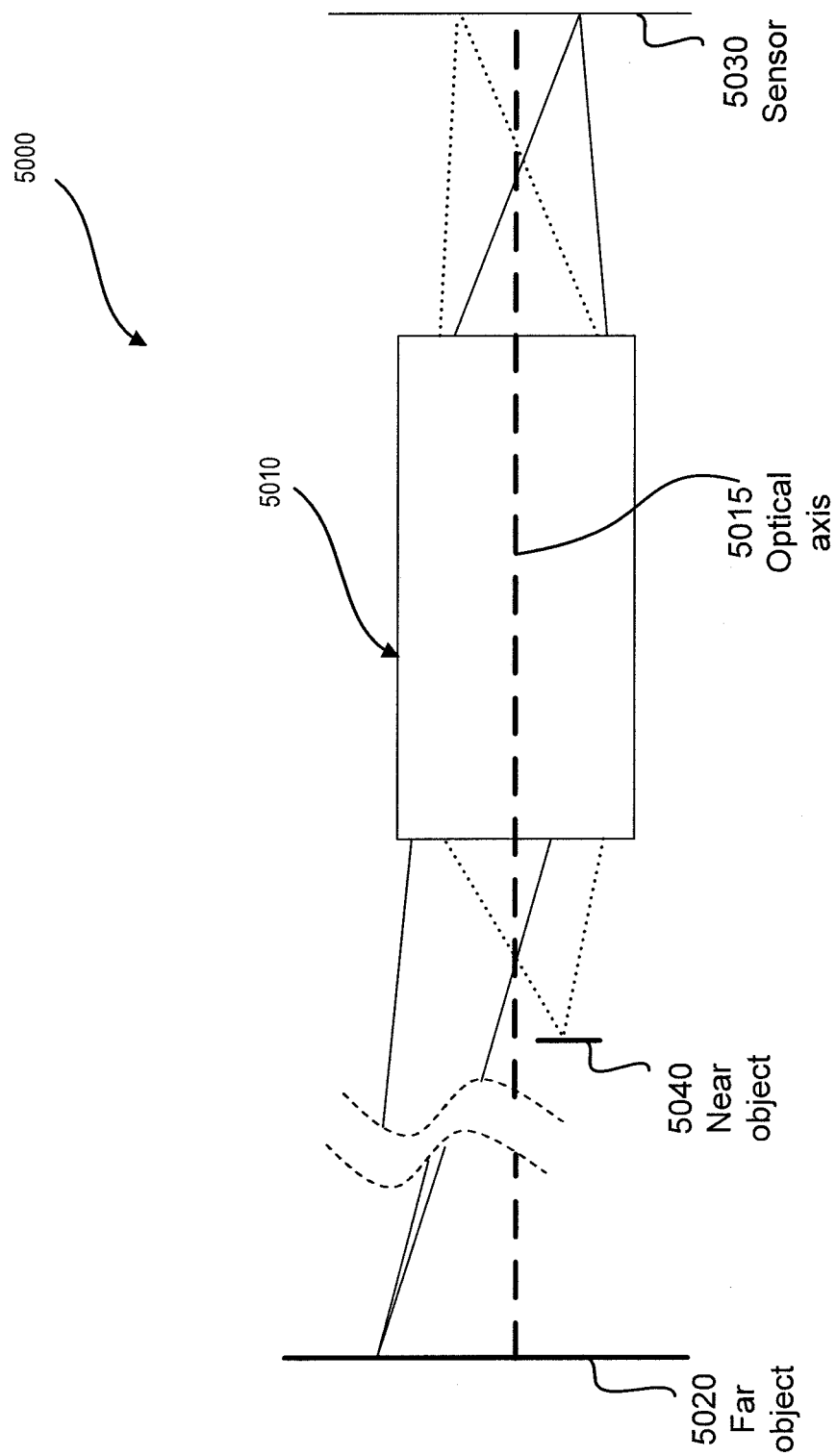
FIG. 50 shows a block diagram of a spatially varying multi-region imaging system, in accordance with an embodiment.

FIG. 50 shows a block diagram of an OPD-modifying imaging system 5000, in accordance with an embodiment, including OPD-modifying optics 5010 (with optical axis 5015) for imaging a far object 5020, disposed far enough away from imaging optics 5010 such that it is effectively located at infinity, at a sensor array 5030. OPD-modifying optics 5010 also image a near object 5040 at sensor array 5030. In conventional imaging systems, if the imaging optics are first configured to focus at an object closer than effective infinity (e.g., near object 5040), any adjustment to re-focus the imaging optics at an object at infinity always forces the movement of the imaging plane (and thus the sensor array) farther away from the imaging optics. OPD-modifying optics 5010, however, include an OPD-modifying optical configuration that allows OPD-modifying optics 5010 to simultaneously focus far object 5020 at the same imaging plane as near object 40. That is, OPD-modifying optics 5010 requires the imaging plane (and thus sensor array 5030) to move closer to optics 5010 to focus far object 5020 on a portion of sensor array 5030 while keeping near object 5040 in focus at the same imaging plane. Put another way, OPD-modifying optics 5010 require a sensor array translation that moves in the opposite direction, as compared to a conventional design, to bring an infinity object to focus. An example of OPD-modifying imaging system 5000 is discussed in detail immediately hereinafter.

Figure 51:
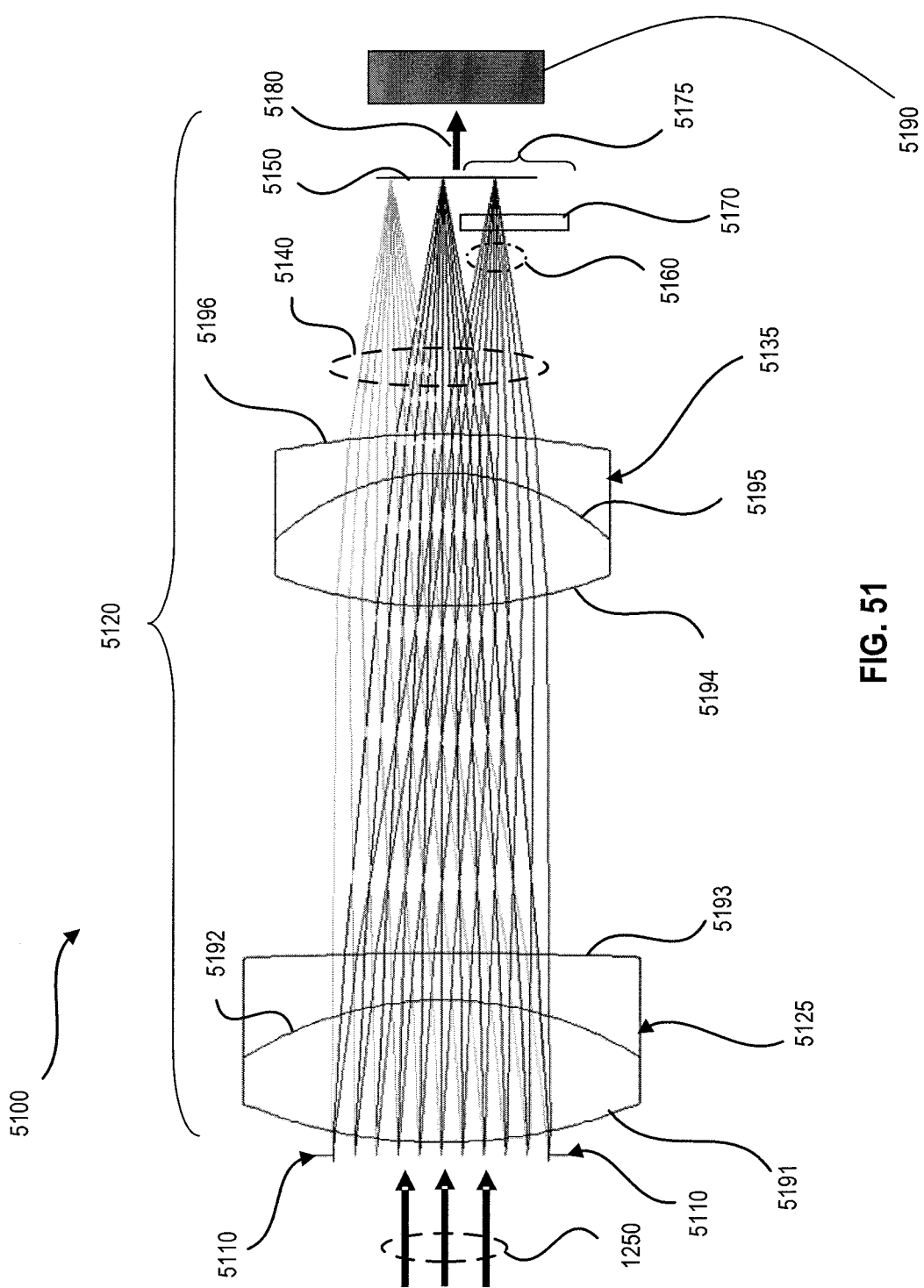
FIG. 51 shows a block diagram of an exemplary spatially-varying multi-region imaging system, in accordance with an embodiment.

FIG. 51 shows a block diagram of a spatially varying multi-region imaging system 5100, in accordance with an embodiment. Multi-region imaging system 5100 includes an aperture 5110 that limits rays 1250 entering imaging optics 5120. Imaging optics 5120 include a first doublet 5125 (including surfaces 5191, 5192 and 5193) and a second doublet 5135 (including surfaces 5194, 5195 and 5196). Imaging optics 5120 are configured for focusing light rays 5140 (encircled by a dashed oval) at a sensor array 5150. TABLE 9 summarizes an exemplary optical prescription of the various components of multi-region imaging system 5100.

Still referring to FIG. 51, a portion 5160 (indicated by a dot-dash oval) of light rays 5140 traverses an OPD-modifying element 5170 before portion 5160 is incident on sensor array 5150. In effect, the spatially varying characteristics of multi-region imaging system 5100 are implemented by OPD-modifying element 5170, which intersects portion 5160 of light rays 5140 such that OPD-modifying element 5170 affects only the spatial field points across an object imaged onto a bottom half 5175 (indicated by a bracket) of sensor array 5150. Sensor array 5150 then converts light rays 5140 received thereon into electronic data 5180 (represented by an arrow) directed to a processor 5190 for processing, such as production of a human-viewable image or generation of a task-based result. Processor 5190 may also utilize information of optics 5120 and OPD-modifying element 5170 to optimize processing such that images generated from each of the bottom and top halves of sensor array 5150 are clear and sharp. Alternatively, processor 5190 may be configured to process information from bottom and top halves of sensor array 5150 differently, in order to perform two different tasks according to information received at the bottom and top halves of sensor array 5150.

Continuing to refer to FIG. 51, in one embodiment, OPD-modifying element 5170 may be a plane parallel plate that acts to increase the optical path difference for some field points, thereby effectively changing the region of best focus for the affected field points. OPD-modifying element 5170 may be, for instance, a plano/plano BK7 optical element of thickness 0.831 mm. OPD-modifying optical element 5170 may be additionally configured, for example, to correct for aberrations and/or to control chief ray angles for certain light rays imaged at sensor array 5150. As another example, by adding optical power to OPD-modifying element 5170, the effective focal length and magnification of a part of the image at sensor array 5150 may be modified simultaneously.

Figure 52:
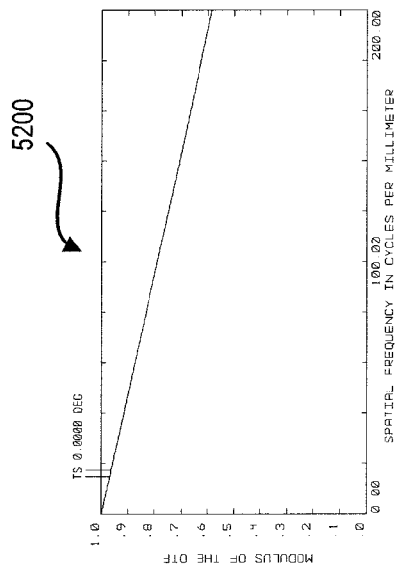
Figure 53:
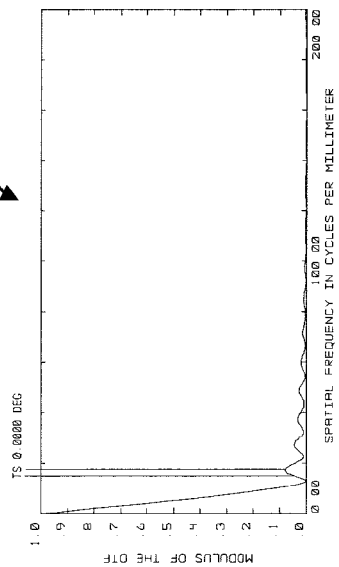

FIG. 52 shows a polychromatic diffraction MTF curve 5200 for bottom half 5175 of multi-region imaging system 5100 for an object at infinity (e.g., a street sign as seen from inside an automobile) for a spatial frequency of 100 lp/mm. Monochromatic diffraction MTF curves would look similar to polychromatic diffraction MTF curve 5200, because OPD-modifying element 5170 is assumed to be achromatic. Similarly, FIG. 53 shows a polychromatic diffraction MTF

TABLE 9

| Surface | Type | Radius | Thickness | Glass | Diameter | Conic |
|---|---|---|---|---|---|---|
| Object | Standard | Infinity | Infinity | | 0 | 0 |
| Stop | Standard | Infinity | 0.007652431 | | 1.347194 | 0 |
| 5191 | Standard | 3.285444 | 0.8864066 | K5 | 2.48704 | 0 |
| 5192 | Standard | −2.354398 | 02933432 | F2 | 2.48704 | 0 |
| 5193 | Standard | −28.18008 | 2.168189 | | 2.48704 | 0 |
| 5194 | Standard | 2.883053 | 0.8417674 | K5 | 2.104418 | 0 |
| 5195 | Standard | −1.508167 | 0.242327 | F2 | 2.104418 | 0 |
| 5196 | Standard | −5.335657 | 1.6077 | | 2.104418 | 0 |
| Image | Standard | Infinity | | | 0.0004286271 | 0 | curve 5300 for bottom half 5175 of multi-region imaging system 5100 for an object at 5 cm (e.g., at an automobile windshield) at a spatial frequency of 100 lp/mm. It may be seen that bottom half 5175 exhibits a broad MTF curve for the object at infinity while providing only a narrow MTF peak for the object at 5 cm, thereby indicating that bottom half 5175 provides good imaging for objects at infinity while being a poor imager of close objects. That is, for example, dirt or debris on the windshield should minimally affect the imaging performance at infinity through bottom half 5175.

Figure 54:
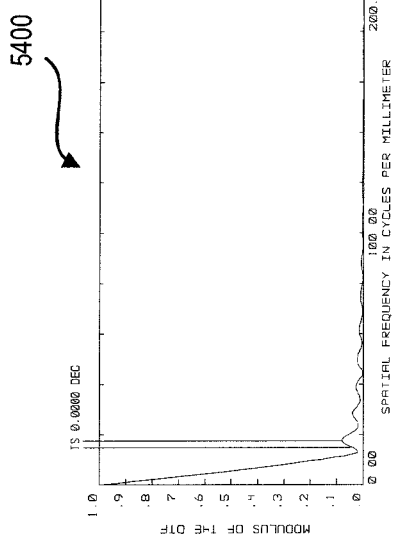
FIGS. 52-55 show the polychromatic diffraction MTF curves for the spatially-varying multi-region imaging system of FIG. 51, in accordance with an embodiment.
Figure 55:
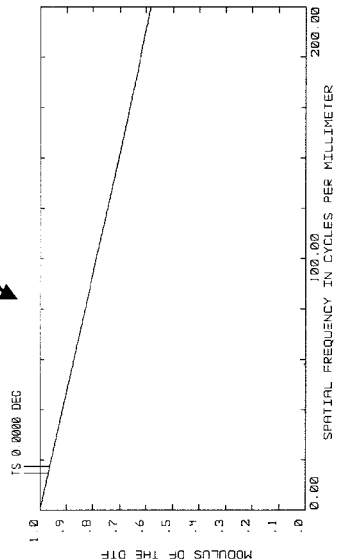

In contrast, FIGS. 54 and 55 show polychromatic diffraction MTF curves 5400 and 5500, respectively, for a top portion (i.e., the portion unaffected by OPD-modifying element 5170) of multi-region imaging system 5100 for objects located at infinity and at 5 cm, respectively, at a spatial frequency of 100 lp/mm. By comparing MTF curves 5200 and 5300 with 5400 and 5500, respectively, it may be seen that the top portion of multi-region imaging system 5100 provides poor imaging performance for far away objects while exhibiting good imaging characteristics for near objects. MTF curves at the top half of the image are very poor for an object at infinity, and are ideal for the windshield location. In other words, the top portion of multi-region imaging system, without OPD-modifying element 5170, provides an image of the windshield with good imaging quality.

Figure 56:
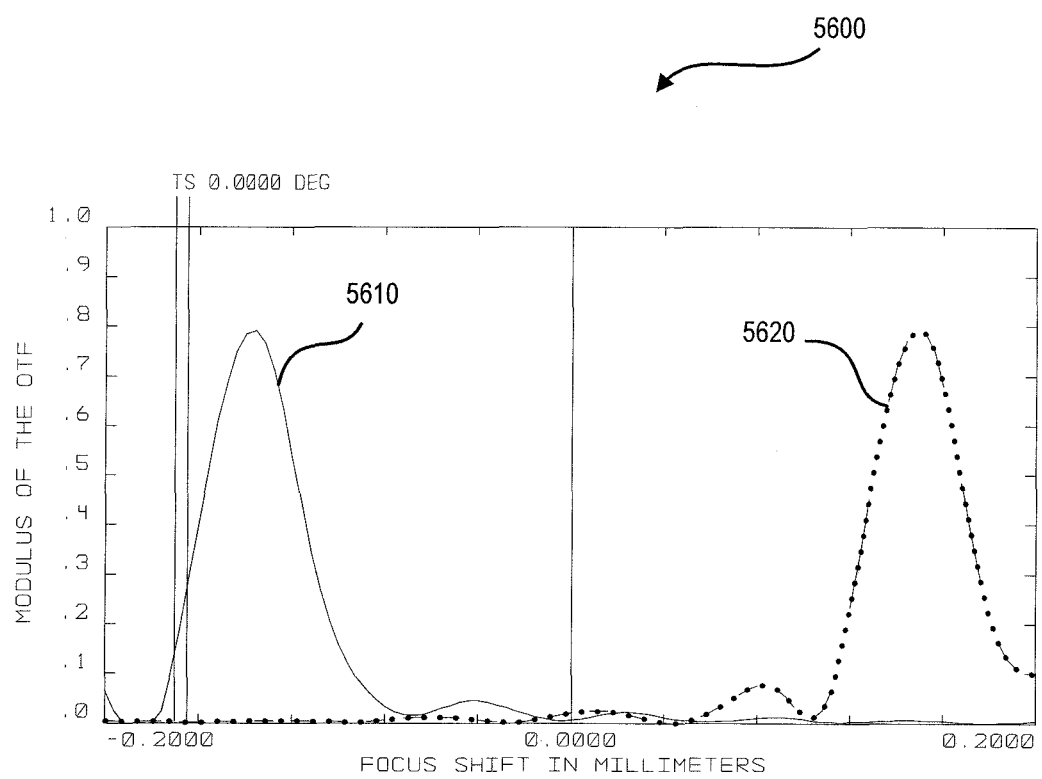
FIG. 56 shows the through-focus MTF curves for the spatially-varying multi-region imaging system of FIG. 51, in accordance with an embodiment.

FIG. 56 shows plots of two through-focus MTF curves for different portions of multi-region imaging system 5100 for a spatial frequency of 100 lp/mm. A first through-focus MTF curve 5610 corresponds to the through-focus MTF performance obtained at sensor array 5150 without transmission through OPD-modifying element 5170. That is, first through-focus MTF curve 5610 corresponds to performance of a near-field image (e.g., a conjugate distance of 5 cm). A second through-focus MTF curve 5620 corresponds to the through-focus MTF performance obtained at sensor array 5150 in bottom half 5175 (i.e., the infinity focused portion of the image). A 0.25 mm focus bias has been introduced to improve clarity.

Multi-region imaging system 5100 may be implemented in a variety of ways. For example, OPD-modifying element 5170 may be implemented as an extra piece of transmissive material disposed directly on a cover glass of sensor array 5150. Alternatively, OPD-modifying element 5170 may be configured from multiple pieces of glass of varying thickness with each piece covering a part of an active region of the sensor array, thereby providing spatially-varying imaging. As another example, OPD-modifying element 5170 may be attached to a sensor array cover glass with, for instance, a polymer bonder directly onto the cover glass or with stand-off posts for providing an air gap between OPD-modifying element 5170 and the sensor array cover glass. In another embodiment, OPD-modifying element 5170 may be formed of an aspheric shape. A molded aspheric element may be further configured to correct, for instance, aberrations, chief ray angle and intersecting focal length. As yet another alternative, OPD-modifying element 5170 may be configured to have a uniform thickness but a refractive index profile that varies across an aperture of the element. The effect provided by an OPD-modifying element may also be distributed across multiple optical surfaces and/or cover glasses within an optical prescription of optics 5120. As yet another alternative, an OPD-modifying element may be configured as a part of a spacer wafer in a wafer-level optical system. Furthermore, the refractive index and the coefficient of thermal expansion of an OPD-modifying element and a cover plate may be matched.

FIGS. 57-62 show various configurations of glass suitable for use as OPD-modifying element 5170 in relation to sensor array 5150. In each of FIGS. 57-62, sensor array 5150 is shown to include a photosensitive region 5705 (indicated by a dashed rectangle) partially obscured by a piece of glass (indicated by a shaded region); the glass takes on various shapes in FIGS. 57-62. In FIG. 57, a configuration 5710 includes a rectangular OPD-modifying element 5720 that covers a portion of photosensitive region 5705. As discussed earlier, rectangular OPD-modifying element 5720 is configured to cooperate with imaging optics 5120 to provide good imaging performance of far away objects but not near objects. The portion of photosensitive region 5705 that is not covered by rectangular OPD-modifying element 5720 cooperates with imaging optics 5120 to provide good imaging performance of near objects.

FIG. 58 shows another configuration 5810 of an OPD-modifying element 5820 including a rectangular cut-out 5830 in the lower right hand corner. FIG. 59 shows still another configuration 5910 of an OPD-modifying element 5920 including a rectangular cut-out 5930 in a lower, center portion. Another configuration 6010 shown in FIG. 60 includes an OPD-modifying element 6020 with a rectangular cut-out 6030 in the center of sensor array 5150. Still another configuration 6110 of FIG. 61 includes an OPD-modifying element 6120 with a semi-circular cut-out 6130 in a lower, center portion. Alternatively, a configuration 6210 of FIG. 62 includes an OPD-modifying element 6220 with a trapezoidal cut-out 6230 in a lower, center portion. The specific shape of cut-outs 5830, 5930, 6030, 6130 and 6230 may be configured according to a particular application, such as an amount of sensitivity required for imaging near objects. Additionally, a thickness and shape of OPD-modifying elements 5720, 5820, 5920, 6020, 6120 and 6220 may be designed according to a desired amount of back focal distance and/or optical track modification.

Figure 63:
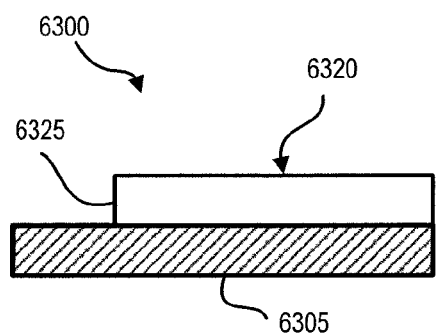
FIGS. 63-75 illustrate a variety of different assembly configurations for the multi-region imaging system of FIG. 51.

FIGS. 63-75 illustrate exemplary configurations of OPD-modifying elements suitable for use in accordance with embodiments described herein. FIG. 63 shows a configuration 6300 including a sensor array cover glass 6305 with an OPD-modifying element 6320 disposed in direct contact thereon. OPD-modifying element 6320 may be, for example, a piece of borosilicate glass with a thickness of ~1.16 millimeters. As an alternative, a configuration 6400 includes a standoff arrangement 6410 introduced between sensor array cover glass 6305 and OPD-modifying element 6320 so as to provide an air gap 6440 therebetween. Air gap 6440 may be, for example, between 10 to 30% of a thickness of OPD-modifying element 6320.

Figure 64:
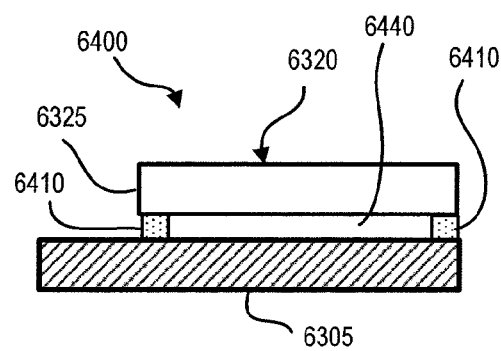
Figure 65:
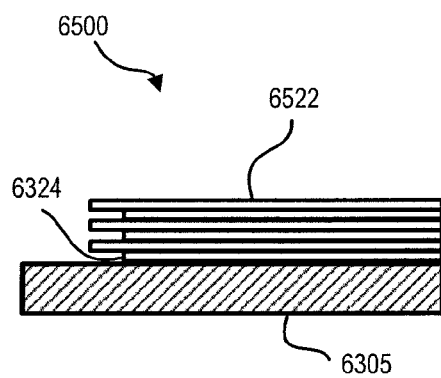
Figure 66:
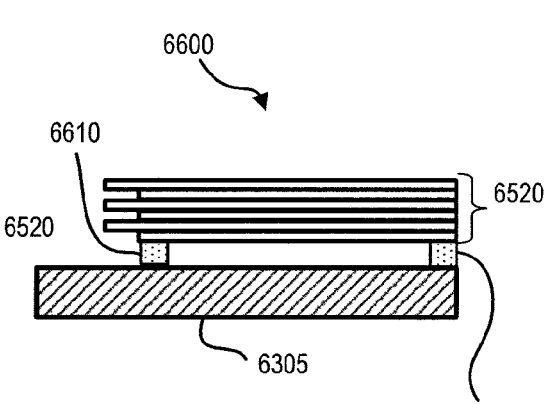

Continuing to refer to FIGS. 63 and 64, a vertical edge 6325 of OPD-modifying element 6320 may be problematic in certain situations, such as under bright light conditions in which light scattering off of vertical edge 6325 may generate undesirable stray light at the sensor array. One way to mitigate such stray light is by providing a light blocking treatment (e.g., black paint, a black material or black fabric) or a light scattering treatment (e.g., sanding) at vertical edge 6325. Alternatively, rather than using a single piece of thick glass as the OPD-modifying element, a plurality of thin pieces of glass may be used as shown in FIG. 65. For example, the plurality of thin pieces of glass may be bonded together with an index matching bonding material. A configuration 6500 includes an OPD-modifying element 6520, which in turn is formed from a plurality of alternating pieces of large and small, thin layers of glass 6522 and 6524, respectively. By alternating large and small glass pieces 6522 and 6524, the edge of OPD-modifying element 6520 is configured to be jagged, thereby diffusing the reflection of incident light therefrom. As illustrated in configuration 6600 of FIG. 66, an OPD-modifying element 6520 may be separated from sensor array cover glass 6305 by a standoff arrangement 6610.

Figure 67:
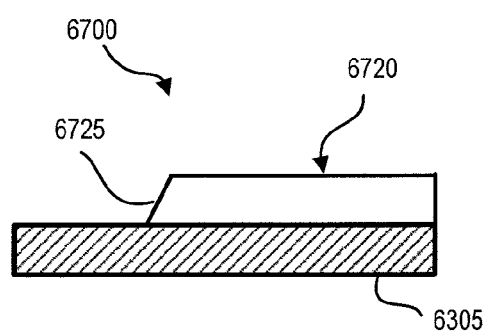
Figure 68:
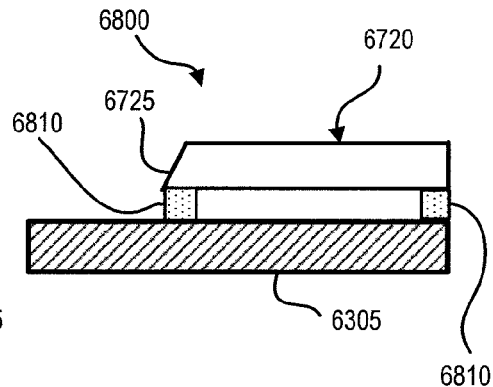
Figure 69:
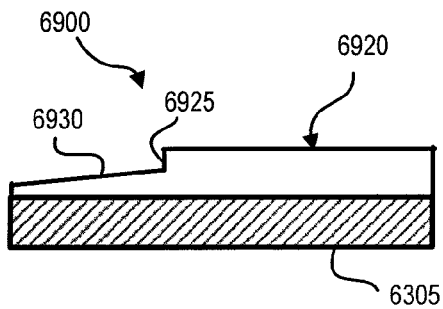
Figure 70:
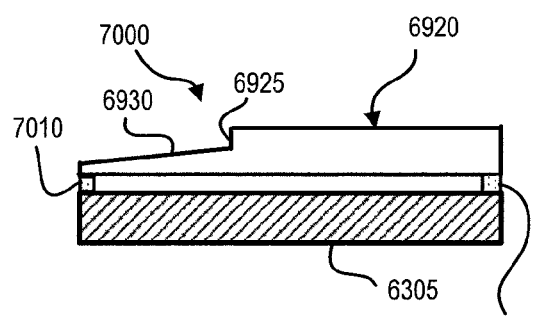
Figure 71:
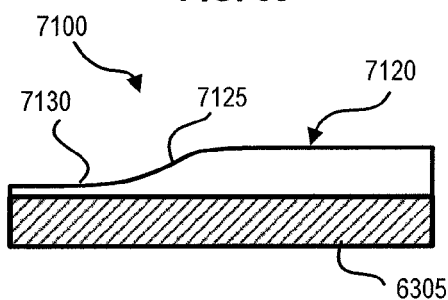
Figure 72:
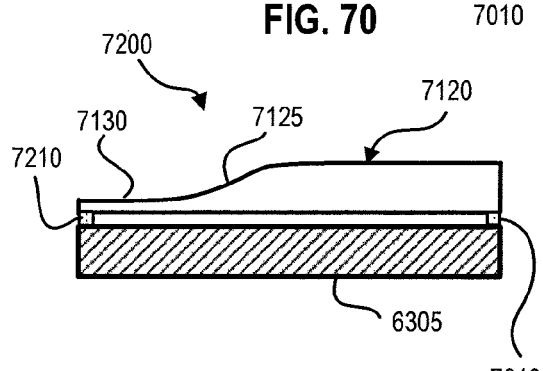
Figure 73:
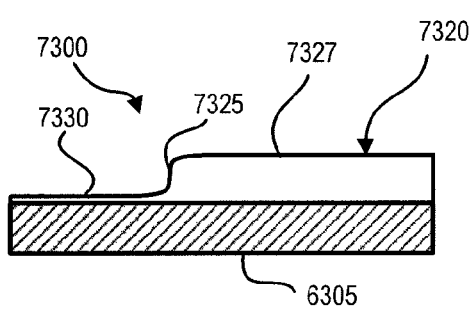
Figure 74:
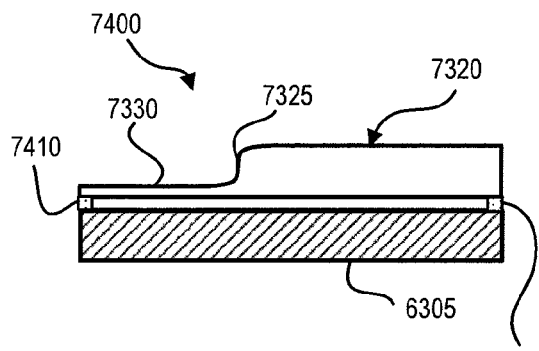
Figure 75:
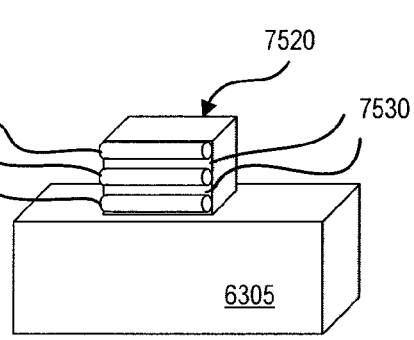

Stray light may also be mitigated by using a slanted edge configuration. FIG. 67 shows a configuration 6700 with an OPD-modifying element 6720, including a slanted edge 6725, disposed directly on a sensor array cover glass 6305. FIG. 68 shows a configuration 6800, in which OPD-modifying element 6720 is separated from sensor array cover glass 6305 with a spacer arrangement 6810. FIG. 69 shows an alternative configuration 6900 with an OPD-modifying element 6920, including a reduced vertical edge 6925 and a slanted cover 6930 over a portion of sensor array cover glass 6305. In configuration 6900, a reduction of the length of vertical edge 6925 combined with slanted cover 6930 further reduce stray light at an optical path length discontinuity across the sensor array aperture. FIG. 70 shows another configuration 7000, in which an OPD-modifying element 6920 is separated from sensor array cover glass 6305 by a spacer arrangement 7010. FIG. 71 shows another configuration 7100 in which an OPD-modifying element 7120 includes a smooth transition 7125 from a thick portion 7127 to a thin portion 7130, thereby eliminating the sharp discontinuity in optical path length and reducing stray light, where additionally the best focus region will track variation in distance to a windshield (e.g., when utilized in camera 75, FIG. 2). FIG. 72 shows a configuration 7200, in which OPD-modifying element 7120 is separated from sensor array cover glass 6305 by a spacer arrangement 7210. FIG. 73 shows another configuration 7300, which features an OPD-modifying element 7320 with a rounded transition 7325 providing a smooth transition from a thick portion 7327 to a thin portion 7330 across an aperture of OPD-modifying element 7320. FIG. 74 shows a configuration 7400, in which OPD-modifying element 7320 is separated from sensor array cover glass 6305 by a spacer arrangement 7410. Finally, FIG. 75 shows a configuration 7500 with an OPD-modifying element 7520 including a plurality of grooves 7530 to act as "light traps" for reducing stray light. Grooves 7530 may be formed, for example, by attaching a plurality of thin wires 7540 along one edge of OPD-modifying element 7520. Grooves 7530, and optionally thin wires 7540, may be painted black to further reduce unwanted light reflection.

There are many design methods that may be used to achieve multi-region imaging systems. Six examples were described. Aspects of each of these examples may be combined, by those skilled in the art of optical/digital imaging systems, to form new systems within the scope hereof.

Some possible combinations of features for the multi-region imaging system are:
1. OPD-modifying optics+digital signal processing ("DSP") for two or more best focus imaging regions;
2. OPD-modifying optics+DSP for two or more best focus imaging regions for human-viewed systems;
3. OPD-modifying optics+DSP for task based imaging over two or more best focus imaging regions;
4. OPD-modifying optics for forming two or more best focus imaging regions where the through-focus MTF related to at least one region is broader, or has an extended depth of field, than without the OPD-modifying optics;
5. OPD-modifying optics from 4 that include continuous phase modifications;
6. OPD-modifying optics from 4 that include discontinuous phase optics;
7. OPD-modifying optics from 4 that use specially designed chromatic aberration;
8. OPD-modifying optics from 4 that use sub-wavelength phase variations;
9. OPD-modifying optics+DSP for two or more best focus imaging regions for mobile phone applications;
10. OPD-modifying optics+DSP for task based imaging over two or more best focus imaging regions for automotive applications;
11. OPD-modifying optics from 4 that are illumination dependent;
12. OPD-modifying sensors (electronics+package+cover glass) for multi-region imaging;
13. Use of 12 for automobile applications; and
14. OPD-modifying multi-region imaging where spatial changes in focus at the image plane are realized.

Printing codes and barcodes encode information into a format that is readily machine-readable. Typically, such codes are affixed to objects. To capture the encoded information, the objects having such information are brought into the presence of an imaging or scanning device to capture the information (e.g., a barcode reader that may be a mobile unit or a fixed unit that the object passes next to). Conventional imaging or scanning devices often place constraints on the placement of the encoded information on the object, and/or require close proximity (e.g., a few inches or less) of the object to the imaging or scanning device. Improved systems and methods, which facilitate gathering such information while avoiding at least some of these conventional constraints, are disclosed as follows.

Figure 76:
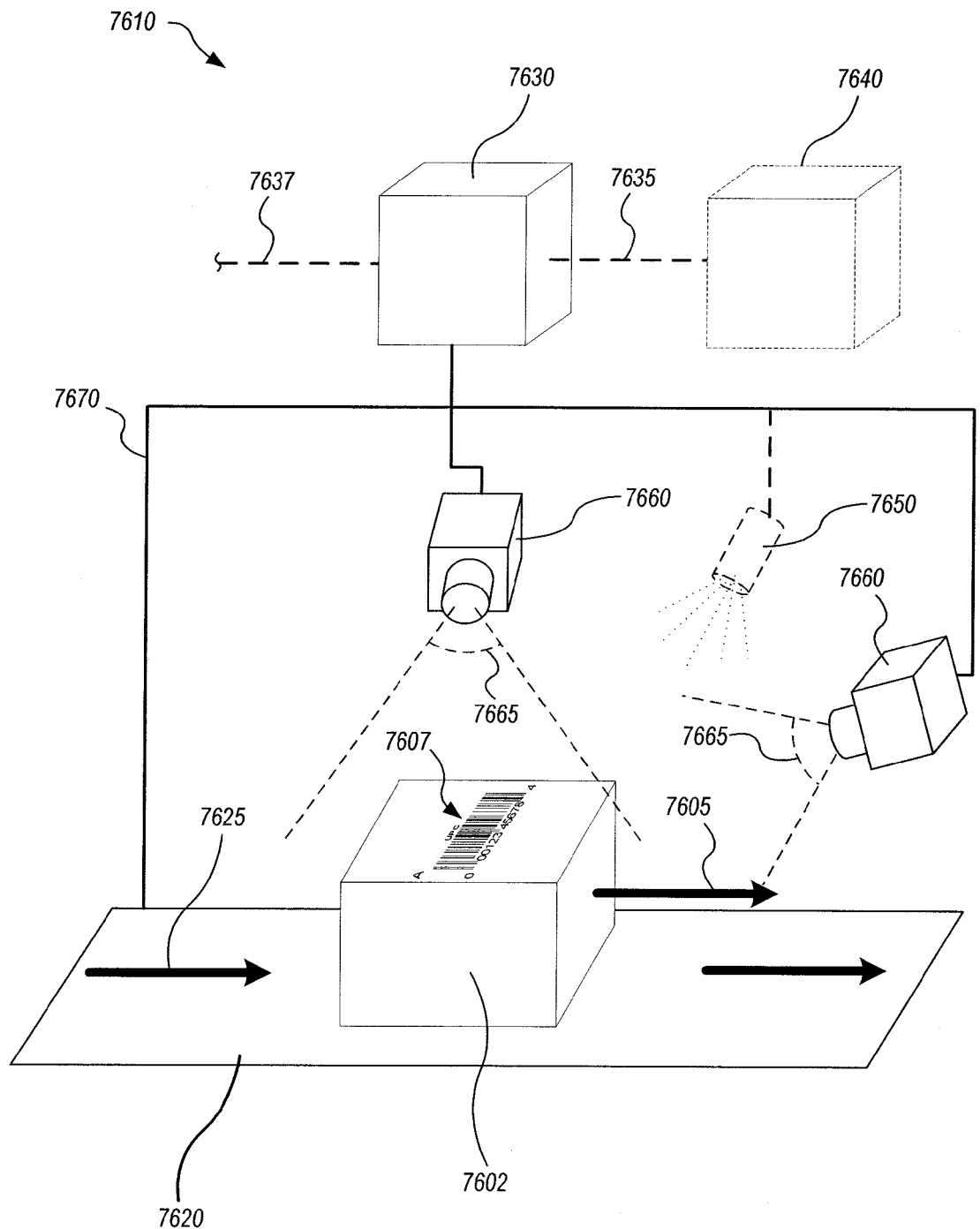
FIG. 76 is a schematic diagram of a system for detecting information on moving objects, in accordance with an embodiment.

FIG. 76 is a schematic diagram of a system 7610 for detecting information on moving objects. System 7610 includes a conveyor 7620 moving at a velocity 7625, in or upon which objects travel, such as object 7602, as shown. Object 7602 moves at an object velocity 7605 that corresponds with velocity 7625. Object 7602 may have information 7607 thereon, such as a barcode, as shown. System 7610 also includes a control module 7630 that controls conveyor 7620 and at least gathers information 7607 through one or more imaging systems 7660. Although two imaging systems 7660 are shown in FIG. 76, it is understood that in certain embodiments system 7610 may include only one, or more than two, systems 7660. Each imaging system 7660 is capable of generating image data of objects that are within a field of view 7665. Such image data, generated by an imaging system, is also described as "raw image data" or "uncorrected image data" further herein. System 7610 may include one or more illuminators 7650 that provide illumination for objects 7602. Illuminators 7650 may provide constant output (e.g., an always-on light source) or may be selectively turned on (e.g., an intermittent or flash light source), as described further below. A control module 7630 interfaces to conveyor 7620, imaging systems 7660, and illuminators 7650 through connections 7670. Control module 7630 may optionally include one or more image processors 7640 (or connect with image processor 7640 through a connection 7635), and may interface to external computer systems or networks (e.g., the Internet) through an optional connection 7637. Connections 7635, 7637 and 7670 may be wired, optical, or wireless connections.

When information 7607 is imaged by imaging systems 7660, known imaging effects can occur and can lead to difficulty in interpreting the information. Such effects include, but are not limited to, acquisition of distorted images due to location and orientation of information 7607 on object 7602, blurring of images due to motion of object 7602, shortening or lengthening of images due to an interaction of object velocity 7605 with shutter speed and/or direction of imaging systems 7660, blurring due to information 7607 being in or out of a focal depth range of imaging systems 7660, and inability of certain imaging systems 7660 to image information 7607 in sufficient detail for recognition of information 7607 (e.g., ability to read a barcode). Additional embodiments, discussed below, are capable of advantageously addressing one or more of these known imaging effects, and/or other difficulties in detecting information on moving objects.

One method of adjusting or correcting distorted images is to control a rate or direction of data acquisition of an imaging system 7660. In film-based cameras, a "shutter" generally admitted light to the film for a time that was predetermined to expose the film properly. The "shutter" was typically a pair of lightproof objects that moved across the camera near a focal plane where the film was located; a first one of the objects initially covered the focal plane and withdrew across the focal plane to start an exposure, the second one of the objects initially did not cover the focal plane, but followed the first object across the focal plane after the predetermined time, to end the exposure. Thus, the shutter had a rate (shutter rate) and a direction of travel (shutter direction) across the focal plane. Similarly, the tem "shutter" herein refers to a mechanism or method that defines timing and direction of capture of an image at a focal plane. A shutter may be a mechanical shutter of a film-based camera, but may also be a mechanism that defines how raw image data is sampled from a sensor or sensor array. For example, a set of signals provided to a sensor or sensor array telling it when to sample image data corresponding to light imaged onto individual pixels of the sensor array, has the effect of a shutter. How the pixels of the sensor array are sampled determines shutter rate and direction, as discussed below.

For example, a "global shutter" samples all pixels of a sensor array simultaneously, or at least quickly enough so that light imaged on the sensor array does not change during the sampling. As described herein, a global shutter can be considered to be analogous to film photography utilizing a flash, in the sense that light intensity received by the film during the brief interval of the flash is overwhelmingly greater than light received throughout shutter operation. The flash thus "freezes" motion as captured on the film. In another example, a "rolling shutter" samples the pixels of the sensor array at a shutter rate, in a shutter direction that may be a horizontal or vertical direction across the sensor array. That is, the rolling shutter generates sequential raw image data samples of the scene imaged on the sensor array.

Figure 77:
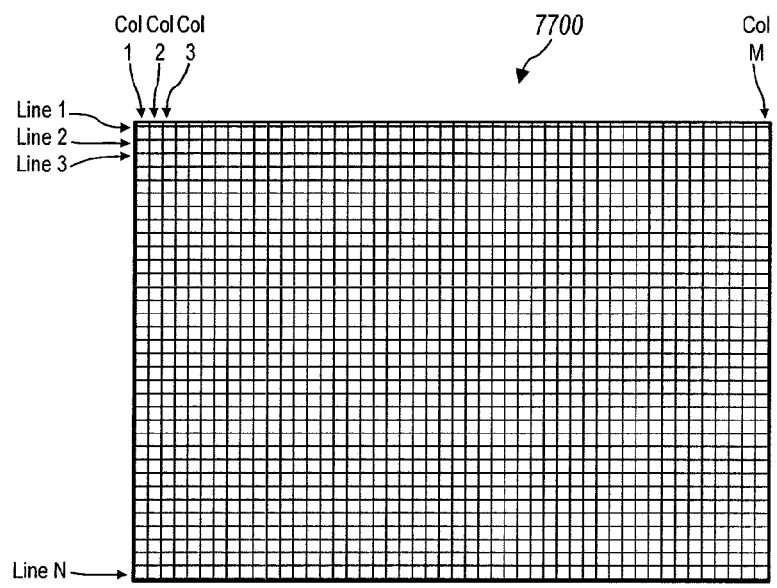
FIG. 77 schematically illustrates a sensor array formed of N lines having M pixels per line, in accordance with an embodiment.

FIG. 77 schematically depicts a sensor array 7700 formed of N lines (e.g., Line 1, Line 2, Line 3 . . . Line N) having M pixels per line arranged in columns (e.g., Col 1, Col 2, Col 3 . . . Col M). Sampling each line of pixels before sampling the next line of pixels can create a shutter direction that is vertical; for example, sampling Line 1, then Line 2, then Line 3 results in a vertical shutter direction from the top to the bottom of sensor array 7700. Sampling the same lines in the reverse order (i.e., from line N to line 1) would result in a vertical shutter direction from bottom to top of array 7700. Similarly, if the layout and internal logic of sensor chip 7700 permit, columns could be sampled sequentially from Col 1 to Col M (or vice versa) to obtain a horizontal shutter direction.

Figure 78:
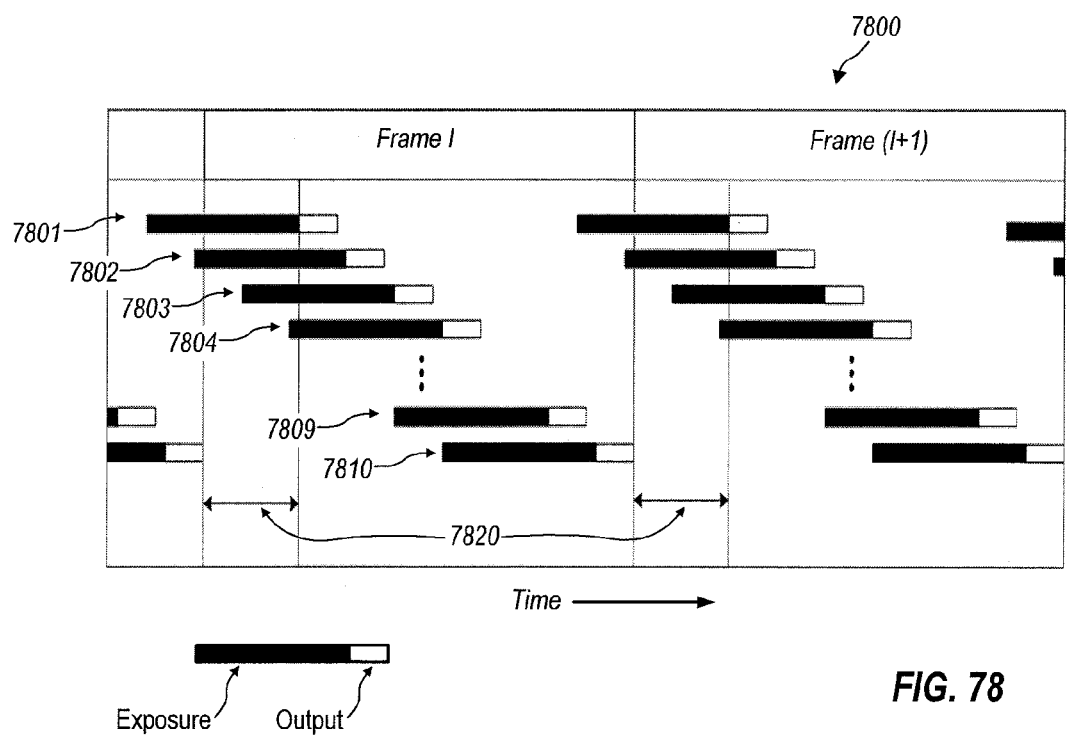
FIG. 78 shows a timing scheme for an imaging system, in accordance with an embodiment.

FIG. 78 shows a timing scheme 7800 for an imaging system, in which Line 1 begins to be exposed first, followed by Lines 2, 3, 4, and so forth, such that Line 1 finishes its exposure and provides output just after Line 4 begins to be exposed. Timing blocks 7801, 7802, 7803, 7804, 7809, and 7810 correspond to exposure and output timing of Lines 1 through 4, Line (N−1), and Line N of array 7700, respectively. According to the illustration, a black part of each timing block denotes exposure time of each line, while a white part of each line denotes the output time of the same line. In the context of providing a stream of raw image data frames, it can be seen from FIG. 78 that timing blocks 7801, 7802, 7803, 7804, 7809, and 7810 generate image data for a Frame I while corresponding timing blocks, which may or may not overlap in time with timing blocks 7801, 7802, 7803, 7804, 7809, and 7810, generate image data for frames (I−1) and (I+1). Optionally, a blanking time 7820 may be provided between output data of successive frames.

As noted above, in timing scheme 7800, timing blocks 7801, 7802, 7803, 7804, 7809, and 7810 are arranged such that Line 1 begins to be exposed first, followed by Lines 2, 3, 4, and so forth, such that the exposure of Line 1 finishes and output therefrom is subsequently provided just after exposure of Line 4 begins. Accordingly, referring back to FIG. 77, an effect of the staggered exposures can be seen to correspond to a vertical shutter direction going down through array 7700.

Figure 79:
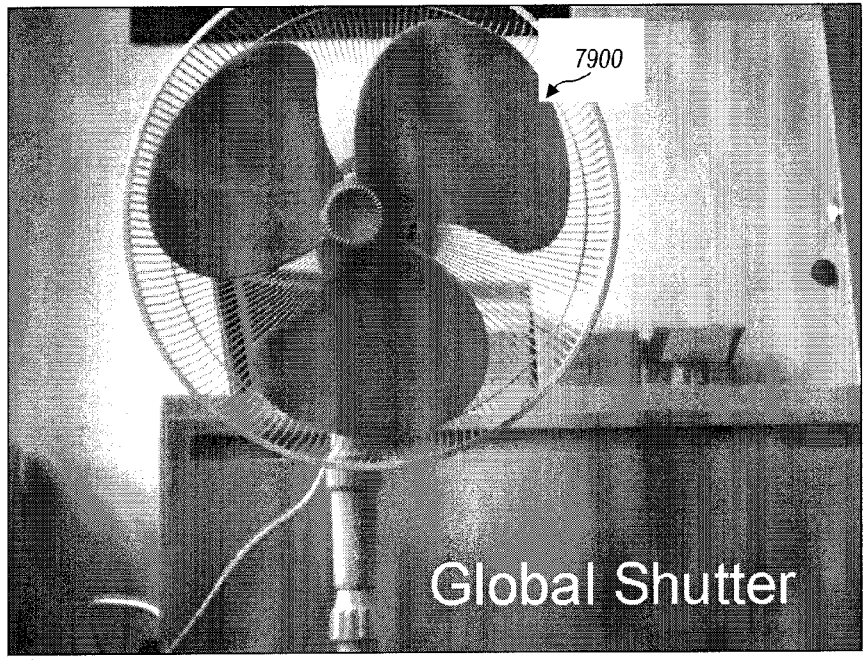
FIGS. 79 and 80 illustrate the effect of a global shutter and a rolling shutter on a photograph of a rotating fan blade, in accordance with an embodiment.
Figure 80:
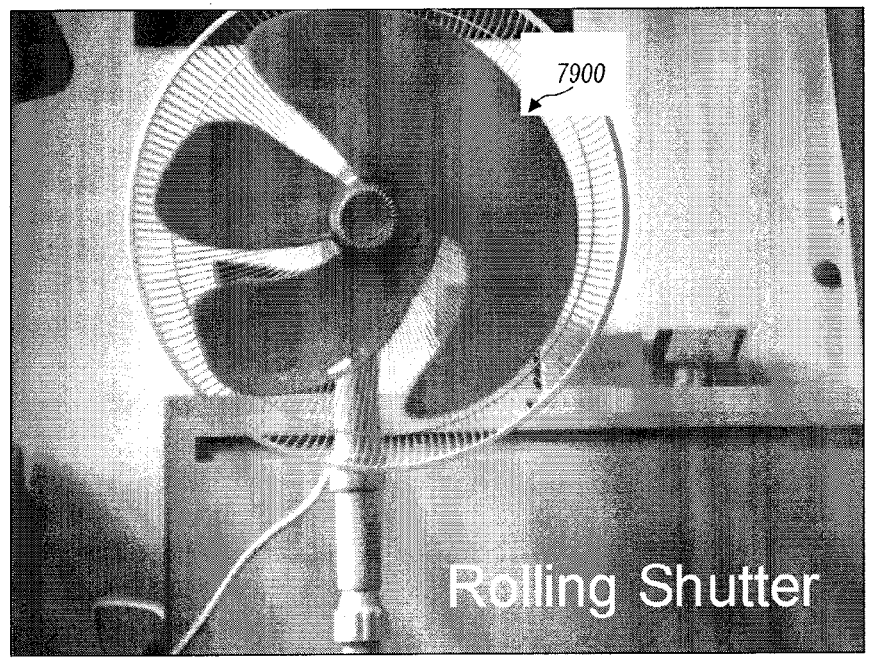

FIGS. 79 and 80 illustrate the effect of a global shutter and a rolling shutter on a photograph of a rotating fan blade 7900. As can be seen in FIG. 79, the raw image data can be collected more quickly than the rotation (not shown) of fan blade 7900 would impart changes to light collected by the pixels of the sensor array that is photographing the fan. As can be seen in FIG. 80, on the other hand, when the same rotating fan is photographed using a rolling shutter, the shutter direction is from the top of the image to the bottom of the image. As the fan blade 7900 rotates clockwise, an image velocity on the fan blade's right hand side (according to the illustration of FIG. 80) aligns with the shutter direction, so that the blade on the right hand side forms an elongated image in the photograph, whereas an image velocity of fan blade's left hand side is opposite to the shutter direction, resulting in a shortened generated image, i.e., shortened image data.

When an object being imaged is in motion, use of a rolling shutter results in the same amount of motion blur resulting from use of a global shutter, given the same exposure. FIG. 80, however, illustrates a different type of distortion that is related to the direction of the rolling shutter considered together with the direction of motion. That is, image velocity in the same direction as the rolling shutter direction, will add a positive distortion to the image of the moving object, while image velocity in the opposite direction as the rolling shutter will add a negative distortion to the image of the moving object. As described herein, "distortion" refers to a non-blurring aberration characterized by a change in magnification. In FIG. 80, the example of distortion illustrated can be seen as primarily one-dimensional, that is, a positive distortion in one direction causes an increase in magnification, while a negative distortion in the opposite direction causes a decrease in magnification. This definition of distortion is consistent with conventional use of the term, such as in the case of negative barrel distortion and positive pincushion distortion, for example.

Figure 81A:
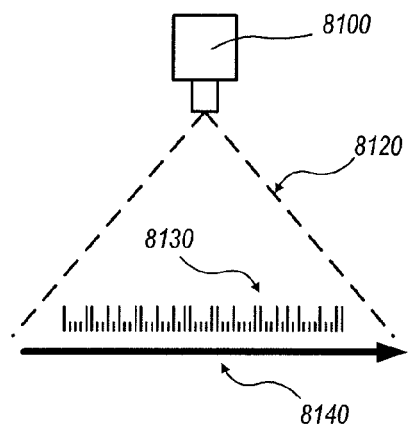
FIG. 81A schematically illustrates an imaging system that utilizes a global shutter, in accordance with an embodiment.
Figure 81B:
FIG. 81B illustrates image data produced from a printing code by the apparatus illustrated in FIG. 81A, in accordance with an embodiment.

Another illustration of a rolling shutter effect is shown in FIGS. 81A through 82C. FIG. 81A schematically illustrates an imaging system 8100 that utilizes a global shutter. A printing code 8130 passes through a field of view 8120 of imaging system 8100 at an object velocity 8140. Imaging system 8100 images printing code 8130, producing raw image data 8150, as shown in FIG. 81B. An aspect ratio of image data 8150 can be seen to match an aspect ratio of printing code 8130. FIG. 82A shows an imaging system 8200 that utilizes a rolling shutter. The rolling shutter acquires images in the direction shown by arc 8210, that is, the rolling shutter has a shutter direction that is the reverse of arc 8210. Printing code 8130 also moves at object velocity 8140. As shown in FIG. 81A, printing code 8130 passes through a field of view 8220 of imaging system 8200 at object velocity 8140. If imaging system 8200 images printing code 8130 in the direction shown by arc 8210, i.e., in the same direction as object velocity 8140, the system can produce raw image data 8250, shown in FIG. 82B. A comparison of FIG. 81B with FIG. 82B illustrates how image data 8250 (FIG. 82B) appears elongated, in a direction of object velocity 8140, as compared with image data 8150 (FIG. 81B). If imaging system 8200 images printing code 8130 in the reverse direction of arc 8210, that is, the shutter direction is opposite to the direction of object velocity 8140, the system can then produce image data 8255, shown in FIG. 82C. Image data 8255 (FIG. 82C) can then be seen as shortened, in a direction of object velocity 8140, as compared with image data 8150 (FIG. 81B). One of ordinary skill in the art, after reading and comprehending the present application, will appreciate that utilizing a shutter direction that is opposite to object velocity of a moving object can thus be utilized to obtain images of objects that are larger than a field of view of the imaging system that captures the image data thereof.

Figure 82A:
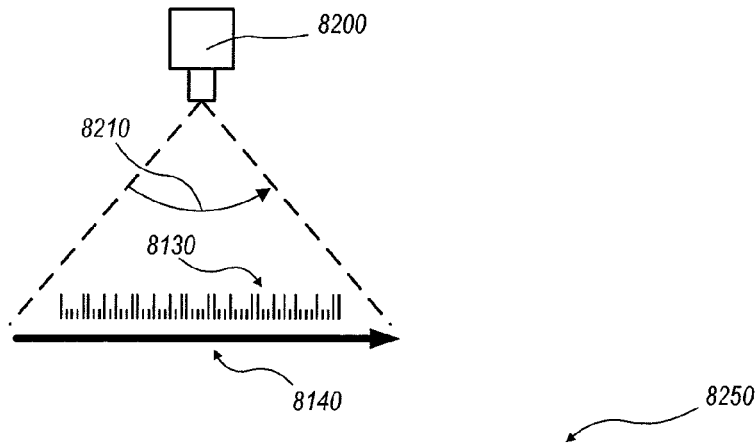
FIG. 82A schematically illustrates an imaging system that utilizes a rolling shutter, in accordance with an embodiment.
Figure 82B:
FIGS. 82B and 82C illustrate image data produced from a printing code by the apparatus illustrated in FIG. 82A, according to a direction of the rolling shutter, in accordance with an embodiment.

As can be seen in the embodiments shown in FIGS. 81A and 82A, printing code 8130 is already aligned with object velocity 8140. When such an alignment can be utilized for objects having printing code 8130, the use of a rolling shutter (as in FIG. 82A, for example) to elongate the raw image data captured thereby can be better exploited, either (a) to increase an information density of printing code 8130 (i.e., to print and successfully utilize more information per length of printing code 8130), or (b) to increase the object velocity (e.g., to increase throughput of a system limited by the object velocity) without losing the ability to gather the information in printing code 8130.

Figure 82C:
Figure 83:
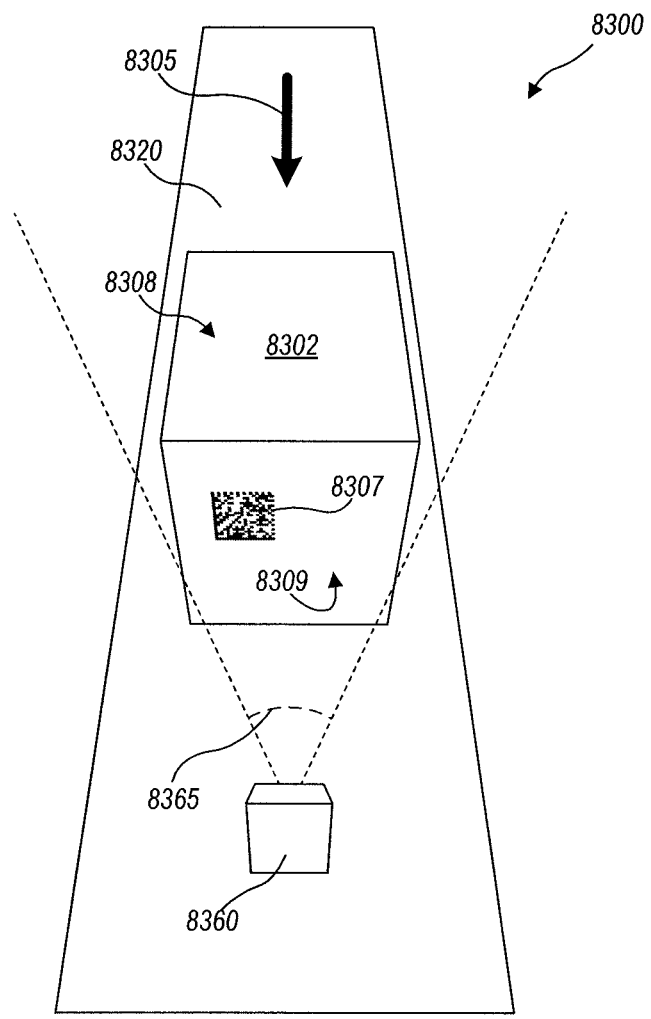
FIG. 83 schematically shows a perspective view of an imaging system imaging an object that travels on a conveyor, in accordance with an embodiment.
Figure 84:
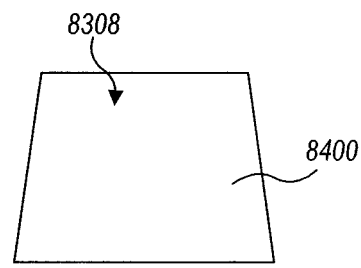
FIGS. 84 and 85 schematically show image outlines that are acquired by the imaging system of FIG. 83 of top and front sides, respectively, of a rectangular object, in accordance with an embodiment.
Figure 85:
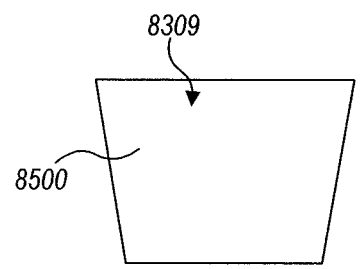

FIGS. 81 through 82C illustrate rolling shutter techniques in the context of manipulating magnification in a single direction, that is, a direction parallel to the direction of travel of an object. According to the present application, rolling shutter techniques can also be utilized to correct images that are essentially two-dimensional, as opposed to one-dimensional, to better facilitate detecting information on moving objects. For example, FIG. 83 schematically shows a perspective view of an imaging system 8360 imaging a rectangular object 8302 that travels on a conveyor 8320 traveling at a velocity 8305. Object 8302 may have information thereon, such as 2D barcode 8307, as shown. In the perspective shown in FIG. 83, imaging system 8360 faces downwardly at a substantially non-perpendicular angle towards object 8302, such that object 8302 can pass beneath imaging system 8360, and through a field of view 8365 of imaging system 8360. (There would be no perspective effect if the imaging system were to face straight down at object 8302. Similarly, a case in which object 8302 is imaged face-on by imaging system 8360 may be impractical, because if conveyor 8320 is flat, object 8302 could physically contact imaging system 8360.) Because of the downward, substantially non-perpendicular angle of imaging system 8360 shown in FIG. 83, images of object 8302 will have perspective effects if imaged with a global shutter. For example, FIGS. 84 and 85 schematically show image outlines acquired by imaging system 8360 of a top side 8308 and a front side 8309, respectively, of rectangular object 8302. The effect shown in FIG. 85 can be referred to as "keystone," and manifests as an image outline 8500 that is narrower at the bottom of the image as compared to the top of the image, due to the bottom of object 8302 being farther from imaging system 8360 than the top of the object, at the moment the image is taken. Similarly, FIG. 84 shows an image outline 8400 that is narrower at its top than at its bottom (a "reverse keystone" effect), because the rear side of object 8302 is farther from imaging system 8360 than the front side of the object, at the moment the image is taken.

Figure 86:
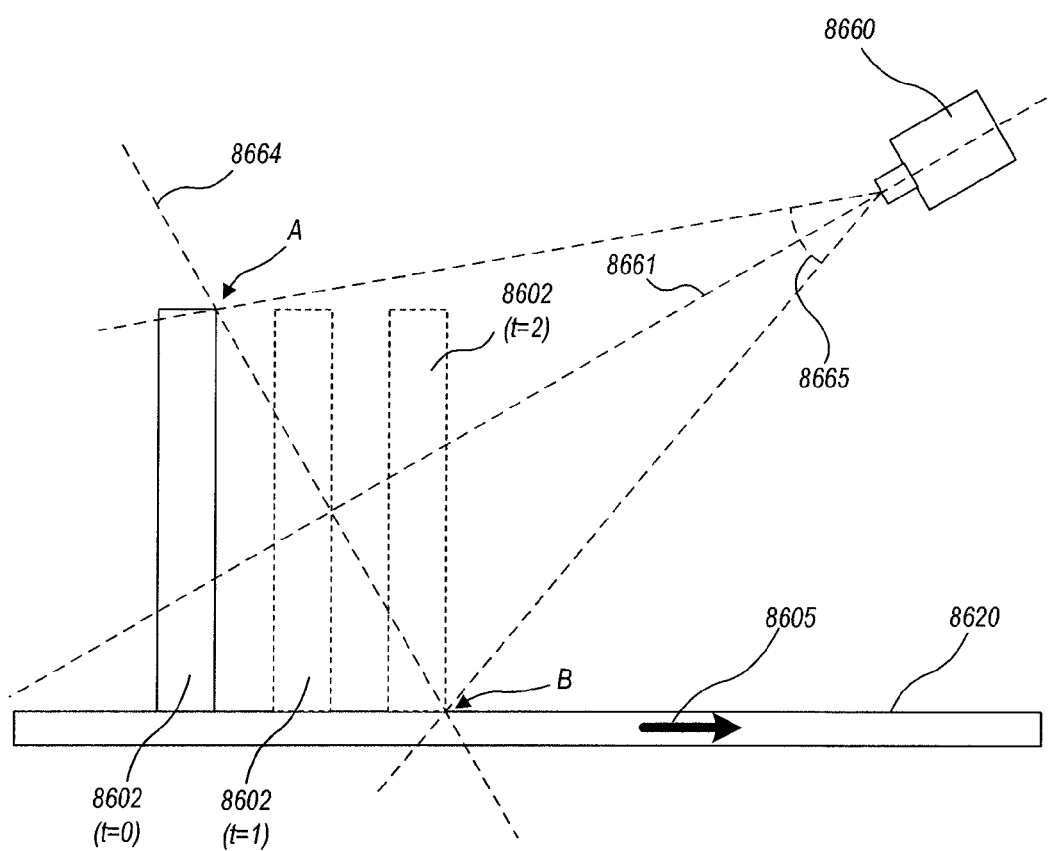
FIG. 86 schematically illustrates an arrangement that eliminates the "keystone" effect shown in FIG. 85, when a rectangular object is imaged at an angle, in accordance with an embodiment.

FIG. 86 schematically illustrates an example of an arrangement that can eliminate the keystone effect shown in FIG. 85, for an embodiment when a rectangular object is imaged at an angle. An imaging system 8660 that has a field of view 8665 centered about an optical axis 8661 is capable of imaging an object plane 8664 orthogonal to optical axis 8661. As best seen in FIG. 86, an object 8602 travels on a conveyor 8620 at an object velocity 8605. Imaging system 8660 utilizes knowledge of the shape and position of object 8602, as well as object velocity 8605, to trigger a rolling shutter that forms an image of object 8602 as the object travels. The rolling shutter exposes line 1 of the image (at the point denoted as A) when object 8602 is at the position shown as corresponding to a time t=0 (FIG. 86). Successive lines of the image are then acquired as object 8602 moves through field of view 8665, and can be timed such that each portion of object 8602 is imaged as it intersects object plane 8664. In an example, if imaging system 8660 acquires N lines of image data (not shown), line (N/2) can be acquired when object 8602 is at the location corresponding to t=1 (FIG. 86), as a midpoint of object 8602 intersects optical axis 8661, and line N can be acquired when object 8602 is at the location corresponding to t=2 (at the point denoted as B, in FIG. 86). For clarity of illustration, the features being imaged are assumed, in this example, to include the entire front facing surface of object 8602. When features that include less than an entire front facing surface of an object are to be imaged, different times t=0 through t=2 can be computed such that a time t=1 will coincide with the center of the lesser feature's intersection of optical axis 8661, and times t=0 and t=2 can be considered symmetric thereabout. According to this example, since all points on object plane 8664 can be considered to be nearly equidistant from imaging system 8660, a projected size of object 8602 can also be considered to be nearly equal for each line 1 through N of the image data. That is, even in the raw image data acquired by imaging system 8660, a substantially rectangular object or shape (e.g., a barcode or a side of a rectangular object) will generate image data that is substantially rectangular.

According to the embodiments shown, it can be further appreciated that a top surface of a moving object 8602 may also be scanned by an imaging system so as to eliminate the reverse keystone effect shown in FIG. 84. In this example, if the top of the object is parallel with conveyor 8620, the object plane that is equidistant from the imaging system intersects the path of the moving object at a single line across object 8602. Accordingly, the imaging system can simply scan the line of intersection repeatedly as object 8602 passes. Furthermore, one of ordinary skill in the art will appreciate, after reading and comprehending the present application, that the disclosure herein can be further adapted to correct keystone or reverse keystone effects for detecting information on moving objects that include the information on planes that form angles with respect to horizontal or vertical, by first identifying an object plane through which the object travels, and then adapting a timing of the rolling shutter to acquire an image of the information as it passes through the object plane.

Figure 87:
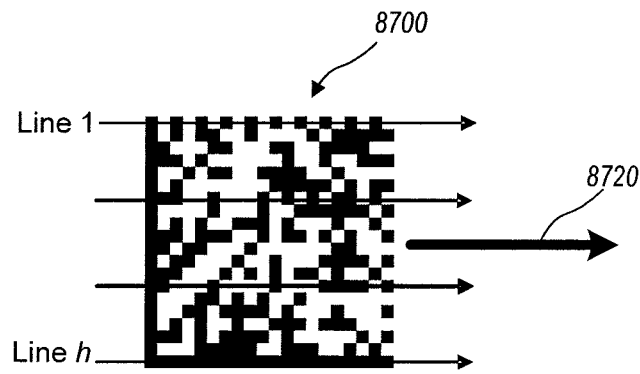
FIG. 87 schematically shows a two-dimensional ("2D") barcode and identifies pixel rows of an image of the barcode, in accordance with an embodiment.
Figure 88:
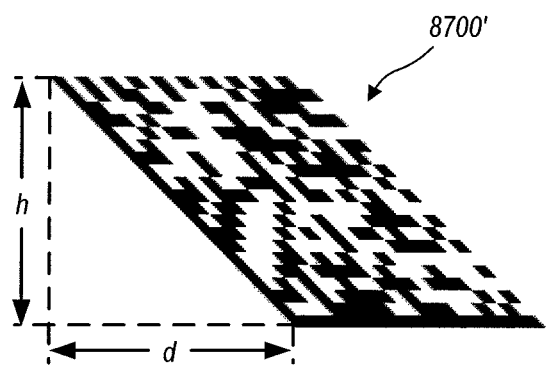
FIG. 88 schematically shows image data that results when the barcode of FIG. 87 is imaged utilizing a rolling shutter, in accordance with an embodiment.

Effects experienced through use of a rolling shutter can sometimes also be detrimental, but some of these detrimental rolling shutter effects can be corrected through additional image processing. For example, in some cases, use of a rolling shutter can result in distortion that is not helpful for detecting information on a moving object. FIG. 87 schematically shows a two-dimensional ("2D") barcode as an object 8700 and identifies pixel lines of an image of the barcode. Also shown is an object velocity 8720 of object 8700 as it moves past an imaging system as the image is formed. FIG. 88 schematically shows uncorrected image data 8700' that results when barcode 8700 is imaged utilizing a rolling shutter that images lines at a speed comparable to object velocity 8720 (FIG. 87). According to this example, movement of object 8700 will spatially "shear" uncorrected image data 8700', as compared with the actual appearance of object 8700.

Figure 89:
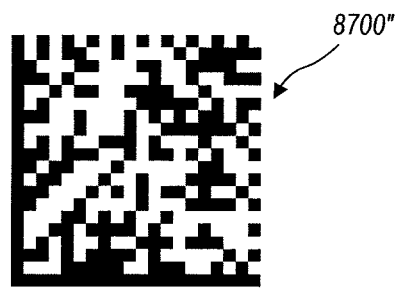
FIG. 89 shows the image data of FIG. 88 after processing to shift image data, in accordance with an embodiment.

As shown in FIG. 88, a distance d represents a shift in the image data from line 1 to line h of image data 8700'. Knowledge of the object velocity 8720 (FIG. 87), a rate at which lines of image data are acquired by the imaging system that acquires uncorrected image data 8700', and/or a priori information about the object's size and distance from the imaging system, can all be utilized to determine d. A height h of image data 8700' can be determined from a priori information about an expected size and location of object 8700, within the imaging system that acquires image data 8700'. Height h can alternatively be determined from image data 8700' utilizing known image processing methods for locating and isolating a barcode or other features within the uncorrected image data. Both d and h may be expressed in pixels (e.g., h is the total number of image lines to be corrected, and d is number of pixels that the image is shifted at line h). Once both d and h are known, an image processor (e.g., image processor 7640, FIG. 76) can shift pixels of image 8700' to prepare corrected image data 8700" (FIG. 89). To prepare corrected image data 8700", each line can be successively shifted by the amount of shift per line (d/h), as compared with the preceding line. Therefore, the shift of each line j, from lines 2 through N, may be expressed as $((j-1)*(d/h))$ pixels. In this example, line 1 (e.g., where $(j-1)=0$) does not shift, line 2 shifts by (d/h) pixels, line 3 shifts by 2(d/h) pixels, and so forth. One of ordinary skill in the art will thus appreciate that, according to this disclosure, such methods and systems may be applied to less than a full image; that is, when only a particular region includes information (e.g., a barcode) for which a corrected image is desirable, only the appropriate region need be processed. The resulting output image may include unprocessed lines of image data, or the output image may include only those processed lines, while other lines in the original image may be discarded.

According to the present application, use of a rolling shutter is but one technique that can help detect information on a moving object. According to the embodiments disclosed herein, it can be seen how use of a rolling shutter, to increase or decrease magnification in a particular direction, can be of particular benefit when (a) the position of the moving object carrying the information is known, (b) the information expected on the moving object faces an imaging system and is within a depth of focus of the imaging system, and/or (c) the information is aligned with a shutter direction of a sensor array of the imaging system and/or a velocity of the object. In other examples, where such considerations may not apply, it may be also desirable, according to the present application, to gather information from moving objects that may appear at unpredictable times and at varying distances from imaging systems, that may have the information of interest on any surface thereof, and/or that may have information that is not oriented with a shutter direction and/or velocity of the object.

Figure 90:
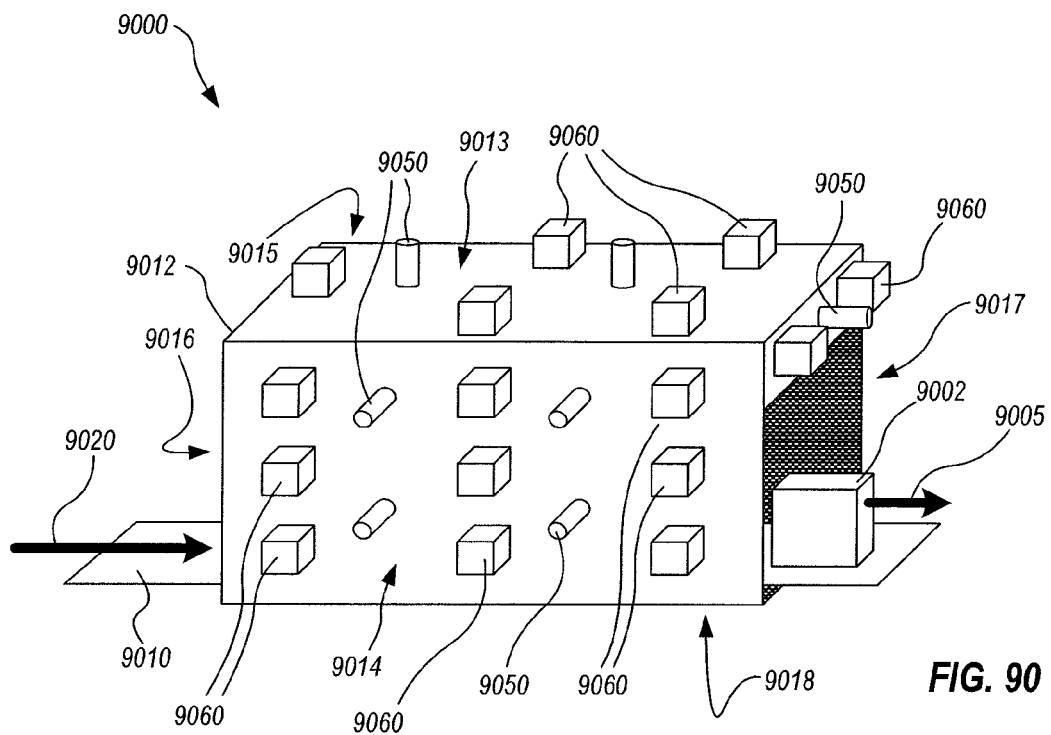
FIG. 90 is a schematic diagram of a system for detecting information on moving objects, in accordance with an embodiment.

FIG. 90 is a schematic diagram of a system 9000 for detecting information on moving objects. System 9000 is an example of system 7600 (FIG. 76). System 9000 includes a conveyor 9010 moving at a velocity 9020, in or upon which objects travel, such as object 9002, as shown. Conveyor 9010 passes through a tunnel 9012 having a top side 9013, a front side 9014, a back side 9015, an entry side 9016, an exit side 9017, and a bottom side 9018. It will be appreciated by one of ordinary skill, after reading and comprehending the present application, that the rectilinear form of conveyor 9010 is exemplary, and that the sides that may be implemented with respect to other embodiments may be different in number, position, and/or shape. Structure forming portions (not numbered) of entry side 9016, back side 9015, and bottom 9018 are hidden in the view shown in FIG. 90. Object 9002 moves at an object velocity 9005 that corresponds with velocity 9020. System 9000 includes a plurality of imaging systems 9060 and a plurality of illuminators 9050 that provide illumination for objects 9002. A number of imaging systems 9060 and illuminators 9050 are shown in the example of FIG. 90, but embodiments according to the present application may include more or fewer imaging systems 9060 and illuminators 9050 than the number shown. Each imaging system 9060 has its own field of view and depth of field, which are not shown in FIG. 90 for clarity of illustration. Also, not all imaging systems 9060 and illuminators 9050 are labeled in FIG. 90 for clarity purposes, and additional imaging systems 9060 and illuminators 9050 may be further associated with entry side 9016, back side 9015, and bottom 9018, even though not shown or hidden in the view of FIG. 90. A control module (not shown), one or more image processing systems (not shown), and other associated connections (not shown) to imaging systems 9060 and illuminators 9050, as discussed in connection with system 7600, FIG. 76, may also be included in system 9000.

System 9000 may perform such tasks as determining entry of an object 9002 within tunnel 9012, determining whether information of interest is present on object 9002, imaging the information of interest, and correcting the associated image data for effects introduced by such factors as object velocity 9005, lighting conditions, orientation of information on object 9002, and depth of focus (or other parameters) of imaging systems 9060. The act of imaging may be further corrected by utilizing a rolling shutter (and/or adapting rolling shutter rate and/or direction) to enhance image acquisition or to correct image data for motion of object 9002, as discussed above in connection with FIG. 81A through FIG. 86.

Figure 91:
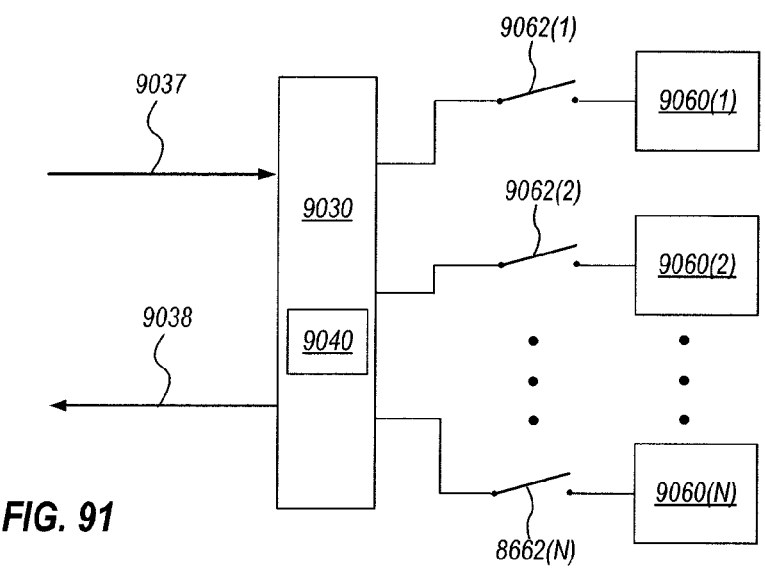
FIG. 91 is a schematic illustration of a portion of a system for detecting information on a moving object, in accordance with an embodiment.

Embodiments according to system 9000 may also advantageously simultaneously reduce constraints on placement of information on moving objects (e.g., which way a barcode should face), maximize throughput of the system and minimize information processing necessary to locate the information. According to such embodiments, these advantageous results may be realized by the system acquiring multiple images of a moving object, but processing only those images likely to include information of interest. FIG. 91 is a schematic illustration of a portion of a system for detecting information on a moving object. The embodiment shown in FIG. 91 may be a portion of system 9000, FIG. 90. In the embodiment of FIG. 91, control module 9030 includes image processor 9040. Control module 9030 and image processor 9040 may also be examples of control module 7630 and image processor 7640 (see FIG. 76), respectively. As many as N imaging systems 9060(1 through N) connect with control module 9030 through corresponding switches 9062(1 through N). An input control signal 9037 and an output line 9038, which connect control module 9030 with external systems, may also be examples of connection 7637 (see FIG. 76). Control module 9030 is responsive to input control signal 9037 to operate switches 9062(1 through N) to select particular ones of imaging systems 9060(1 through N) to send raw image data to image processor 9040. Image processor 9040 performs image processing to quickly locate regions of interest ("ROIs") that may contain a barcode or other encoded information, and then processes the ROIs to decode the information therein. The information may be stored for later use, or may be output into output line 9038.

Selection of images with ROIs may be done by "coarse" searching of image information. The images subjected to "coarse" searching may be gathered as low-resolution images, or may be subsets of high resolution images, in embodiments herein. For example, referring to FIG. 90, imaging systems 9060 that are near entry side 9016 may be high speed, low resolution cameras, such as video cameras. Sequential image data samples provided by these cameras may be processed to determine whether object 9002 is present and/or whether other, high resolution imaging systems 9060 should acquire images of object 9002. Image processing techniques can also locate object 9002 on conveyor 9010 such that an appropriate imaging system 9060, which may have object 9002 in its field of view, can be chosen. In this manner, one or more imaging systems 9060 can be selectively triggered to acquire an image when an object is within range of the imaging system(s), and processing capacity can be reserved for processing images containing ROIs. In another embodiment, initial images of object 9002 may be of high resolution, but such images need not be processed in full detail. Subsets of the high resolution images may be selected for processing by selecting a subset of pixels of the image data. For example, selecting every other pixel in the horizontal and vertical directions will generate a coarse image having one-fourth the number of pixels as the original, while selecting every third horizontal and vertical pixel will generate a coarser image having one-ninth the number of pixels, selecting every fourth horizontal and vertical pixel generates an even coarser image having one-sixteenth the number of pixels, and so forth. Once a region is identified as an ROI, the same region in the original, high resolution image can then be processed to obtain information therefrom.

Another example of balancing the use of system resources, like processing bandwidth is to configure certain illuminators 9050 and certain imaging systems 9060 to act in tandem (e.g., as a 1D or a 2D barcode reader), as well as other features of system 9000, may be selectively activated or deactivated to achieve the desired balance. For example, as noted above, a first imaging system 9060 may identify the presence of an object and/or an ROI on the object. Utilizing knowledge of velocity 9020, a particular illuminator 9050 can scan a bright (e.g., laser) beam over the ROI as it moves past a second imaging system 9060. Other illuminators 9050 and imaging systems 9060 can optionally be temporarily deactivated so as not to interfere with the operation of the particular illuminator 9050 and imaging system 9060. Once image data for the ROI is obtained, other illuminators 9050 and/or imaging systems 9060 can be reactivated. The image data for the ROI can be analyzed in real time to obtain barcode or printing code information, or can be stored for later processing or output.

Figure 92:
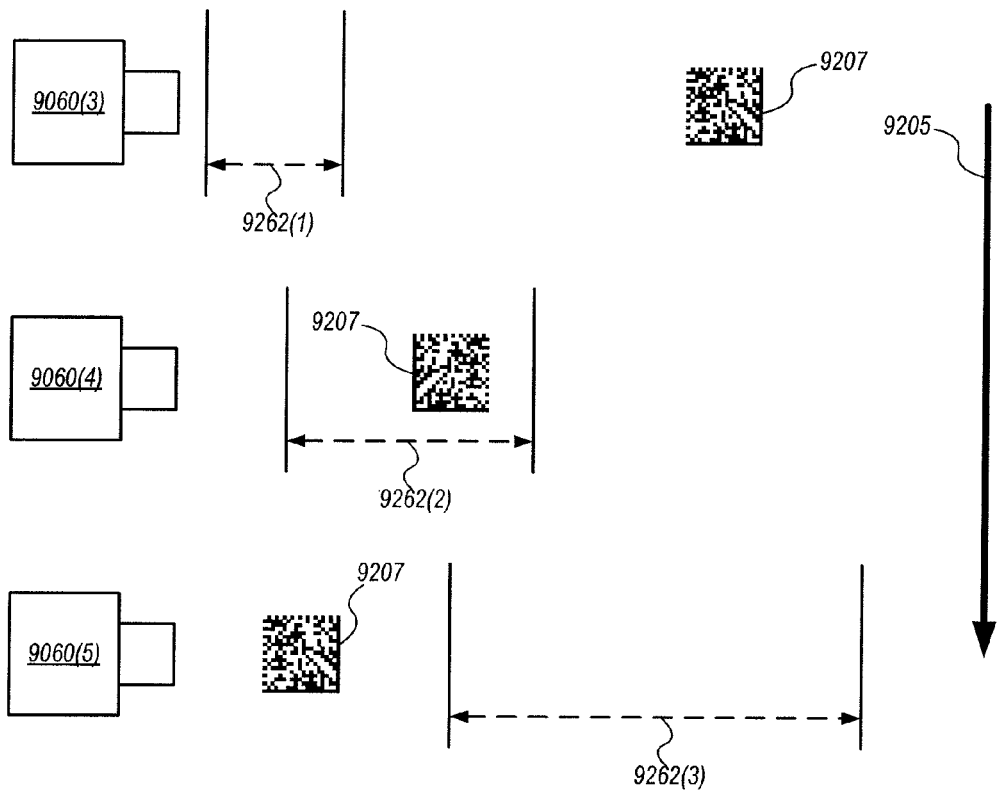
FIG. 92 shows three imaging systems arranged such that two-dimensional ("2D") barcodes pass by the imaging systems, in accordance with an embodiment.

How to determine when an object that may have information thereon comes within viewable range of an appropriate imaging system, and how to process image data acquired thereby, relate not only to the field of view of the imaging system, but also to the depth of field and other parameters of the imaging system. For example, FIG. 92 shows three imaging systems 9060(3 through 5) arranged such that 2D barcodes 9207 pass by the imaging systems with an object velocity having a direction 9205, as shown. Within the space in which the 2D barcodes 9207 travel, imaging system 9060(3) may have a close focal range, as indicated by line 9262(1), imaging system 9060(4) may have a medium focal range, as indicated by line 9262(2), and imaging system 9060(5) may have a distant focal range, as indicated by line 9262(3). Accordingly, the amount of required processing to successfully obtain information on objects passing through the space may be reduced by selecting only one (or less than all) of imaging systems 9060(3 through 5) to obtain an image as the object passes. The processing may also be reduced by allowing all of systems 9060(3 through 5) to obtain an image, but then only process the image (or images) from an imaging system (or systems) where the object is within a focal range of the system. It is also possible to trigger one or more illuminators (e.g., illuminators 9050, FIG. 90) as the object passes by the correct imaging system. For example, a "flash" illuminator that is much brighter than light otherwise available can be advantageously utilized both to "freeze" the object in an image formed by the imaging system (serving to overwhelm blur that may otherwise be introduced by the object's motion), and also to provide enough light that an aperture of the imaging system can be reduced, thereby increasing the focal range of the imaging system. It is further possible to associate image data with the imaging system that acquired it, so that an image processor (e.g., image processor 7640, FIG. 76) can process the image data corresponding to parameters of the imaging system. Such parameters may include, for example, knowledge of phase modification imparted by the imaging system, or known aberrations of the imaging system, so that effects of the phase modification can be reversed or the aberration may be compensated during the image processing. In particular, an imaging system may impart a phase modification that creates a deterministic blur in the image data, as described in U.S. Pat. No. 5,746,371, and that extends depth of field of the imaging system. Information of the phase modification can be associated with the image data such that a post processor can reverse this deterministic blur so that the processed image is clear, but still exhibits the increased depth of field.

In other embodiments, multiple images may be acquired and processed to determine a quality of each image. For example, a spatial frequency spectrum of each image may be generated, and the presence of high spatial frequency information may be determined. Since high spatial frequencies generally correlate with sharp focus, an image having more high spatial frequency information may be selected as an output image instead of images having less high spatial frequency information.

The methods and systems described above generally assume use of multiple imaging systems (e.g., systems 9060(3 through 5)) in order to ensure at least one imaging system will capture an image that is useful for processing.

Figure 93:
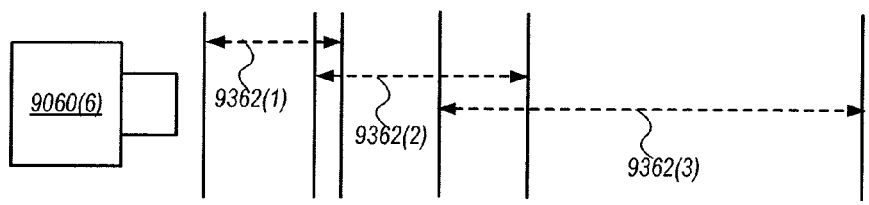
FIG. 93 shows an imaging system that captures an image having three regions, each region having a different depth of field, in accordance with an embodiment.

FIG. 93, on the other hand, shows an example of a single imaging system 9060(6) that captures an image having three regions, with each region having a different focal range. In this example, a first part of the image may have a close focal range, as indicated by line 9362(1), a second part of the image may have a medium focal range, as indicated by line 9362(2), and a third part of the image may have a distant focal range, as indicated by line 9362(3). Imaging system 9060(6) may be implemented by utilizing OPD-modifying optics, as described above in connection with FIGS. 49-75, by utilizing two different glass plates of specific thicknesses to modify focal distance from an image plane. It is also possible to utilize a glass wedge or induce tilt on the sensor of an imaging system 9060 to achieve a focal range that is both large and continuous.

One of ordinary skill in the art will understand, after reading and comprehending the present application, that changes may be made to the systems and methods described herein without departing from the scope thereof. It should further be noted that the embodiments described in the above description and/or shown in the accompanying drawings should be interpreted as illustrative and not in a limiting sense. The following claims are intended to cover the generic and specific features described herein, and generally capture the scope of the present systems and methods, which, as a matter of language, might be said to fall therebetween.

What is claimed is:

1. A system for generating image data of an object moving through a scene at a known object velocity, comprising:
    a first imaging system that generates sequential image data samples of the scene;
    a post processing system configured to analyze the sequential image data samples to determine when the object is present in the scene; and
    one or more second imaging systems configured, when triggered by the post processing system, to generate one or more second image data samples of the object when the object is present, the one or more second imaging systems each including
        a sensor array for generating the one or more second image data samples, and
        an adjustable shutter rate and an adjustable shutter direction such that the one or more second image data samples include complete image data of the object in a single sampling of the sensor array;
    the post processing system being further configured to utilize information of (a) a first time at which the object is determined to be in the scene, and (b) the object velocity, to calculate a second time at which to trigger the one or more second imaging systems, so that the one or more second image data samples are generated when the object is within a field of view of the one or more second imaging systems.

2. The system of claim 1, the first imaging system comprising a video camera.

3. The system of claim 1, the one or more second imaging systems comprising a plurality of second imaging systems, and the post processing system being capable of (a) determining a position of the object within the scene, and (b) triggering a selected one of the plurality of second imaging systems corresponding to the position.

4. The system of claim 1, the one or more second imaging systems comprising a plurality of second imaging systems that have respectively differing focal ranges within the scene, the post processing system capable of (a) determining a position of the object within the scene, and (b) triggering a selected one of the plurality of second imaging systems corresponding to a distance from the object such that the object is within a particular focal range of the selected one of the plurality of second imaging systems.

5. The system of claim 1, the one or more second imaging systems comprising a plurality of second imaging systems, the one or more second image data samples comprising a plurality of second image data samples, and the post processing system capable of determining a relative quality of at least two of the plurality of second image data samples and providing a higher quality one of the plurality of second image data samples as an output.

6. The system of claim 1, the one or more second imaging systems comprising a single second imaging system that employs one or more optical path difference modifying elements to provide a plurality of best focus regions in the one or more second image data samples.

7. The system of claim 1, the one or more second imaging systems comprising a plurality of second imaging systems, and the post processing system capable of (a) determining a position of content of interest on the object, and (b) triggering a selected one of the plurality of second imaging systems corresponding to the position of the content of interest to generate the one or more second image data samples.

8. The system of claim 7, the content of interest comprising one of a one dimensional barcode and a two dimensional barcode.

9. The system of claim 7, each of the plurality of second imaging systems having respectively differing focal length ranges within the scene, the post processing system capable of triggering a selected one of the plurality of second imaging systems having a particular focal range corresponding to the position of the content of interest.

10. The system of claim 7, further comprising means for illuminating at least a portion of the scene, the post processing system capable of triggering the means for illuminating when the selected one of the plurality of second imaging systems is triggered.

11. The system of claim 10, wherein the means for illuminating and the selected one of the plurality of second imaging systems are configured as a barcode reader.

12. A system for generating image data of an object moving through a scene, comprising:
    a first imaging system that generates sequential image data samples of the scene;
    a post processing system configured to analyze the sequential image data samples to determine when the object is present in the scene; and
    one or more second imaging systems each
        (a) configured to be triggered by the post processing system to generate a respective second image data sample of the object when the object is present,
        (b) including a sensor array for generating its respective second image data sample, an adjustable shutter rate, and an adjustable shutter direction such that its second image data sample includes complete image data of the object in a single sampling of the sensor array, and
        (c) characterized by parametric information representing a phase modification imparted by the imaging system that respectively generated each of the one or more second image data samples to impart a deterministic blur in its respective second image data sample,
    the post processing system being further configured to, for each second image data sample: process the second image data sample based on the parametric information of the imaging system that generated the second image data sample to reverse the deterministic blur in the second image data sample.

13. The system of claim 12, wherein the post processing system is capable of determining a position of the object within the scene and processing the determined position and the one or more second image data samples corresponding to the respective parametric information of the imaging system that generated each of the one or more second image data samples.

14. A system for generating image data of an object moving through a scene, comprising:
- a first imaging system that generates sequential image data samples of the scene;
- a post processing system configured to analyze the sequential image data samples to determine when the object is present in the scene; and
- a plurality of second imaging systems each
  - (a) configured to be triggered by the post processing system to generate a respective second image data sample of the object when the object is present, and
  - (b) including a sensor array for generating its respective second image data sample, an adjustable shutter rate and an adjustable shutter direction such that each second image data sample includes complete image data of the object in a single sampling of the sensor array;
- at least one of (a) the shutter direction and (b) shutter rate, of a first one and a second one of the plurality of second imaging systems, differing from one another when the second image data samples are generated;
- wherein the first one of the plurality of second imaging systems is closest to the object moving through the scene and utilizes a shutter direction opposite to a first image velocity of its corresponding image across its corresponding sensor array, such that a respective one of the second image data samples so generated is shortened in a direction of the first image velocity, and
- wherein the second one of the plurality of second imaging systems is farther from the object moving through the scene and utilizes a shutter direction aligned with a second image velocity of its corresponding image across its corresponding sensor array, such that a respective one of the second image data samples so generated is lengthened in a direction of the second image velocity.

\* \* \* \* \*